March 11, 1952     H. C. KENDALL ET AL     2,588,930
AIRWAY TRAFFIC CONTROL SYSTEM
Filed April 22, 1947     36 Sheets-Sheet 1

INVENTORS
H. C. Kendall and
L. H. Orpin.
BY
THEIR ATTORNEY.

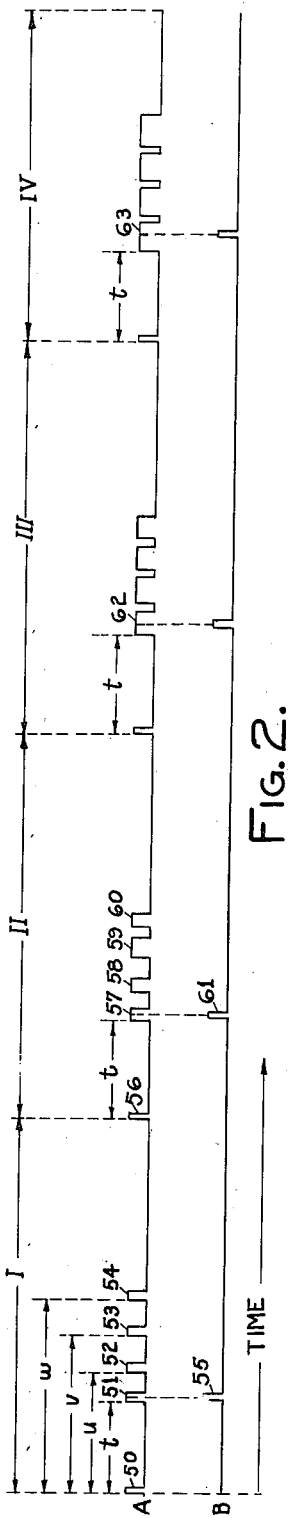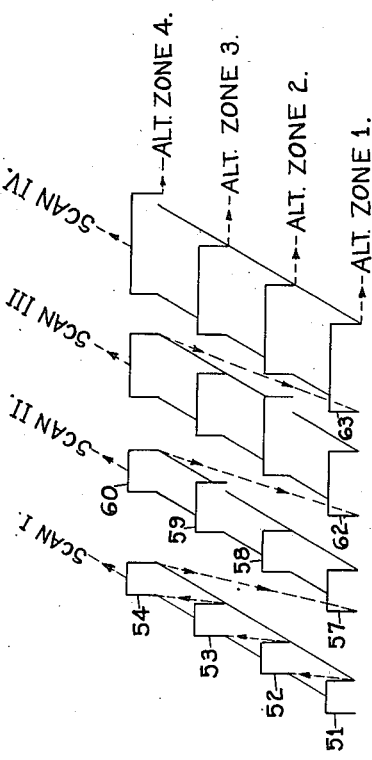

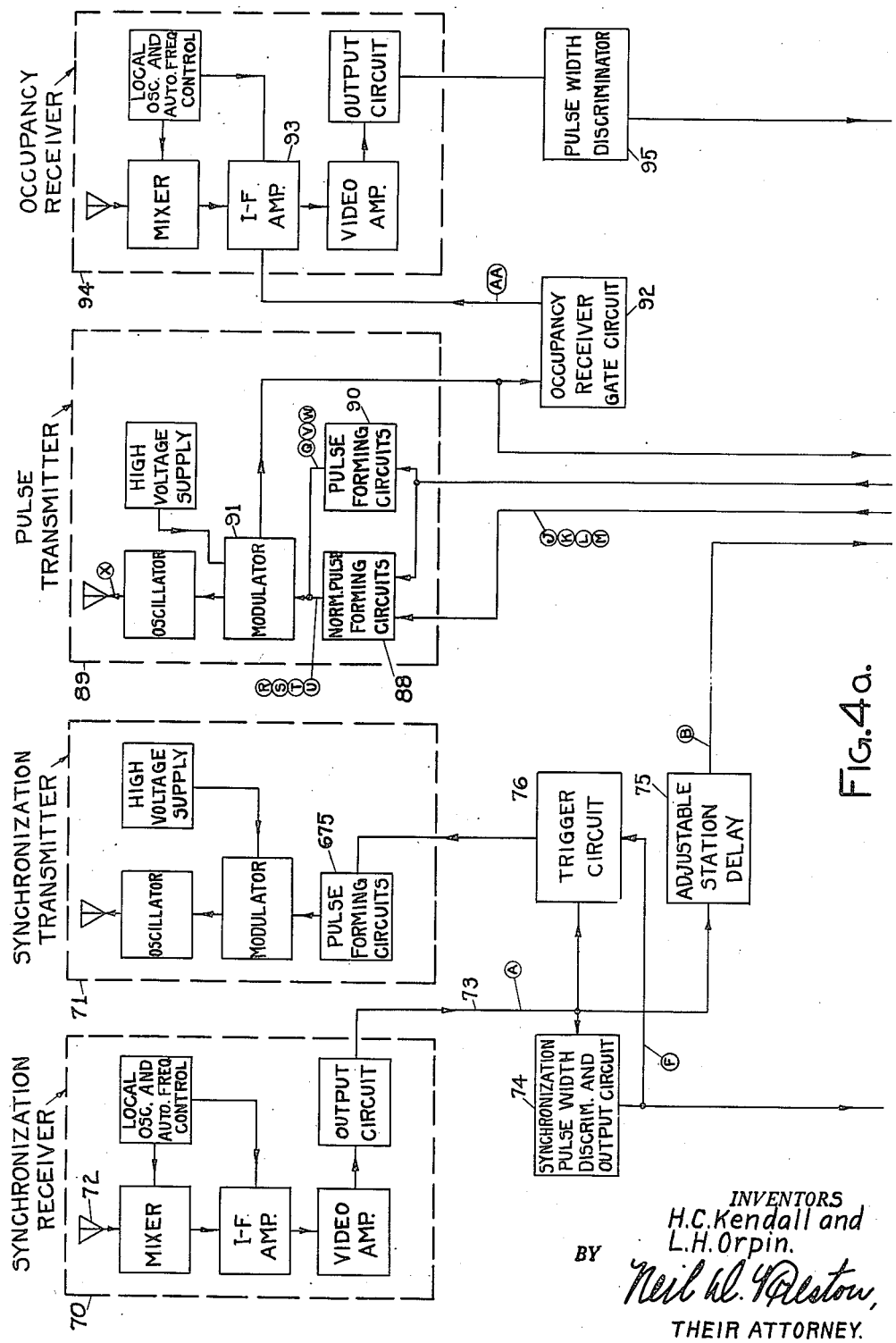

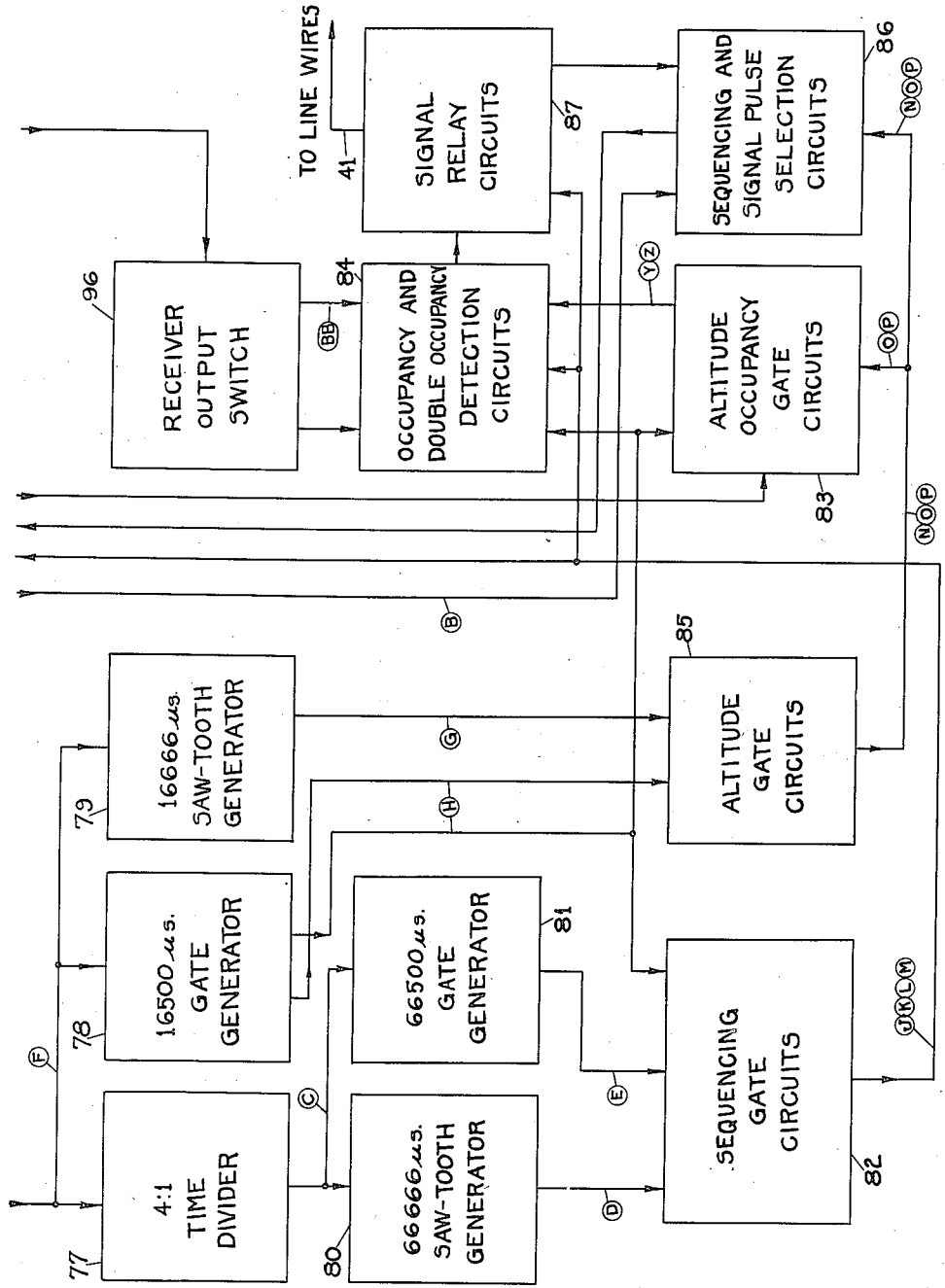

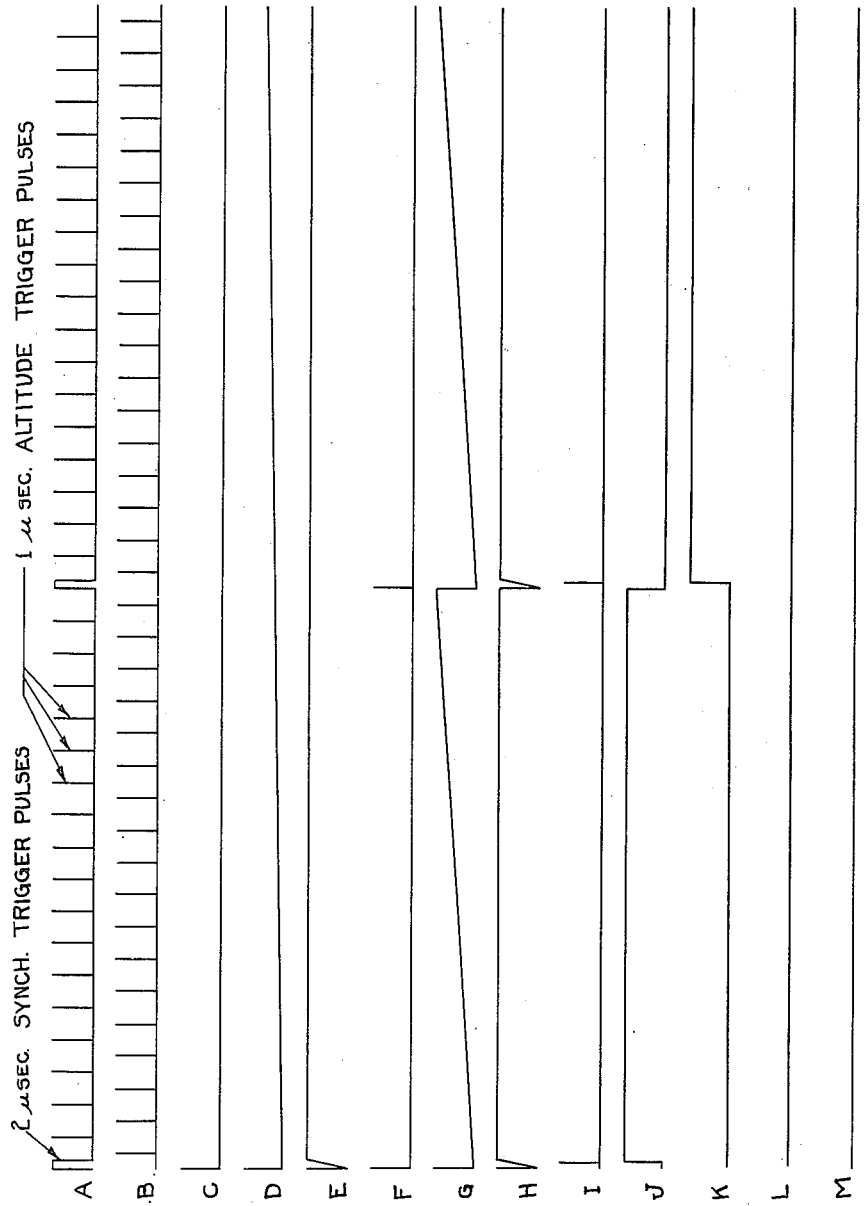

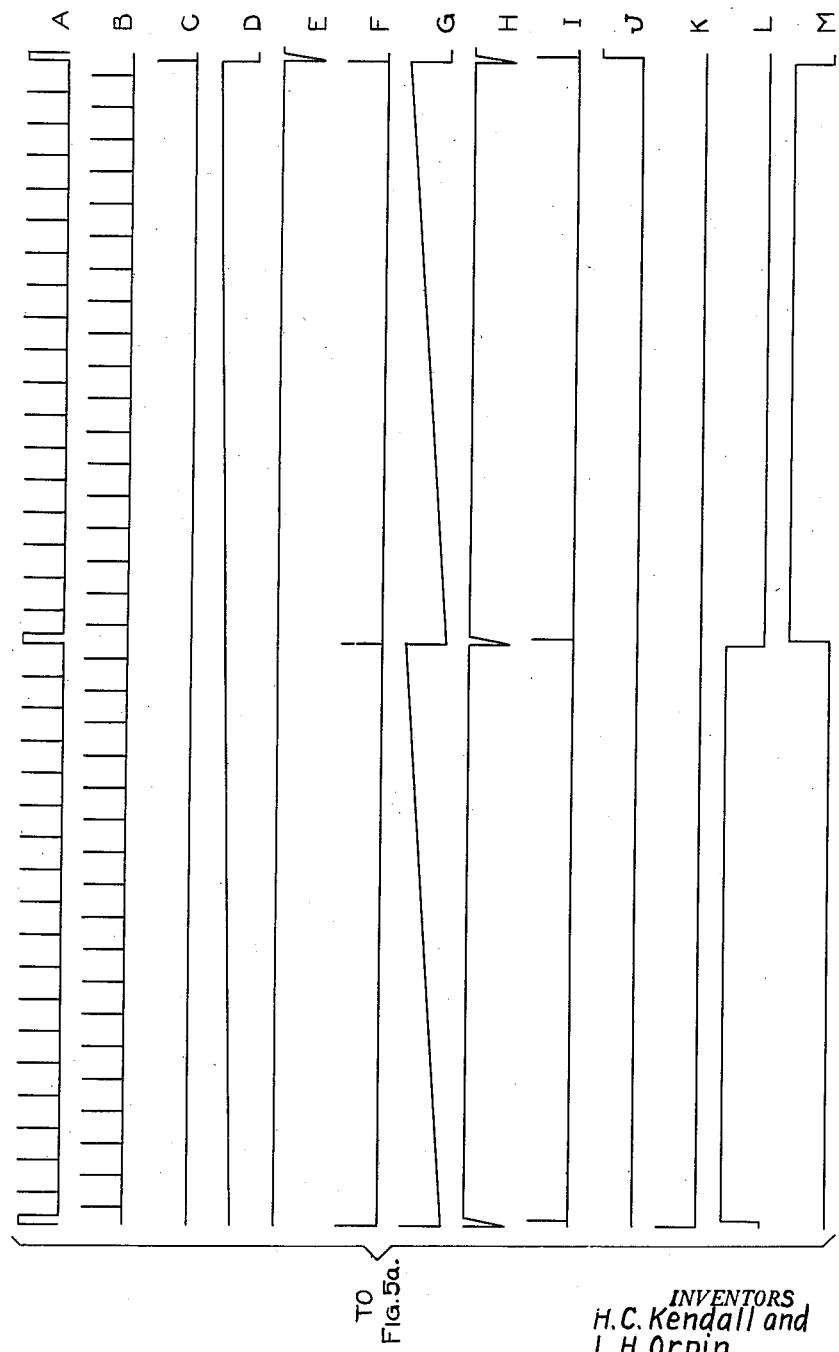

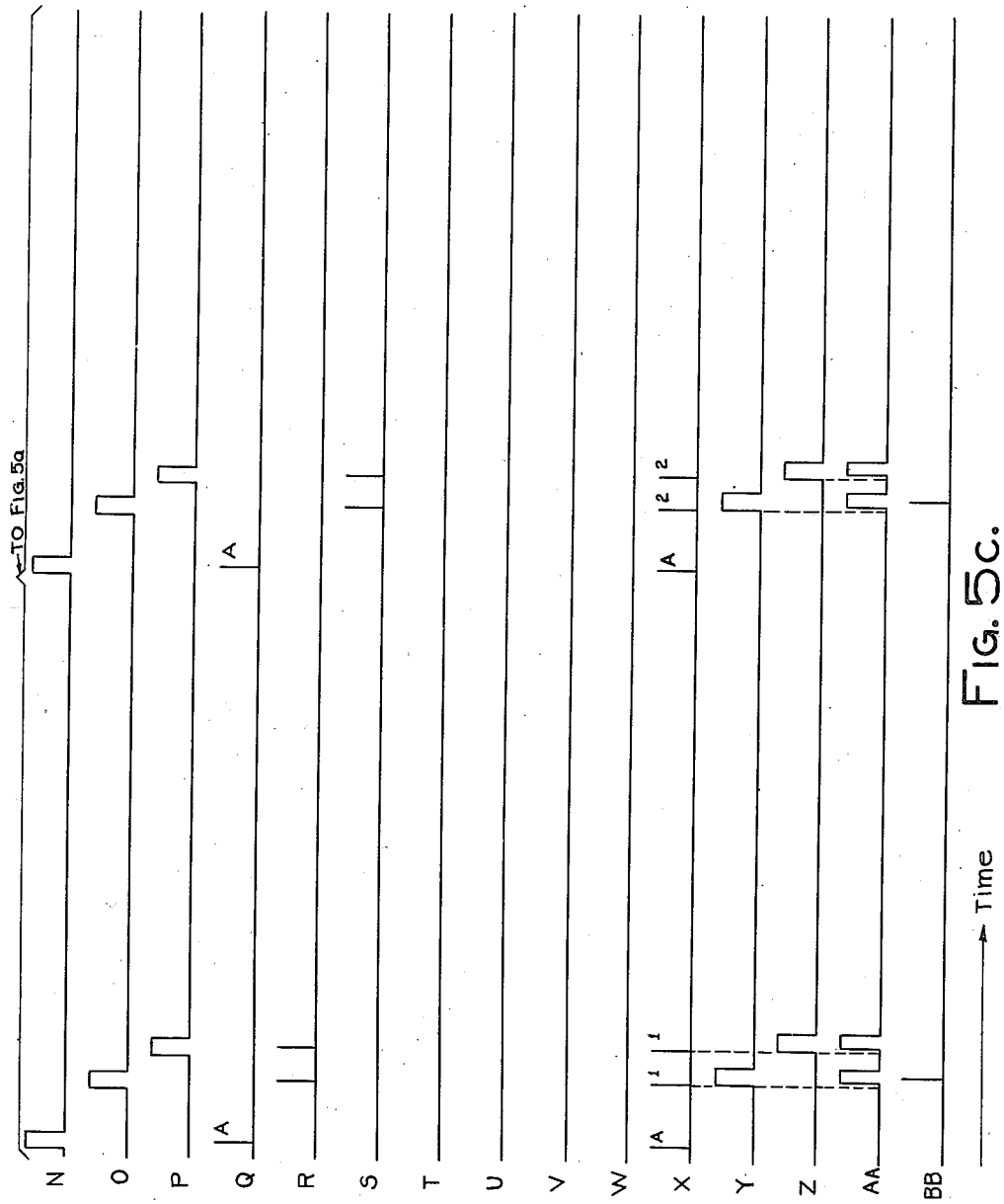

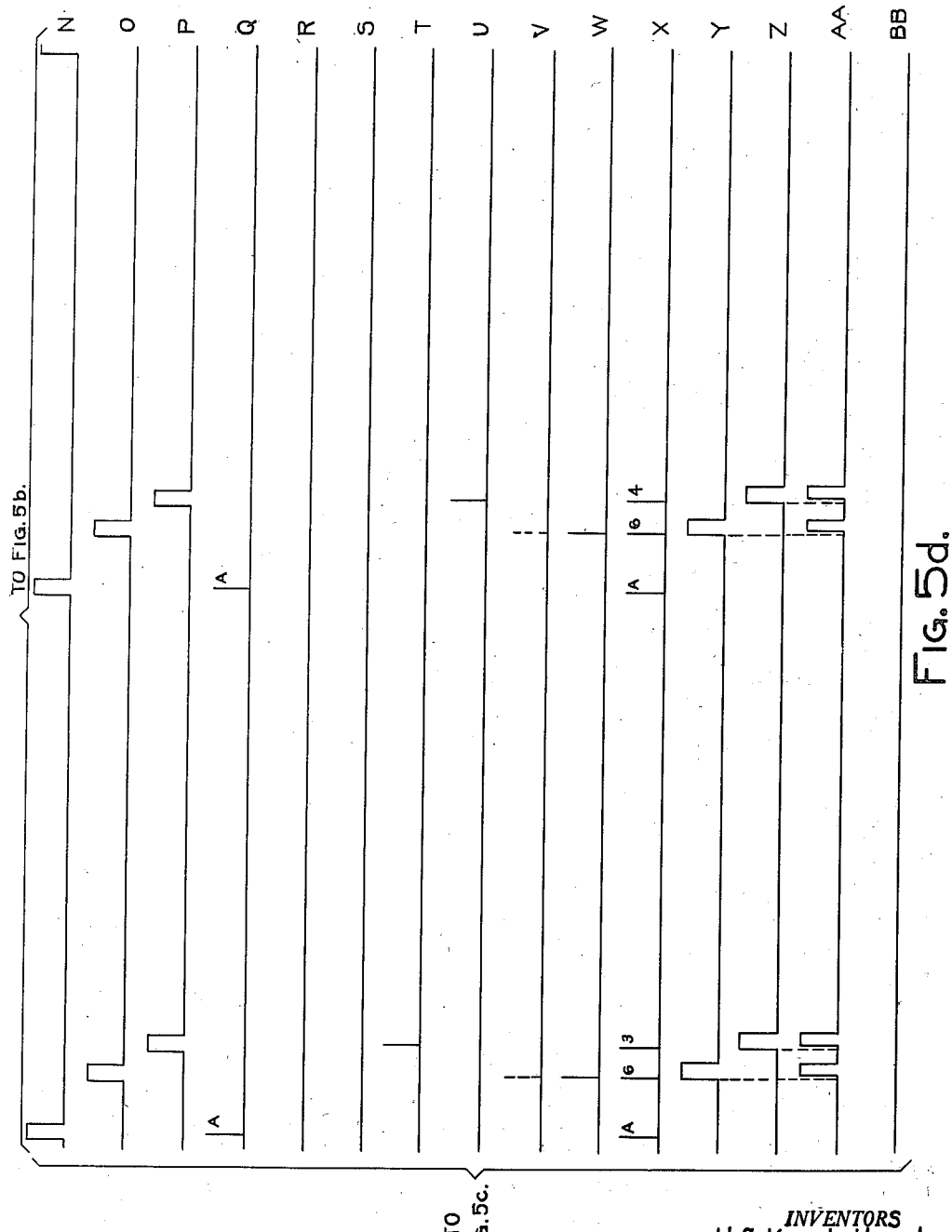

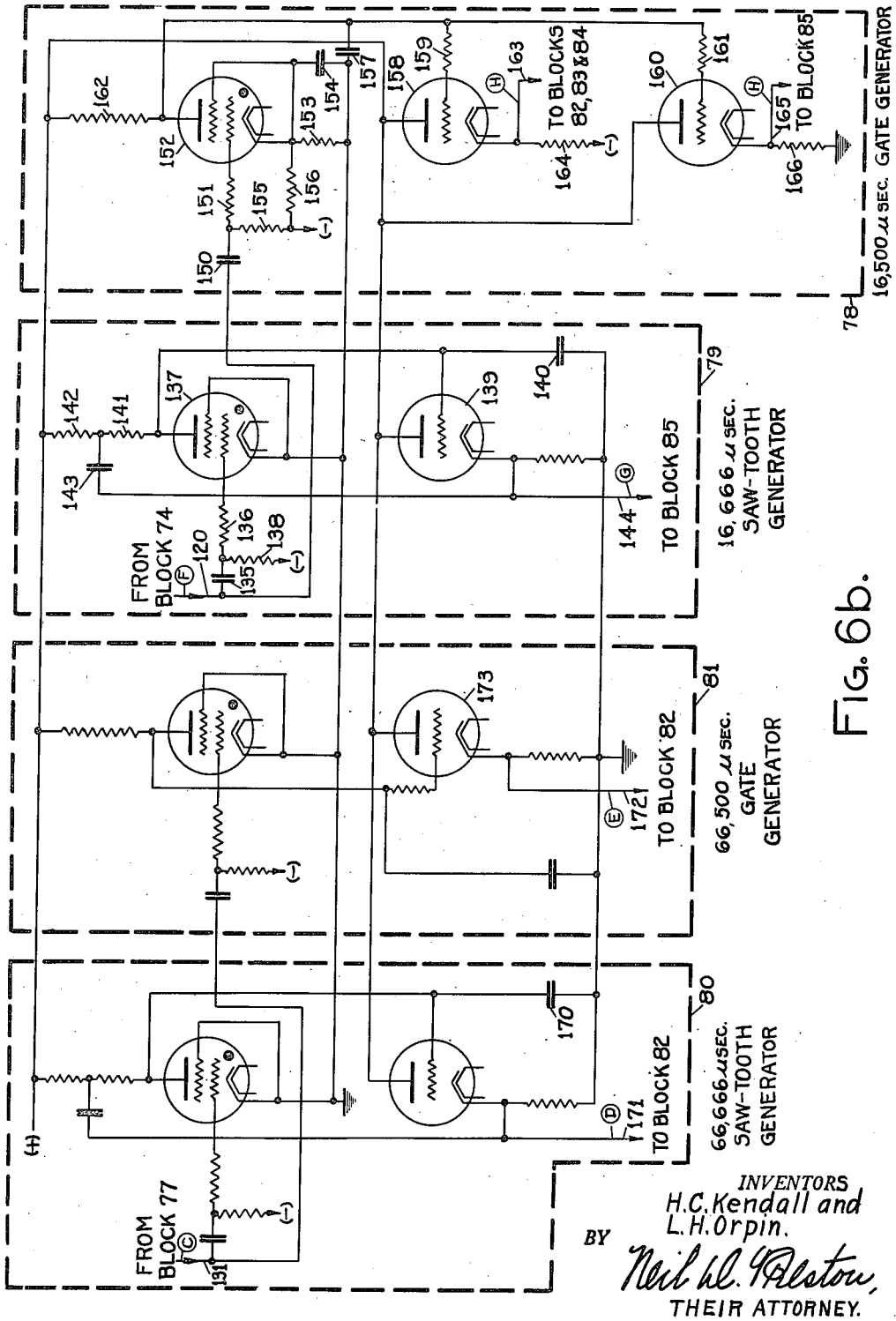

March 11, 1952     H. C. KENDALL ET AL     2,588,930
AIRWAY TRAFFIC CONTROL SYSTEM
Filed April 22, 1947     36 Sheets-Sheet 11

INVENTORS
H.C.Kendall and
L.H.Orpin.
BY
THEIR ATTORNEY

INVENTORS
H.C. Kendall and
L.H. Orpin.
BY
THEIR ATTORNEY.

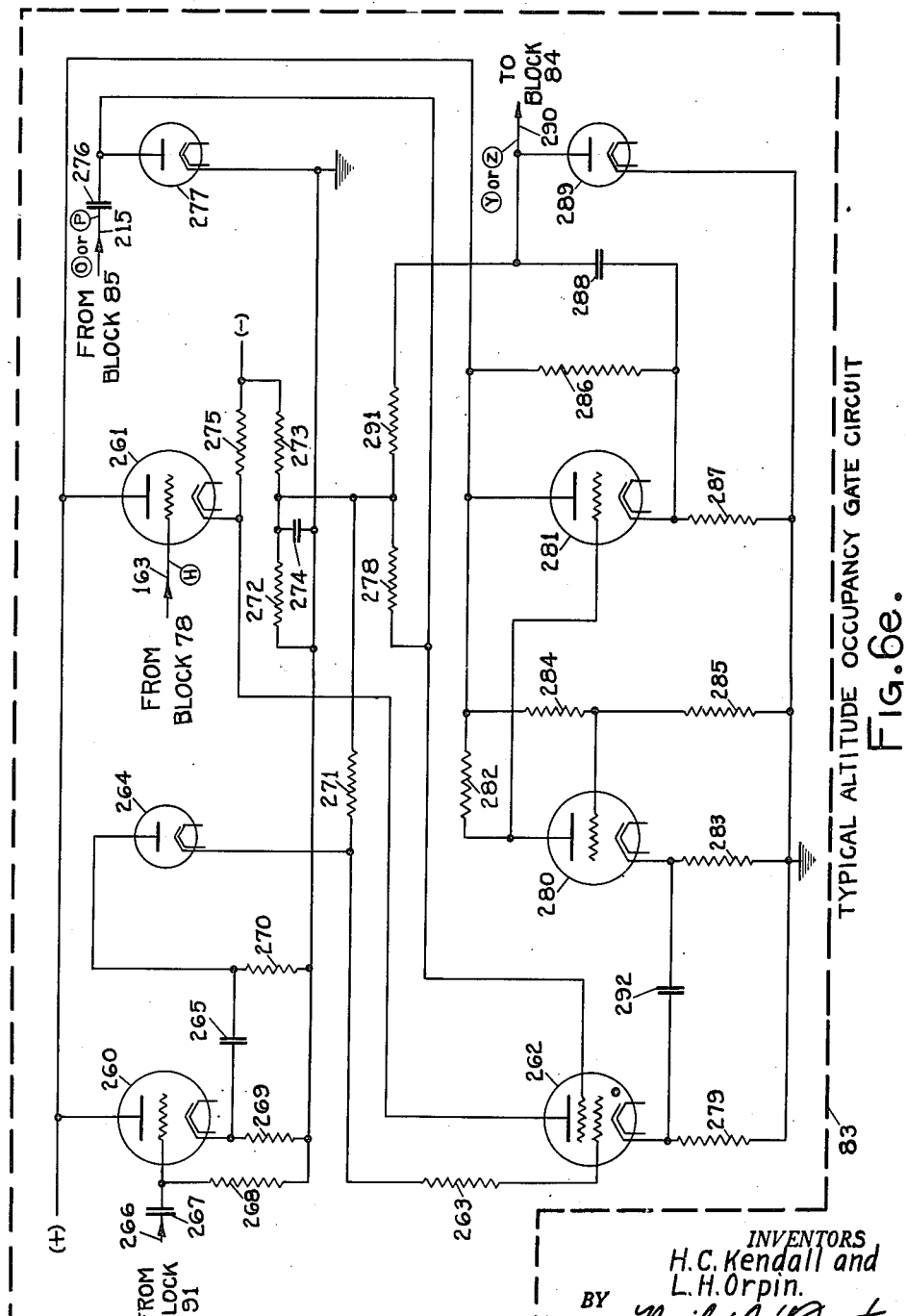

March 11, 1952     H. C. KENDALL ET AL     2,588,930
AIRWAY TRAFFIC CONTROL SYSTEM
Filed April 22, 1947     36 Sheets—Sheet 14
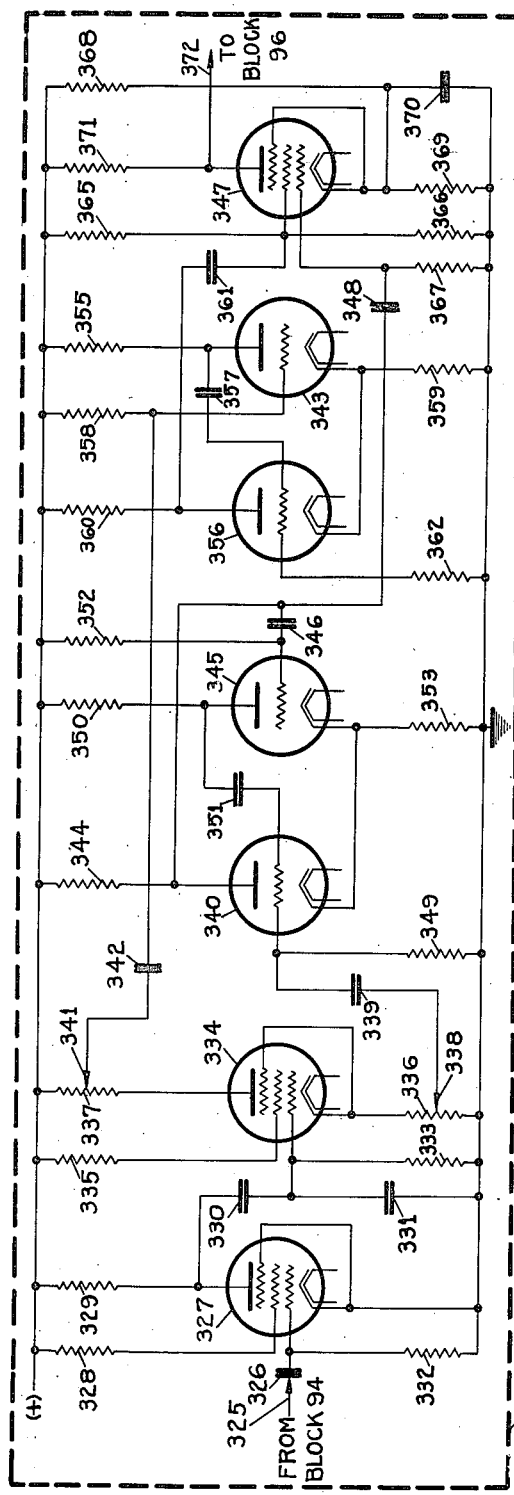
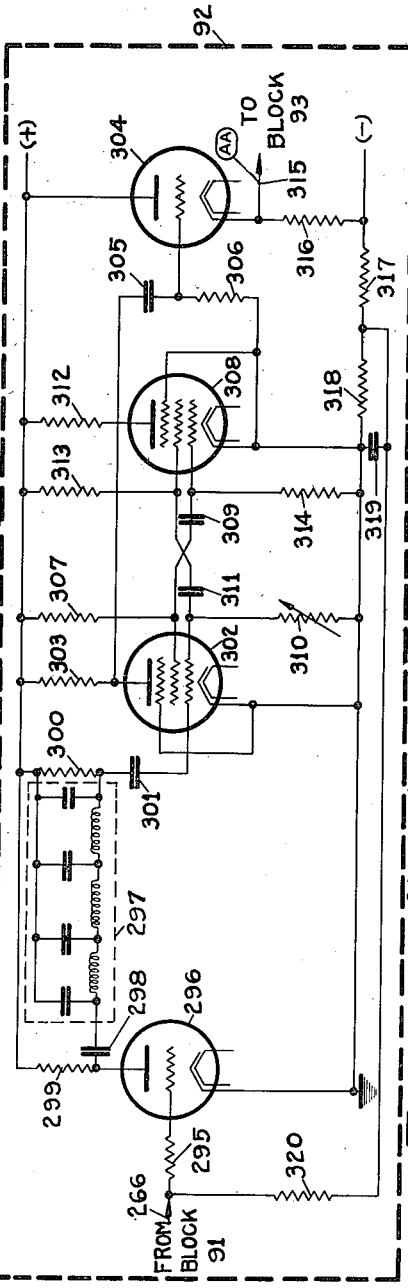
FIG. 6f.
INVENTORS
H.C. Kendall and
L.H. Orpin.
BY
THEIR ATTORNEY

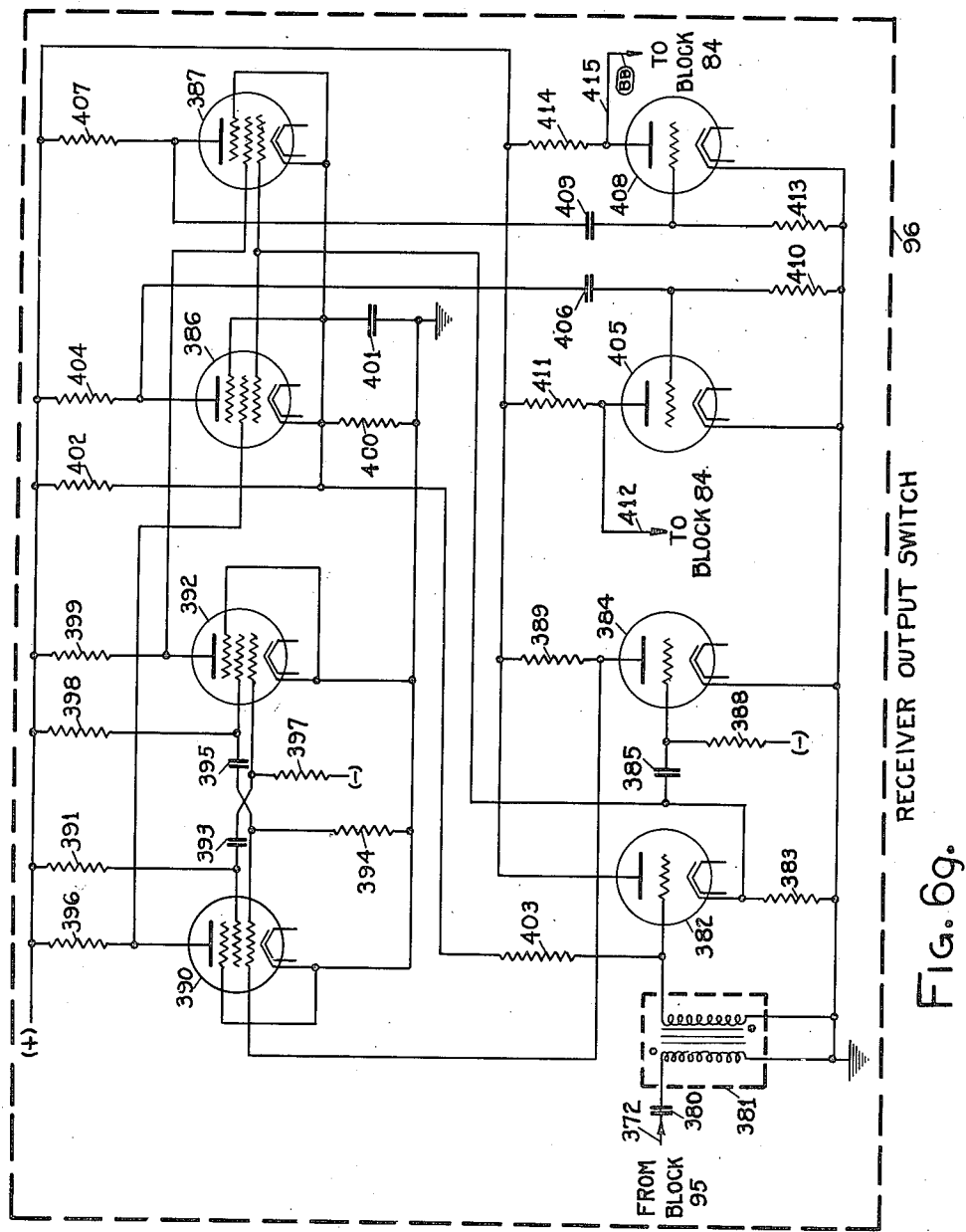

March 11, 1952　　　H. C. KENDALL ET AL　　　2,588,930
AIRWAY TRAFFIC CONTROL SYSTEM
Filed April 22, 1947　　　　　　　　　　　　　　36 Sheets-Sheet 16

84　TYPICAL OCCUPANCY OR DOUBLE OCCUPANCY DETECTION CIRCUIT

TYPICAL SEQUENCING AND SIGNAL　86
PULSE SELECTION CIRCUITS

INVENTORS
H. C. Kendall and
L. H. Orpin.
BY
THEIR ATTORNEY

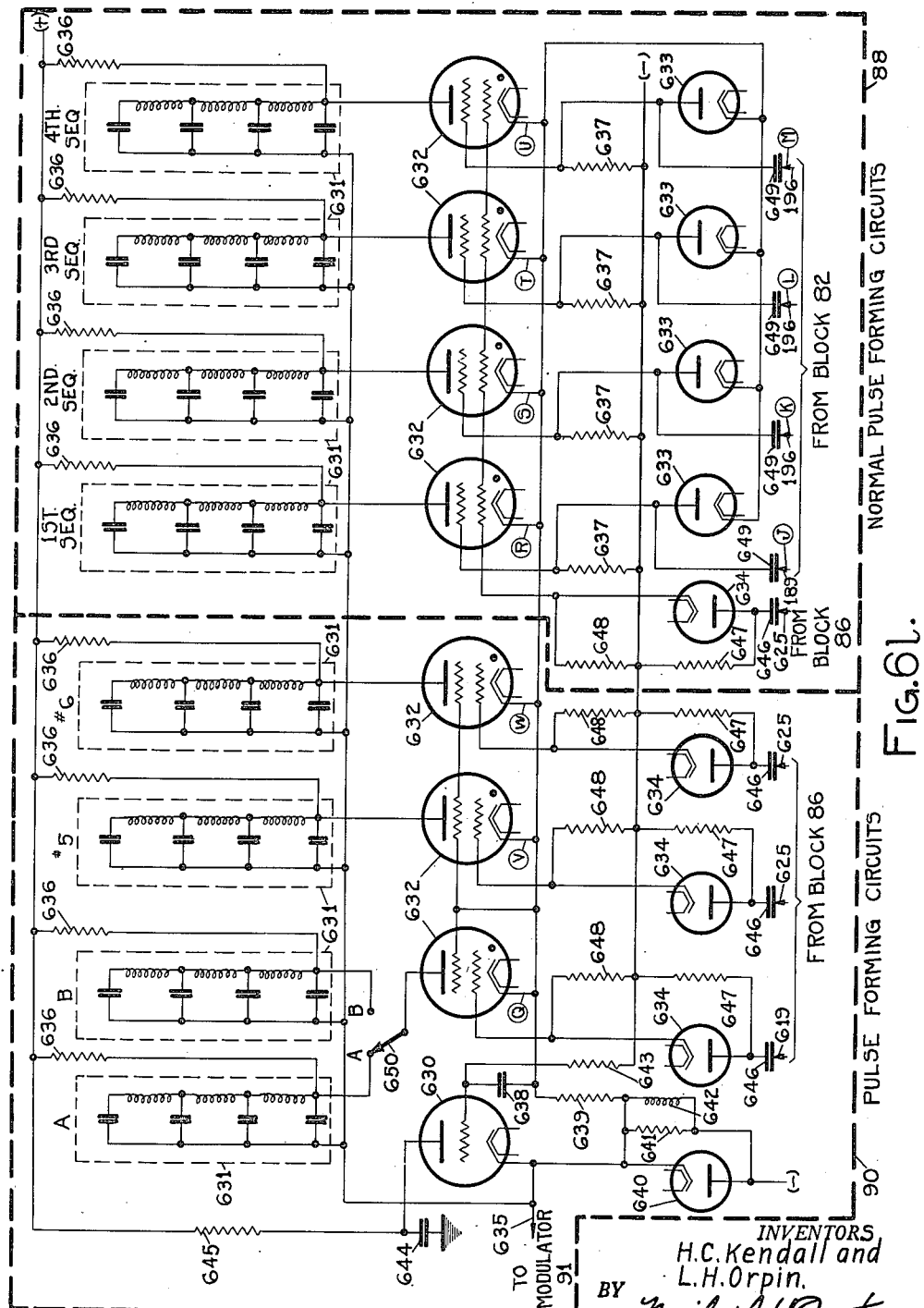

March 11, 1952     H. C. KENDALL ET AL     2,588,930
AIRWAY TRAFFIC CONTROL SYSTEM
Filed April 22, 1947     36 Sheets-Sheet 20
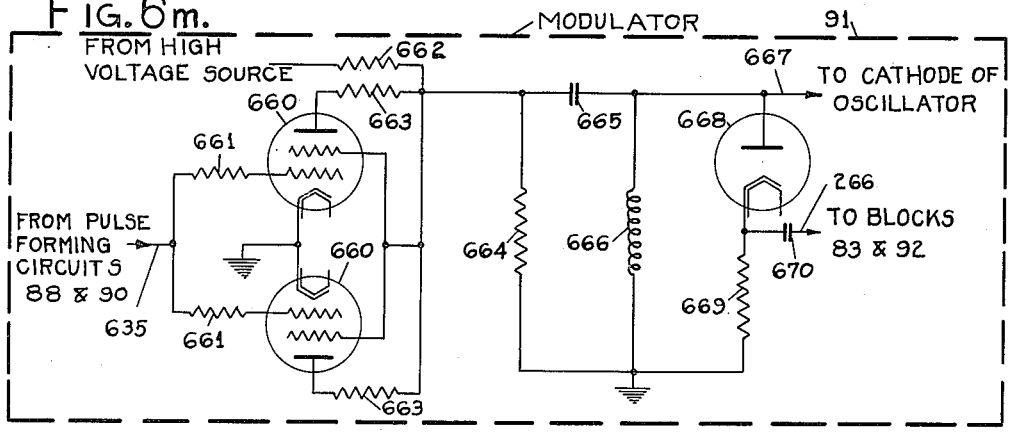
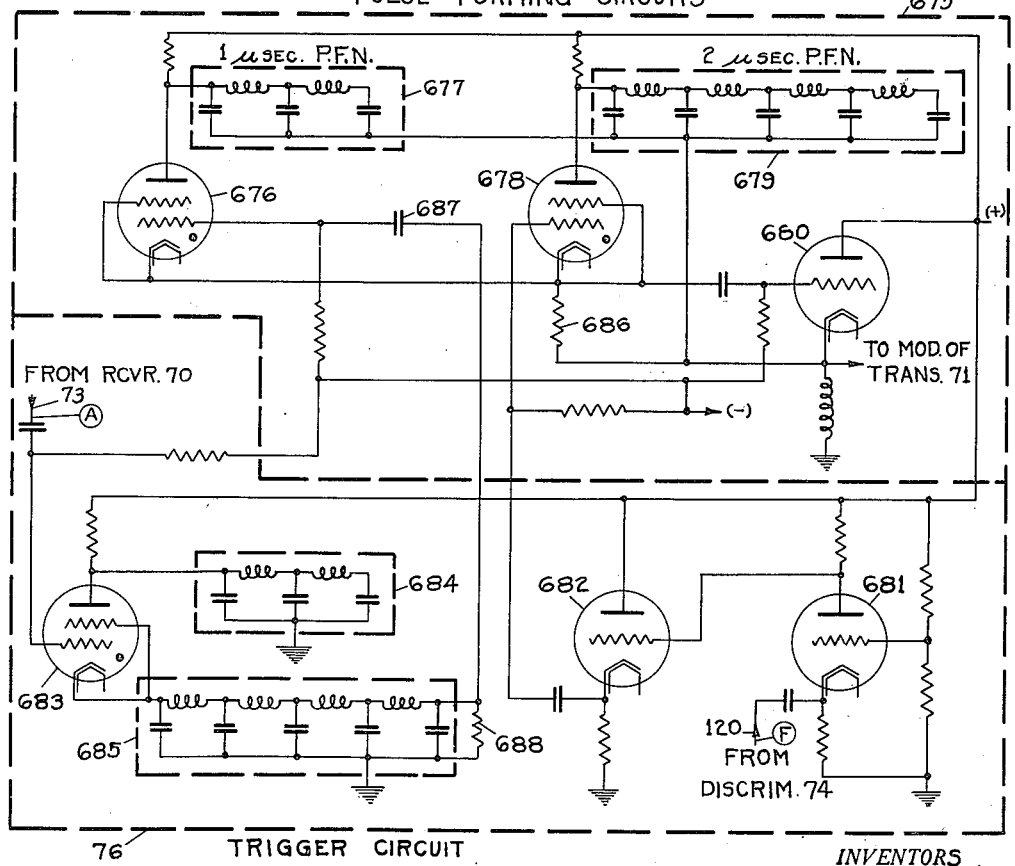
INVENTORS
H.C. Kendall and
L.H. Orpin.
BY Neil W. Preston,
THEIR ATTORNEY.

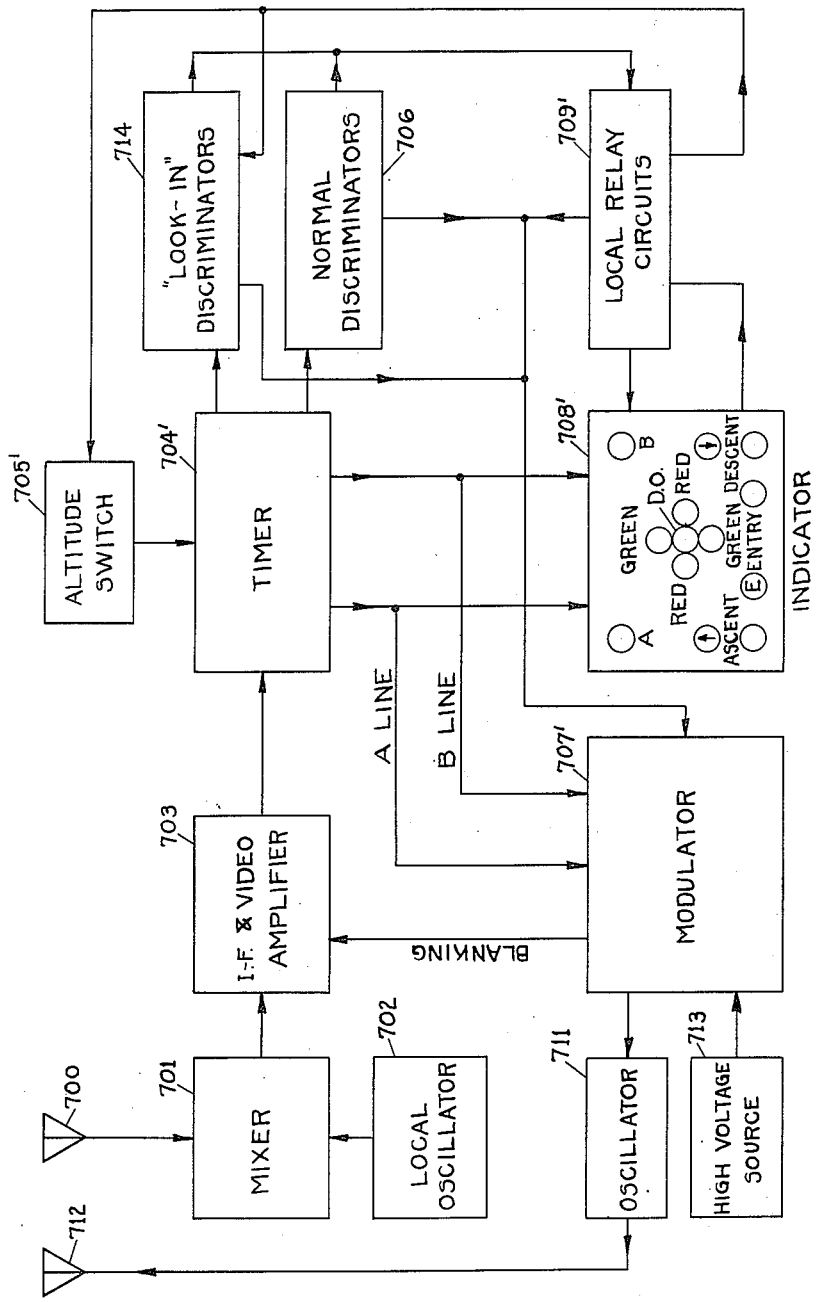

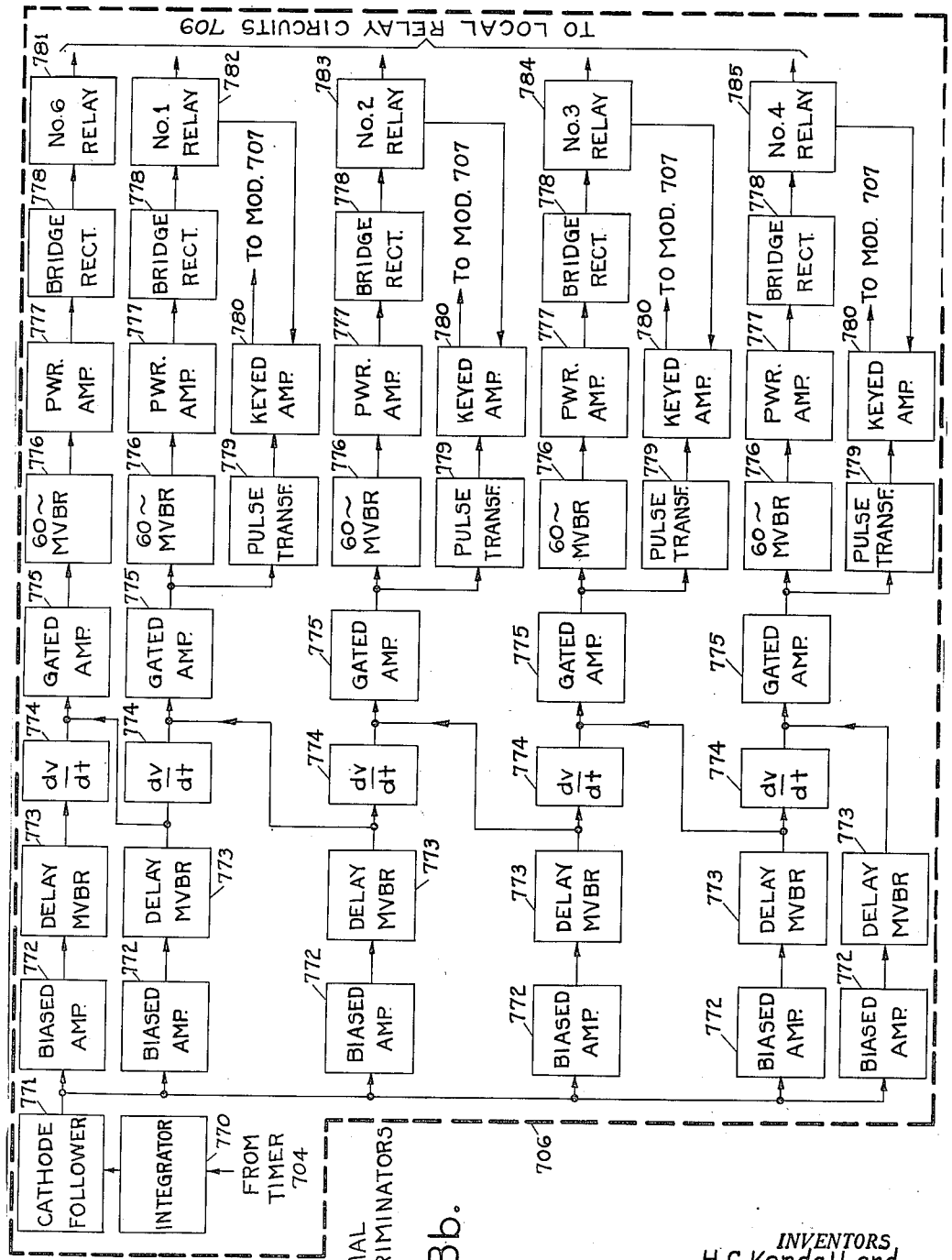

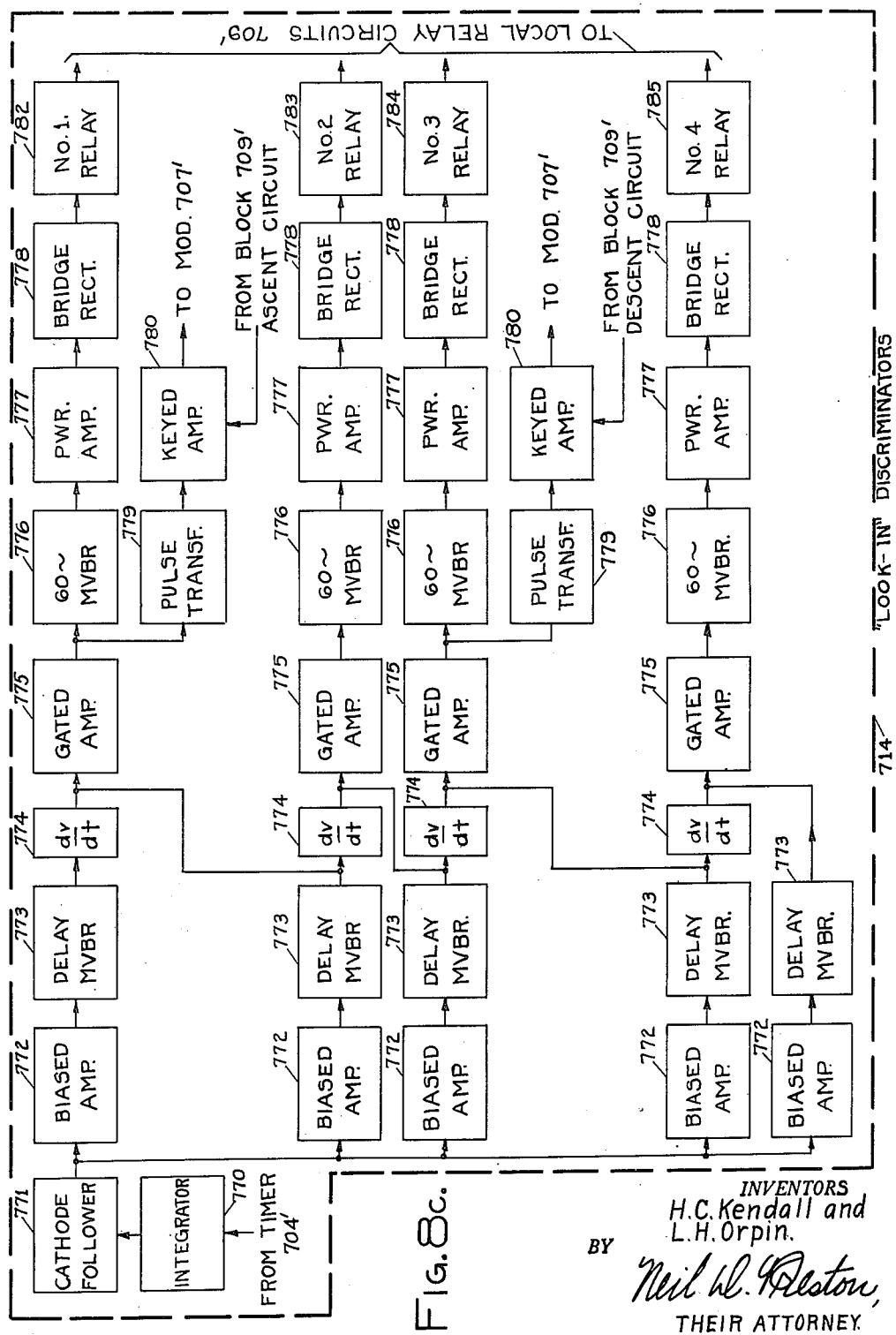

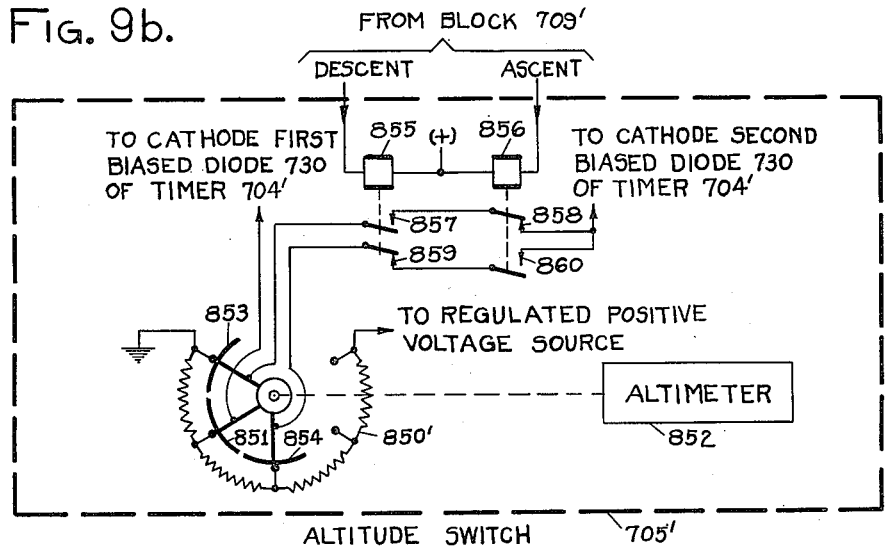
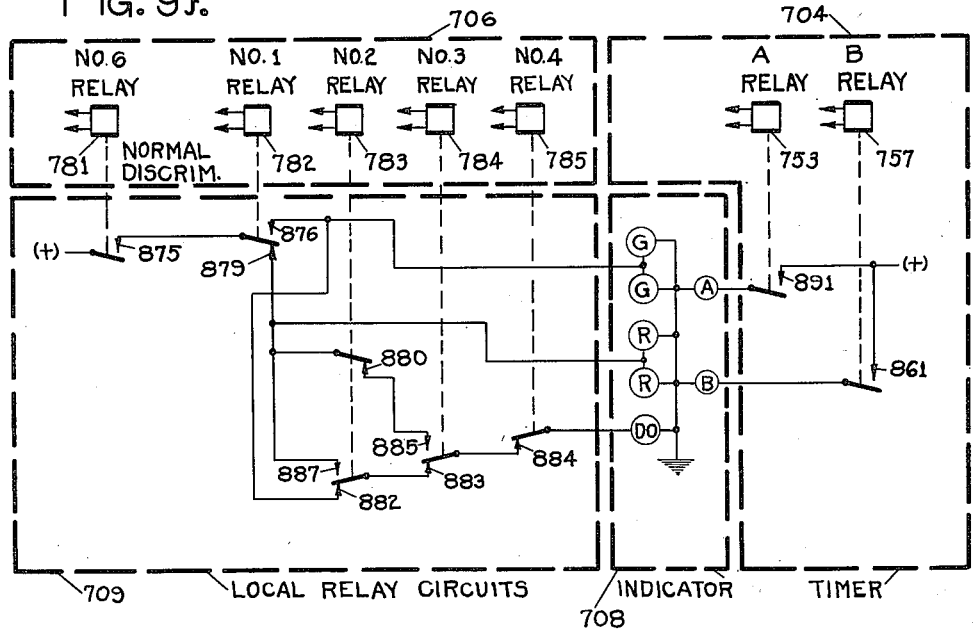

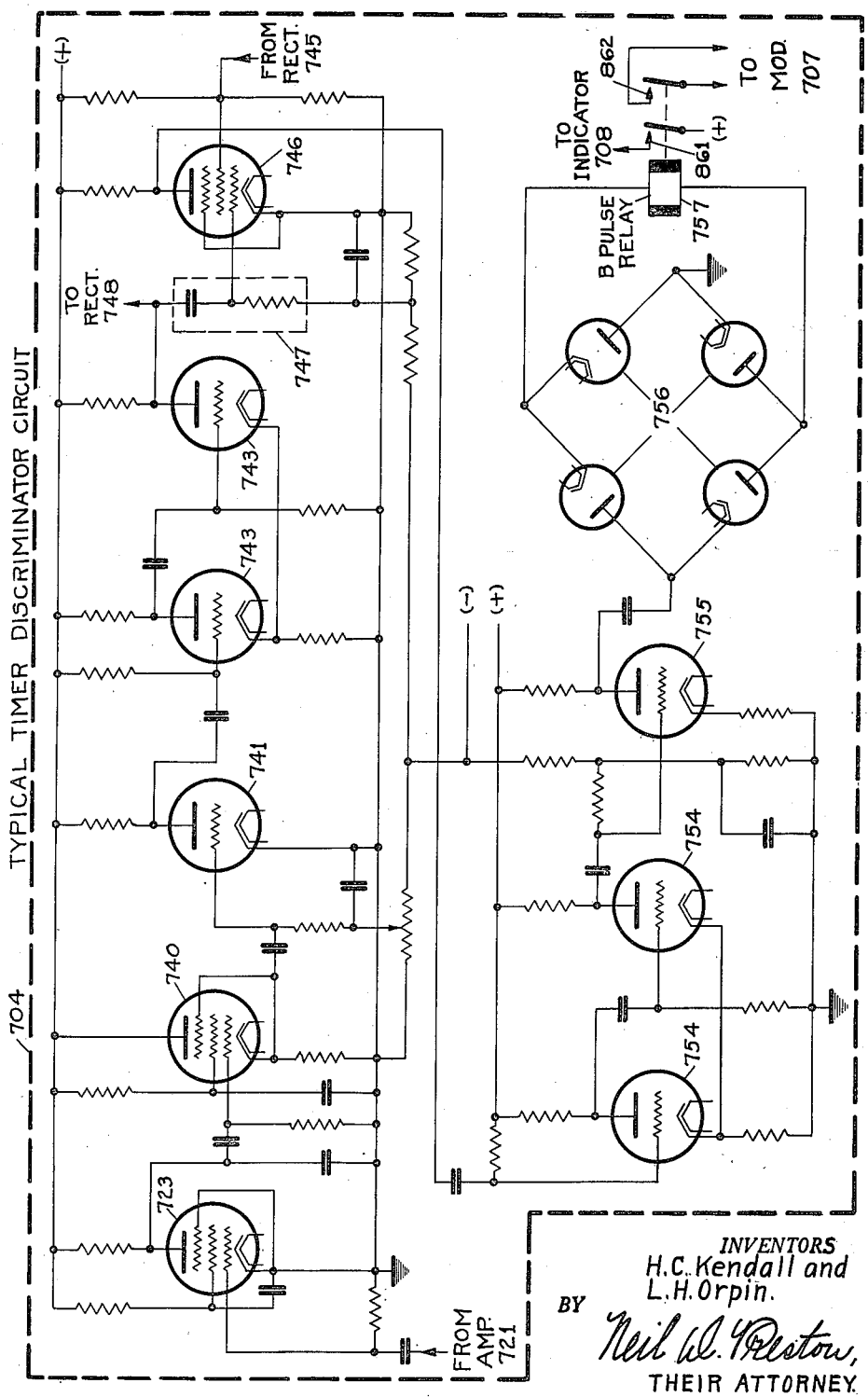

March 11, 1952 H. C. KENDALL ET AL 2,588,930
AIRWAY TRAFFIC CONTROL SYSTEM
Filed April 22, 1947 36 Sheets-Sheet 29

INVENTORS
H.C. Kendall and
L.H. Orpin.
BY
THEIR ATTORNEY.

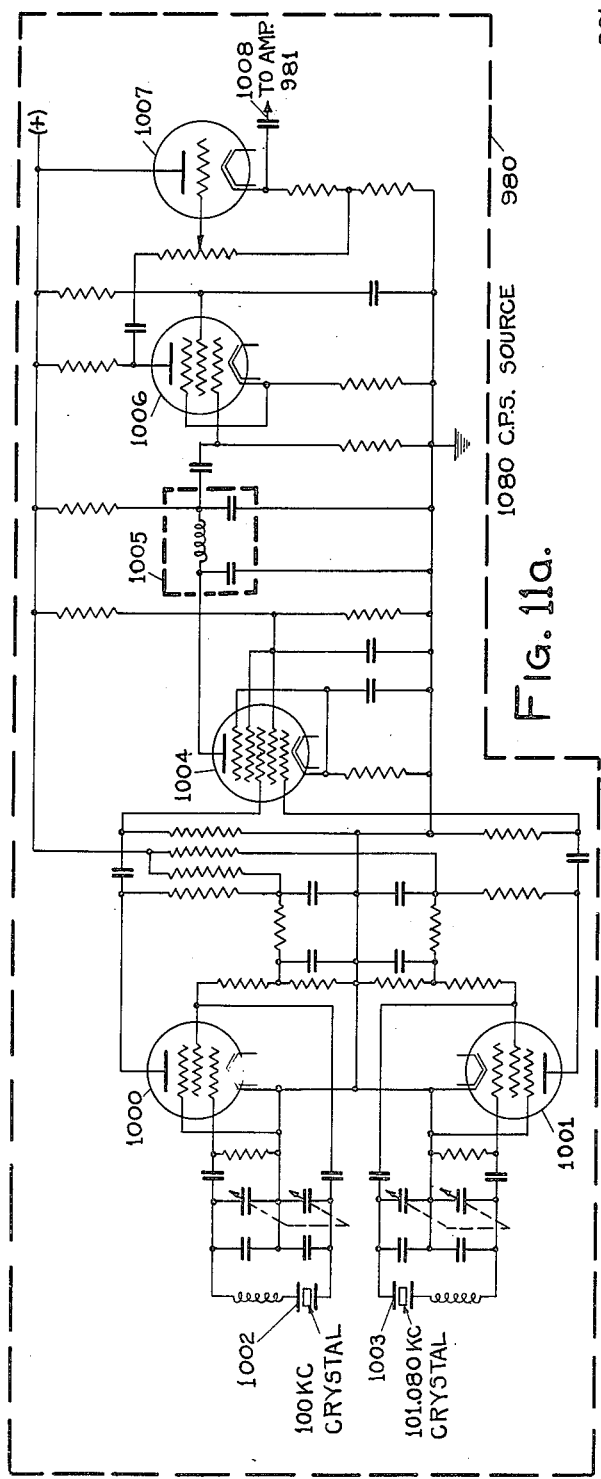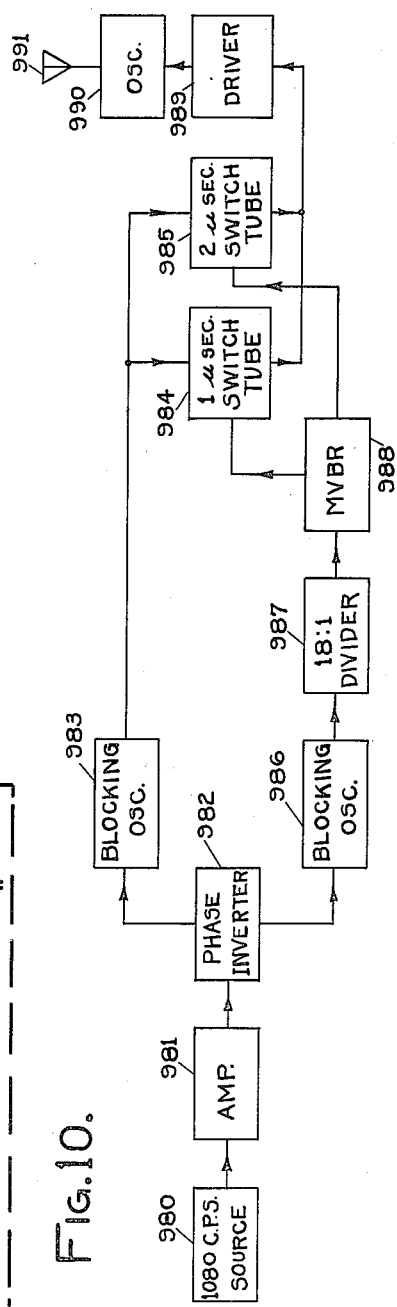

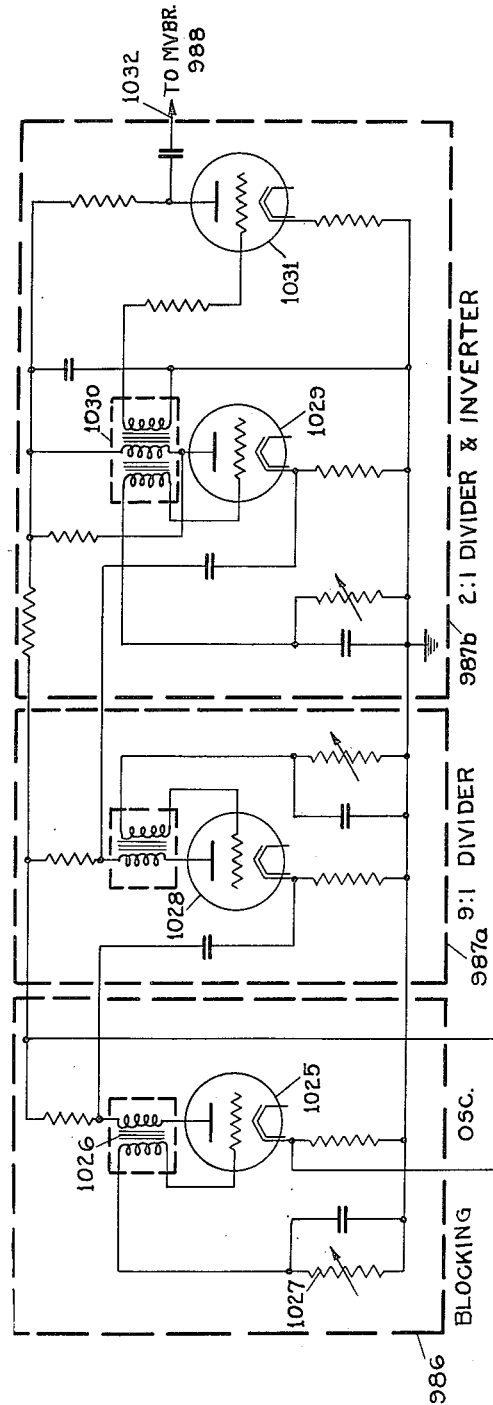
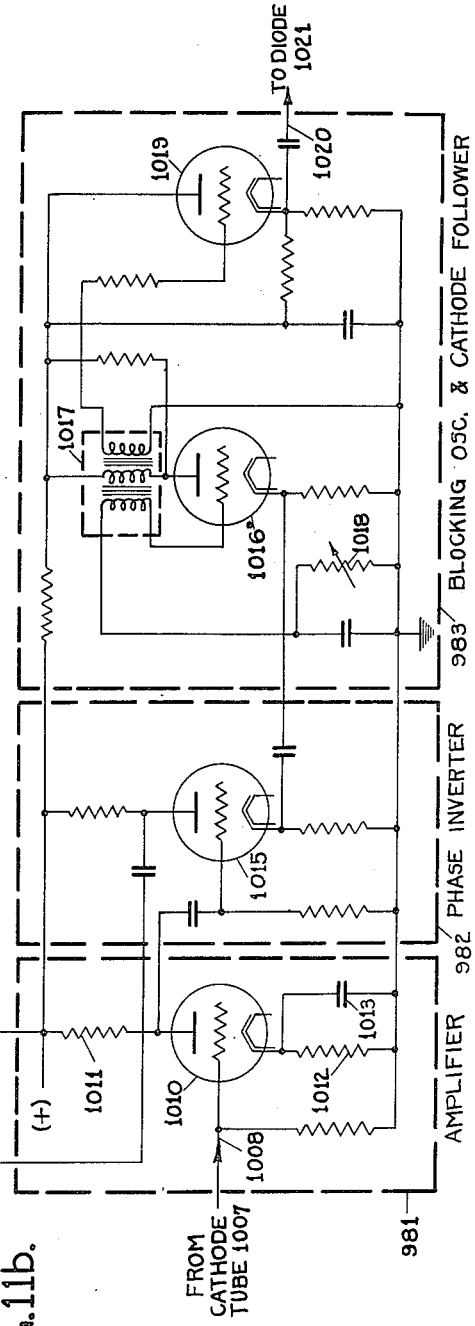

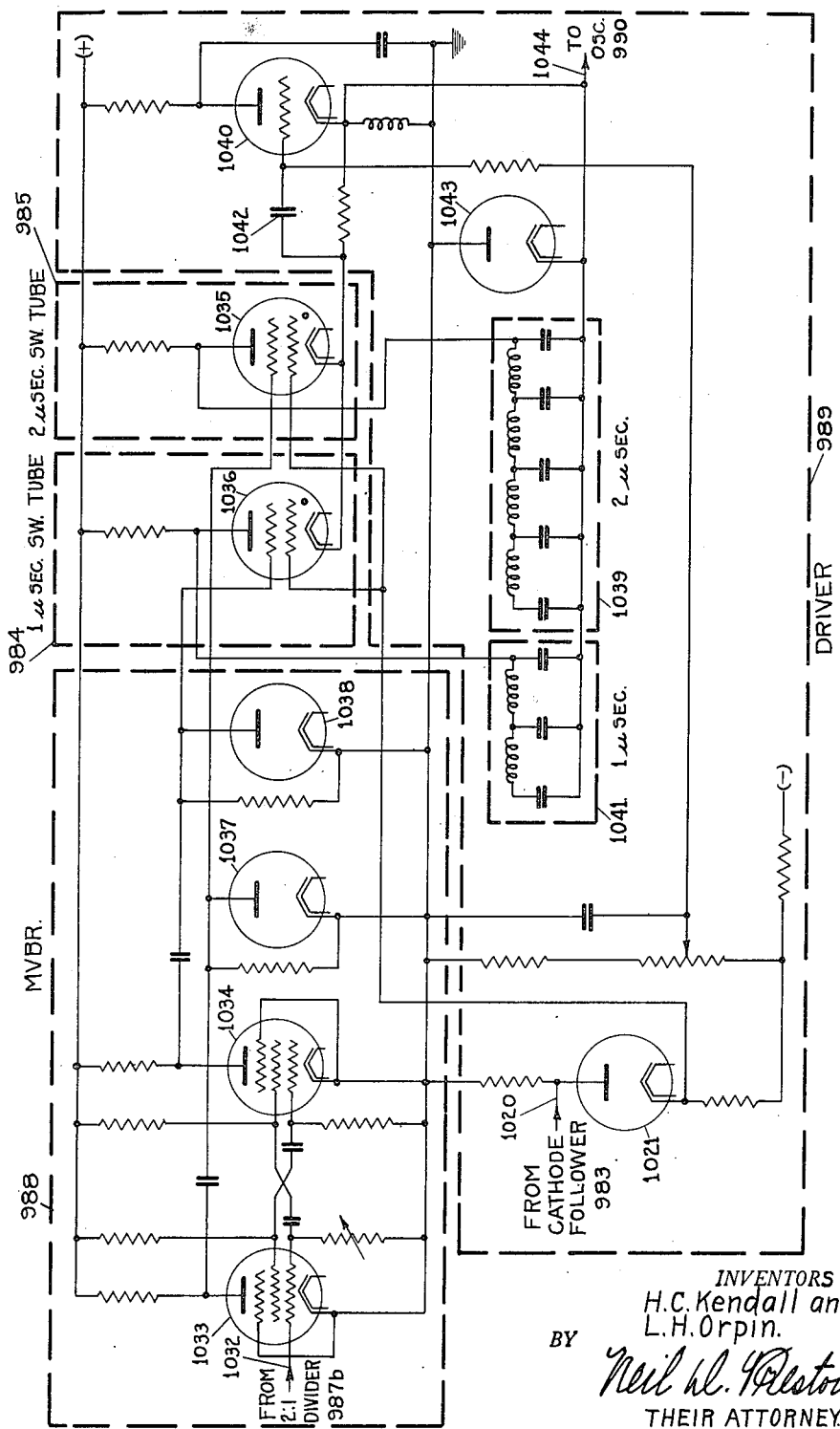

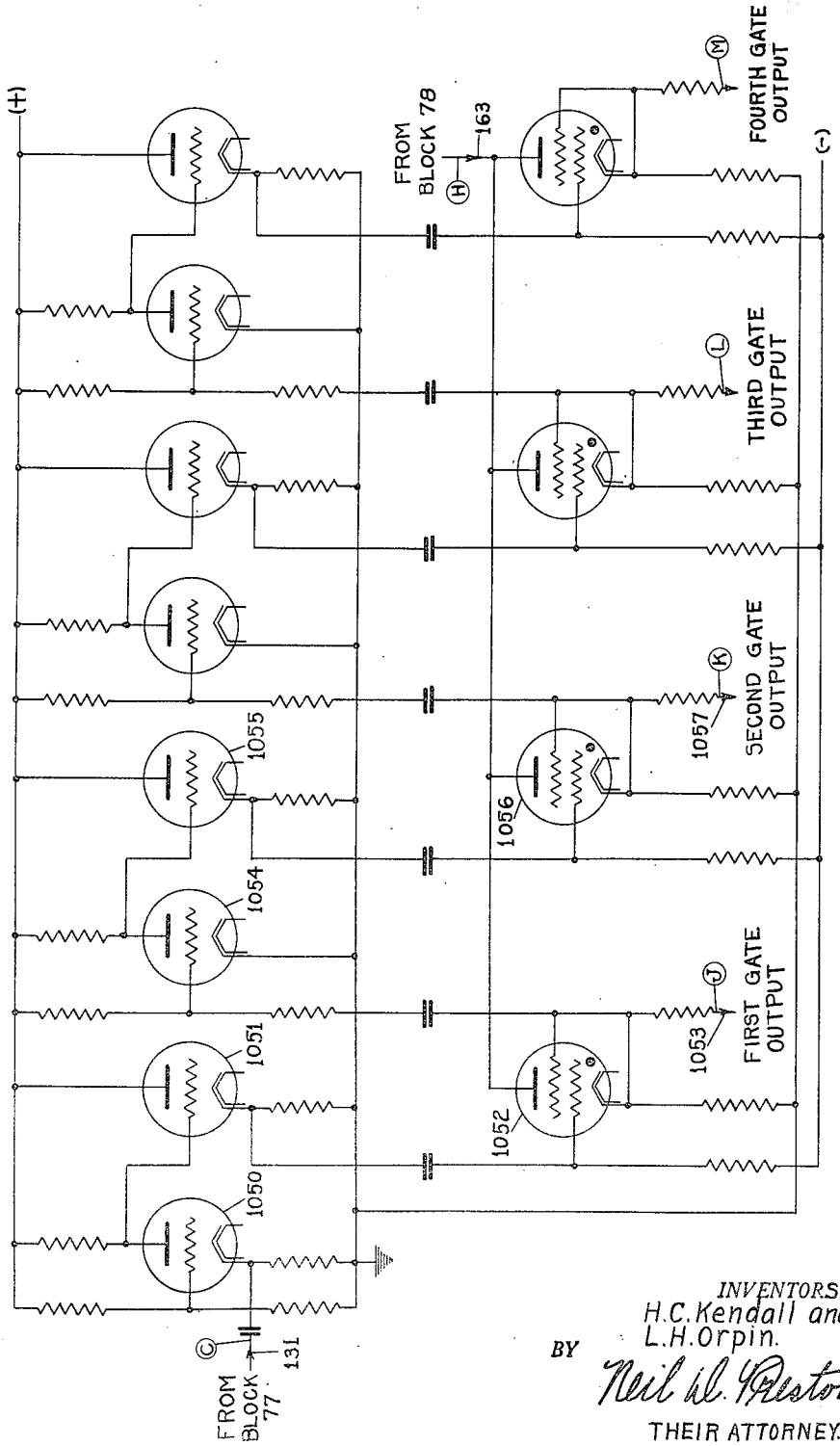

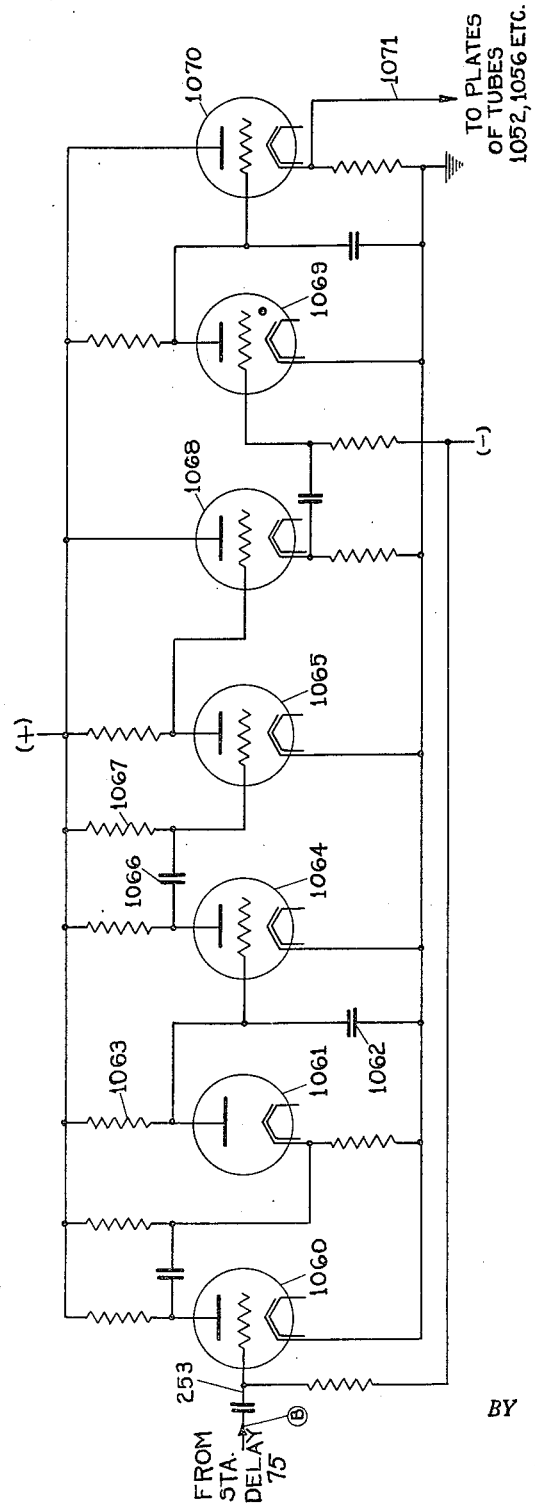

Patented Mar. 11, 1952

2,588,930

UNITED STATES PATENT OFFICE 2,588,930

AIRWAY TRAFFIC CONTROL SYSTEM

Hugh C. Kendall, Rochester, and Lionel H. Orpin, Greece, N. Y., assignors to General Railway Signal Company, Rochester, N. Y.

Application April 22, 1947, Serial No. 743,046

75 Claims. (Cl. 343—6)

This invention relates to control systems particularly adapted to airway traffic control for detecting the presence of and communicating with aircraft at distinctive altitude zones within predetermined boundaries, wherein signals in the cabin of the aircraft indicate information and distinctive traffic conditions at one or more altitudes.

This application is a continuation-in-part of application Serial No. 672,750, filed May 28, 1946, for an Airway Traffic Control System, now abandoned.

The rapid increase over the past decade in the number of commercial air lines and the consequent increase in the number of aircraft now flying along the air lanes has demonstrated that some means must be provided for a regular regulated control of aircraft traffic along the air lanes during every sort of weather condition which must work as well at night as by day. The present invention divides each air lane up into separate and distinct "blocks." Each "block" is further horizontally divided by horizontal boundaries into strata or altitude zones. Associated with each "block" is a control ground station, and each aircraft carries associated equipment so that communication may be had by radiant energy means between each aircraft and the nearest ground station. Further, visual and/or audible signalling is provided within each aircraft for ease in determining air lane traffic conditions for that aircraft. Another problem presented by aircraft traffic is that of congestion at the intersections of various air lanes and at airports at the terminations of the air lanes, and the present invention is adapted to handle aircraft traffic problems in the air space around an airport or other congested area as well as along an air lane.

Accordingly, one object of this invention is to divide an air lane into finite "blocks" or zones defined by definite boundaries for the purpose of airway traffic control along the air lane.

Another object of this invention is to provide a selective detection and communication system for determining the location of all aircraft within a particular area, coordinating this information, and communicating to each aircraft within the area the information pertinent to its proposed course of travel.

Another object is to divide an air lane into a number of finte "blocks," provide a selective detection and communication system for each "block" for determining the location of all aircraft within that "block," coordinating this information, and communicating to each aircraft within the "block" the information pertinent to its proposed course of travel.

Still another object is to provide a selective detection and communication system for radiating pulses of energy into the atmosphere to aircraft provided with suitable apparatus for responding therewith.

A further object is to divide an air lane into finite "block" and provide selective detection and communication systems for each "block" for radiating pulses of energy into the atmosphere to aircraft within the "block" which are provided with suitable apparatus for responding therewith.

A further object of this invention is to provide a selective detection and communication system adaped for airway traffic control in which a plurality of ground stations transmit pulses of radiant energy substantially simultaneously into the atmosphere, each aircraft in the vicinity of these ground stations receiving the pulses from the nearest station and transmitting a corresponding pulse to the ground to identify the aircraft, additional pulses then being radiated from the ground station nearest the aircraft to convey information regarding traffic conditions in the atmosphere adjacent the aircraft and/or travel instructions.

A still further object of this invention is to provide a selective detection and communication system adapted for airway traffic control in which a plurality of ground stations transmit pulses of radiant energy into the atmosphere, these pulses being so timed with relation to one another that corresponding pulses from adjacent ground stations appear simultaneously at block boundaries between adjacent stations, each aircraft in the vicinity of these ground stations receiving the pulses from the nearest station and transmitting in response thereto corresponding pulses to the ground to signify the presence of the aircraft, additional pulses then being radiated from this nearest ground station to the aircraft to convey information regarding traffic conditions in the atmosphere adjacent the aircraft and/or travel instructions.

Other and further objects will appear during the course of the following description when taken with the accompanying drawings in which:

Fig. 1b is a plan view from above of Fig. 1a;

Fig. 2 is a graphical representation with respect to time of certain pulses associated with the operation of the embodiment of Fig. 1a;

Fig. 3 is a graphical representation in three dimensions of Fig. 2;

Figs. 4a and 4b show a block diagram of one ground station equipment;

Figure 6A:
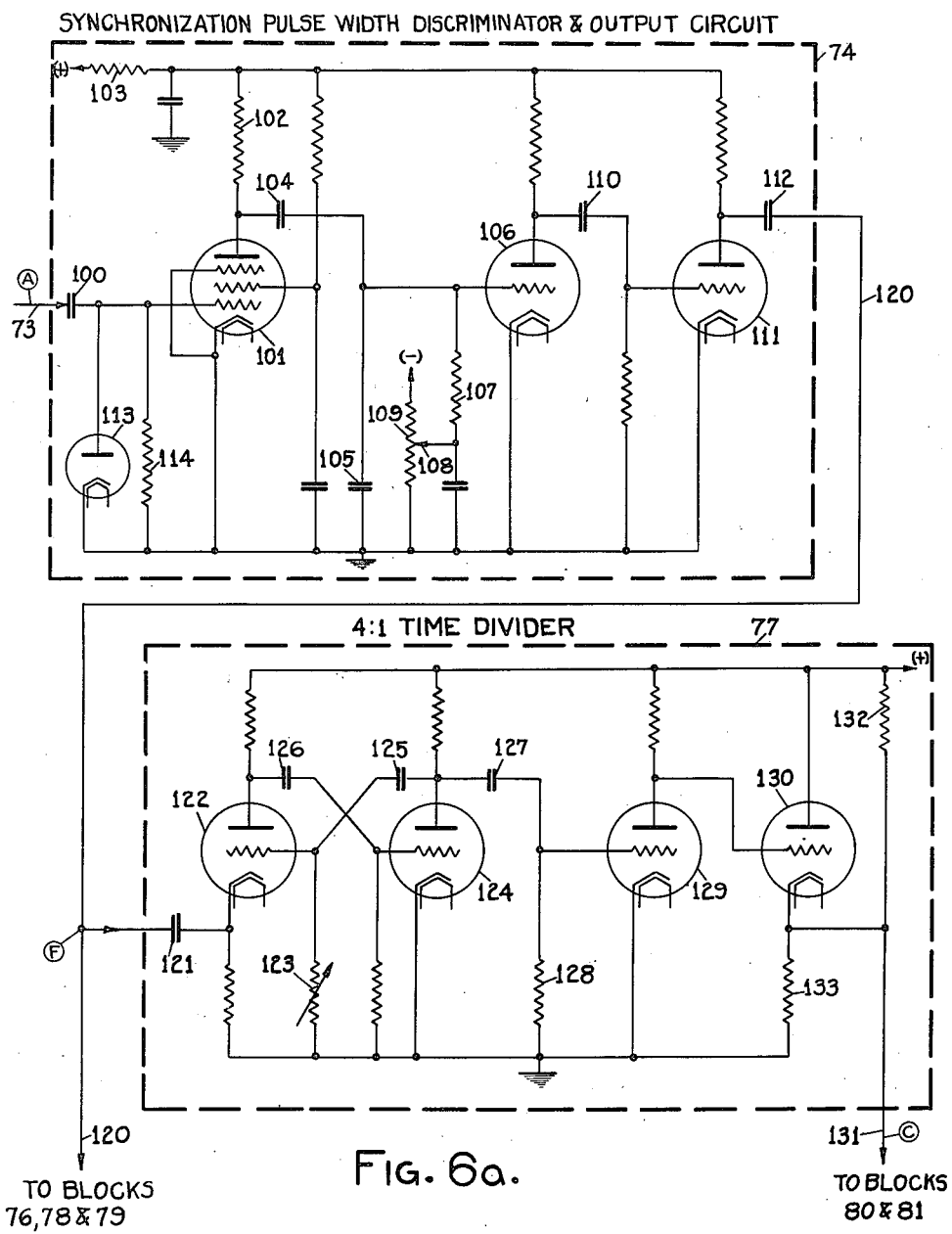
Figure 7A:
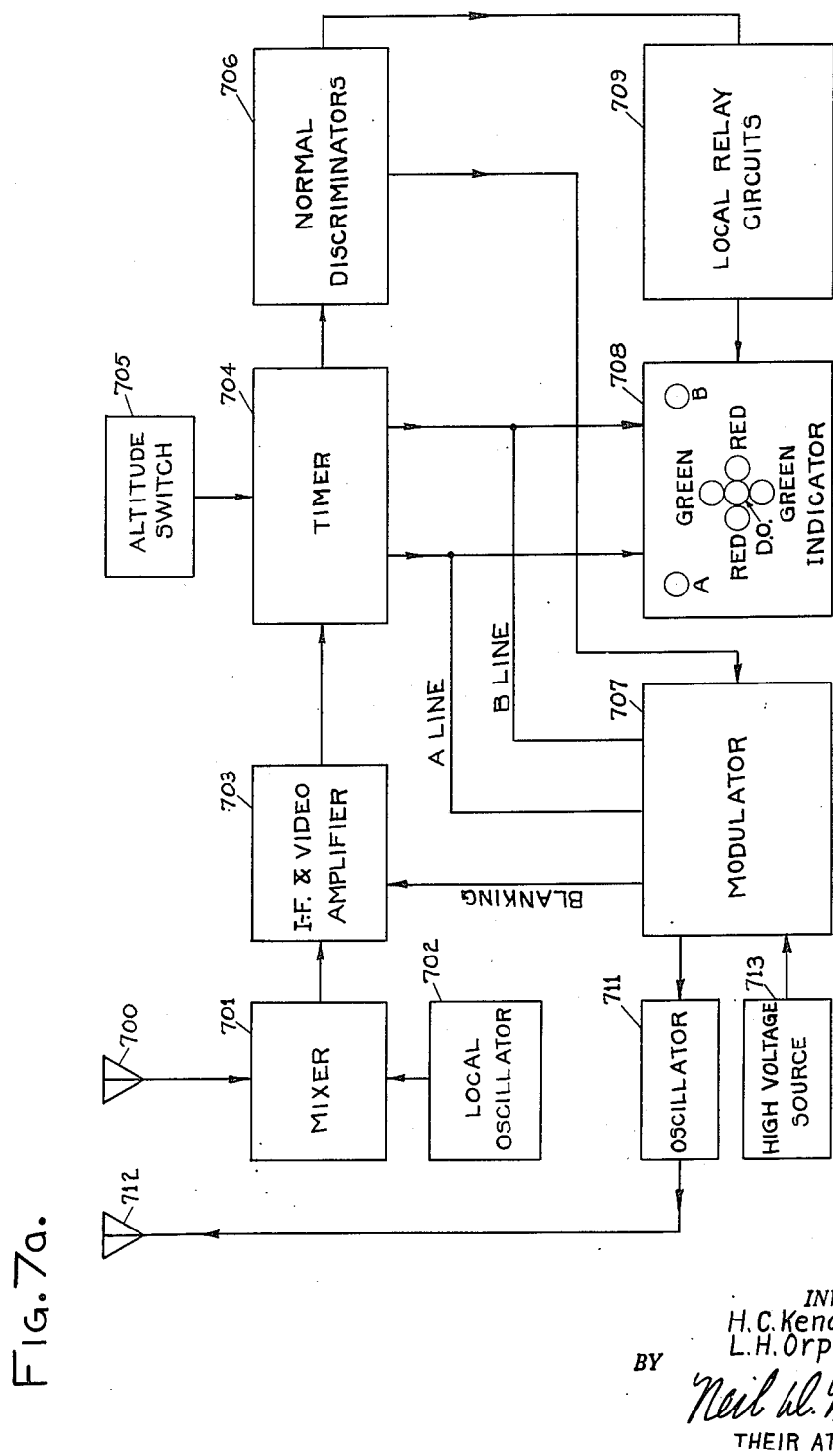
Figure 8A:
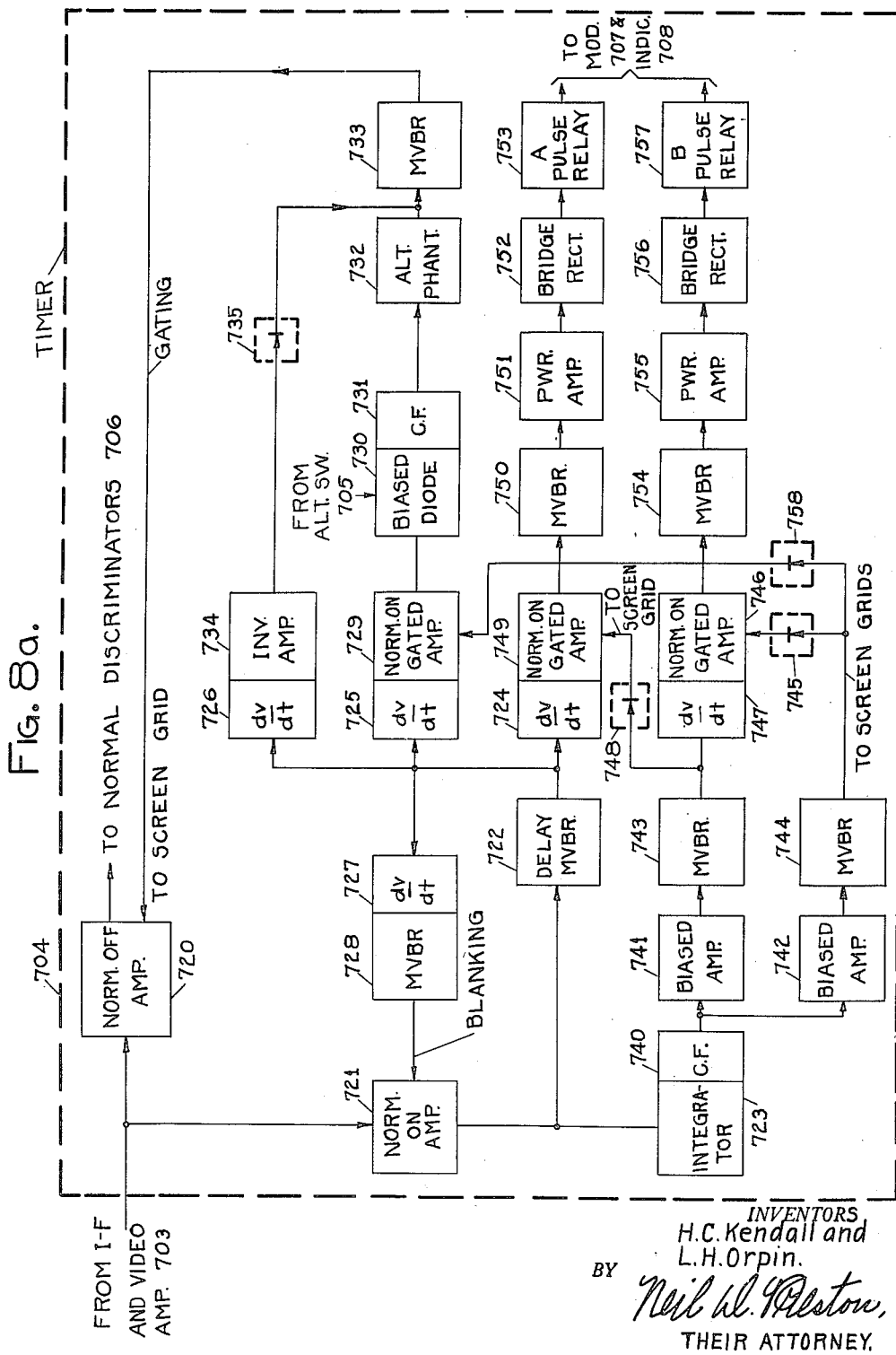

Figs. 5a, 5b, 5c, and 5d are graphical representations with respect to time of the waveforms associated with the operation of the ground station of Figs. 4a and 4b;

Figs. 6a through 6n are detailed circuit diagrams of the embodiment shown in block diagram form in Figs. 4a and 4b;

Figs. 7a and 7b show alternative embodiments of the airborne equipment in block diagram form;

Figs. 8a, 8b, and 8c illustrate in more detailed block diagram form certain of the airborne equipment circuits;

Figs. 9a through 9h are detailed circuit diagrams of the embodiments shown in block diagram form in Figs. 7a and 7b and 8a, 8b, and 8c;

Fig. 10 is a block diagram of a master timer adapted to control the ground stations;

Figs. 11a, 11b, and 11c are detailed circuit diagrams of the embodiment shown in block diagram form in Fig. 10;

Fig. 12 shows an alternative successive gate generator adapted for use in the system; and, Fig. 13 shows the detailed circuit of a delay 1080 c. p. s. gate circuit adapted for use in the system.

Figure 1A:
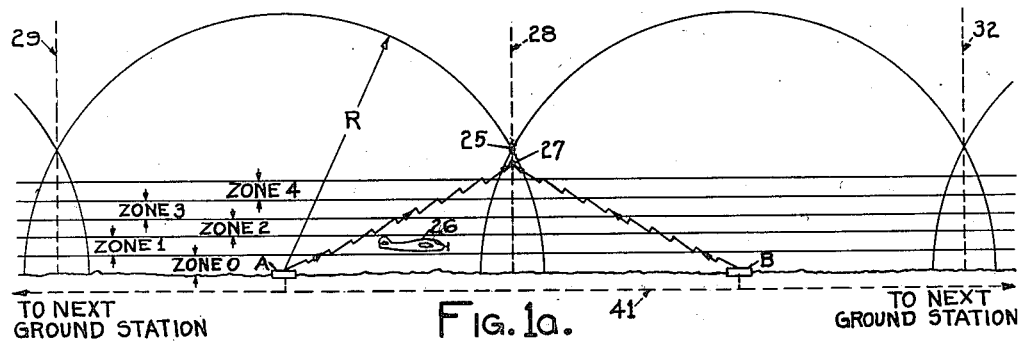
Fig. 1a is an elevation view illustrating one of the principles upon which one embodiment of this invention operates.

Fig. 1a illustrates one of the principles upon which this invention operates. Ground stations A and B located some distance apart are adapted to transmit simultaneously pulses of radiant energy at the same frequency. Since electromagnetic energy is propagated through space at a speed of 186,000 miles per second, it takes a given pulse of energy 5.36 millionths of a second or microseconds ($\mu$s.) to travel one mile. This is a finite and measurable length of time, and, therefore, use can be made of the fact that the range of an object from a given pulse source is directly proportional to the length of time taken by a pulse to traverse the distance to the object and back to the source, assuming that the pulse transmitted to the object is reflected by the object itself in a manner similar to the well-known radar method of detection. An alternative method, used by this invention, is to provide apparatus at the object which transmits a reply pulse back to the pulse source whenever it receives a pulse therefrom, and range is then measured by the time elapsed between the transmission of the outgoing pulse from the pulse source and the reception of the reply pulse at the pulse source less the short inherent delay introduced by the reply apparatus at the object between the time of reception of the pulse and transmission of the reply pulse. By adjusting the receiving apparatus at the pulse source (in the embodiment here described, the ground station) so that reply pulses are received only for a limited time after the transmission of a pulse from the pulse source, each ground station will determine block boundaries in the form of hemispheres of radius R as illustrated, this radius being adjusted to be approximately one-half the distance between the ground station and the next adjacent ground station. As shown, and as will be discussed more fully hereinafter in connection with Fig. 1c, it is desirable to make this radius slightly longer than one-half this distance so that adjacent hemispheres overlap at a point higher than the uppermost altitude with which communication is desired, as at point 25. This will cause some overlap between adjacent blocks, shown greatly exaggerated in Fig. 1a, but as will be pointed out hereinafter, this overlap has no effect in operation. To aid in the explanation of the operation of the system, part of each hemisphere shown has been divided into four distinct altitude zones numbered respectively 1 through 4, the space between zone 1 and ground being designated as zone 0, and an aircraft 26 is shown flying in altitude zone 1 in block A.

One possible path for the pulses radiated simultaneously from ground stations A and B is shown by the zigzag lines ending at point 27 equi-distant between stations A and B as indicated by zone boundary 28. In order to adequately identify adjacent ground stations near the zone boundaries, it is preferable to alternate the widths of synchronizing pulses transmitted by adjacent stations. For instance, station A might transmit a one microsecond pulse, station B a two microsecond pulse, station C a one microsecond pulse, station D a two microsecond pulse, etc. Any aircraft flying slightly to the left in Fig. 1a of zone boundary 28 would then receive a synchronizing pulse from station A slightly before a corresponding pulse from station B, since the two were transmitted simultaneously and each travel with the same speed through space. From this it follows that an aircraft at zone boundary 28 (for instance, at point 27) would receive both pulses simultaneously, and if to the right of zone boundary 28 it would receive the pulse from station B before that from station A. Thus, it is apparent that the overlap of adjacent ground station hemispheres at the lower altitudes is of no importance in operation since the first pulse received by an aircraft defines the block in which the aircraft shows occupancy, and it is only at a boundary line between two adjacent blocks that two pulses are received simultaneously. Indeed, this fact can be used to advantage to indicate to the aircraft the fact that it is leaving one block and entering another.

Figure 1B:
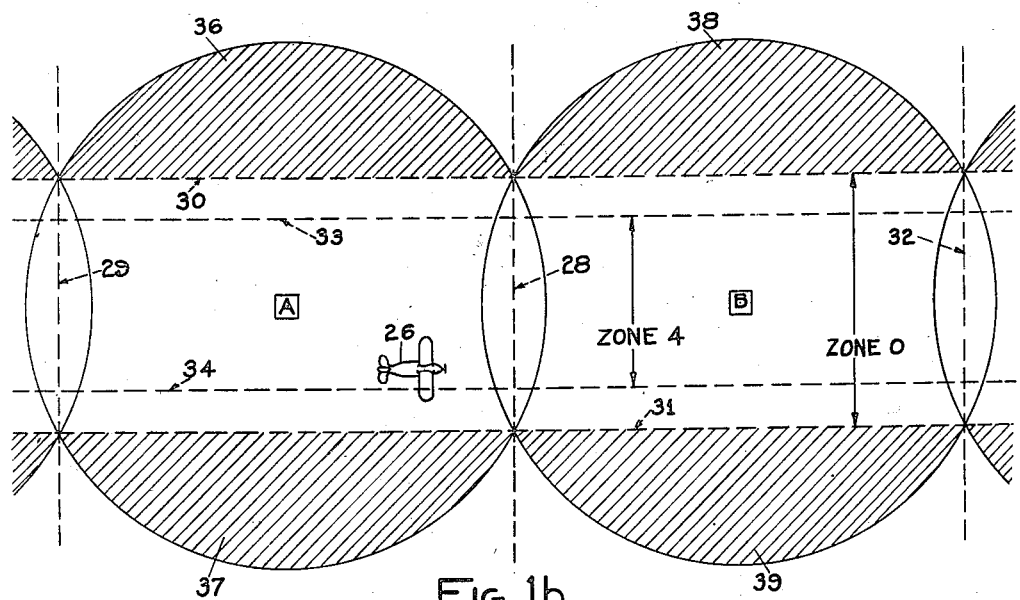
Figure 1C:
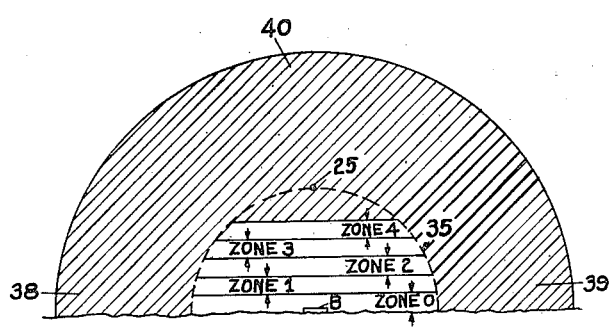
Fig. 1c represents figuratively the view that an operator of the aircraft shown in Fig. 1a has looking toward block B.

By simple geometric analysis it may be shown that an air lane may be divided according to this invention into approximately rectangular polyhedrons for any particular altitude zone. For example, as shown in Fig. 1b, altitude zone 0 is approximately defined by straight lines 28, 29, 30 and 31 for block A and straight lines 28, 30, 31 and 32 for block B, and altitude zone 4 by straight lines 28, 29, 33 and 34 for block A and straight lines 28, 32, 33 and 34 for block B. The difference in width of the altitude zones thus defined at different altitudes can best be explained by reference to Fig. 1c, which is the view that aircraft 26 figuratively has looking toward block B. Although, as above described, each block is defined as a hemisphere, the continuous air lane available to aircraft is limited by the proximity of the centers of the hemispheres and their respective radii, and if the radii are made greater than half the distance between the centers of the hemispheres (assuming hemispheres of equal size) this continuous air lane thus defined takes the form of a demicylinder, as outlined by dotted line 35 in Fig. 1c. Thus while it is desirable to space the ground stations of the system as far apart as possible in order to reduce the number of ground station equipments required, yet they must be close enough together to give adequate dependable operation and rapid change of intelligence regarding aircraft movement, and the block hemispheres must overlap sufficiently to insure altitude zones of adequate width at the highest altitude at which aircraft normally travel. Since commercial aircraft at present do not normally fly higher than two miles, one ground station arrangement might be with equal hemispheres or blocks of 10 mile radius spaced 19.1 miles apart center-to-center. These hemispheres would then intersect at a point (for example, point 25, Figs. 1a and 1c) three miles (15,840 feet) above the ground, the continuous air lane zone in the form of a demicylinder thus defined being six miles wide at ground level and only diminishing to 4.57 miles wide at an altitude of 10,560 feet (2 miles).

The shaded areas shown at 33, 37, 38, 39 and 40 (Figs. 1b and 1c) defined by the hemispheres of each particular block but lying outside the continuously defined altitude zones will not ordinarily be used by an aircraft flying along a regular air lane, but are useful in various other circumstances—for instance, in the case of an aircraft desiring to enter upon an established air lane.

It is apparent that all blocks need not be of the same length, although for purposes of simplicity of illustration and description the explanation thus far and the one which follows hereinafter will assume blocks of the same length. When the blocks are of less than the maximum length, delays in pulse transmission are created which cause the pulses transmitted from the ground station of the block having the shorter length to be delayed by such a time that the pulses of all the blocks arrive at their respective orbits simultaneously. For example, in Fig. 1a if block B were to be of lesser length than block A, transmission of a pulse from block B instead of occurring simultaneously with that of block A would be delayed after that from A by a length of time such that the pulse transmitted by station B and the corresponding pulse transmitted by station A would arrive at their respective hemispherical orbits simultaneously.

As is shown in Fig. 1a by dotted line 41, a communication system between ground stations is supplied, as for instance by line wires, so that information regarding aircraft within the block serviced by each ground station may be transmitted to any other ground station as desired.

Referring now also to Fig. 2, operation of the system will be described briefly with respect to one block. As is shown in line A of Fig. 2, a synchronizing pulse 50 (hereinafter called a synch pulse) is followed by a series of altitude or information pulses 51, 52, 53 and 54 delayed by times $t$, $u$, $v$, and $w$ respectively after synch pulse 50 for interval or scan I. Pulse 51 is intended to convey information to aircraft in zone 1, pulse 52 to zone 2, pulse 53 to zone 3, and pulse 54 to zone 4. In the embodiment of the system here explained, a synch pulse may be immediately distinguished by an aircraft from an information pulse because all synch pulses from a particular ground station are of the same width, which is always different than that of any information pulse. When these pulses are radiated from ground station A (Fig. 1a) they will all eventually arrive at aircraft 26. Apparatus in aircraft 26 will receive synch pulse 50 and then disable itself for a time interval corresponding to the time delay between pulse 50 and the pulse intended to convey information to the particular altitude at which the aircraft is flying. This disabling is governed by a timing device including an altimeter. While in this example information pulse 51 has been chosen as corresponding to zone 1 for purposes of simplicity, it should be obvious that by proper timing methods any pulse could be made to correspond to any particular altitude zone. At time $t$ after synch pulse 50 was received, the apparatus in aircraft 26 is enabled or turned on again in time to receive pulse 51 and immediately thereafter disabled again until it is time for another synch pulse to be received. After receiving pulse 51, supplementary apparatus in the aircraft may transmit a reply pulse 55, shown in line B of Fig. 2, back to ground station A. Some microseconds later (dependent upon the length of radius R and the circuit constants of the system) scan II starts, and another synch pulse 56 is transmitted from ground station A, followed by altitude pulses 57, 58, 59 and 60, each altitude pulse being delayed by the same amount of time as the corresponding altitude pulse in scan I, but each pulse not necessarily being of the same width as in scan I. Again, pulse 57 is intended to convey information to aircraft in zone 1, pulse 58 to zone 2, pulse 59 to zone 3, and pulse 60 to zone 4. The same process of reception of the synch pulse 56 and only the proper altitude or information pulse 57 by aircraft 26 and transmission of a reply pulse 61 is repeated. Scans III and IV of lines A and B (Fig. 2) follow, again with each synch pulse being followed by a series of regularly spaced altitude pulses, each altitude pulse for a particular altitude zone being delayed by a predetermined time after its synch pulse, but each altitude pulse of a particular scan not necessarily being of the same pulse width as that of the preceding scan, although it may be. As will be more fully discussed hereinafter, the reply pulses from the aircraft may be coded for various purposes also. Thus the aircraft may reply with pulses of one width to altitude pulses from one ground station and with pulses of another width to altitude pulses from the next station along the air lane, and the coding may be arranged so that the aircraft does not reply to some altitude pulses at all.

The use of these pulses of various widths to convey coded information to an aircraft is graphically represented in three dimensions in Fig. 3. In order to identify the different scan periods, the system can be arranged so that distinctive widths are used during each scan. For instance, pulse widths, 1, 2, or 3 might be transmitted during scan I, pulse widths 4, 5 or 6 during scan II, etc. As shown in scan I of Figs. 2 and 3, information or altitude pulses 51, 52, 53 and 54 sent successively to altitude zones 1, 2, 3 and 4 respectively, are all of the same width. Scan II then ensues as indicated by following the dashed lines of Fig. 3, with information pulses 57, 58 and 60 being of the same width and pulse 59 being slightly wider, all the pulse widths of scan II being different from that of scan I. Scan III follows next, starting with pulse 62, and finally scan IV, beginning with pulse 63. By inspection of Figs. 2 and 3, it is thus seen that distinctive coded information in accordance with this invention may be transmitted to a plurality of altitude zones within a particular block, a single ground station such as is here described thus having great utility for directing air traffic in a congested area such as around an airport.

While in the example there has been illustrated a code involving four scans and four altitude zones, it is apparent that the number of scans and/or altitude zones may be increased or decreased at will according to the requirements of the individual system. Also, the pulse widths are shown as being increased for each successive scan, but this is purely arbitrary and can also be changed at will.

As above-indicated, the use of two or more ground stations requires some timing means to synchronize the pulsed output of the individual stations. This may be by means of a master timer located at one ground station and connected to other stations by line wires similar to those indicated by dotted line 41 in Fig. 1 for conveying block information from one ground station to another, or may be by means of radio links between ground stations as will be described hereinafter in connection with the detailed circuit explanation of one embodiment of the invention. Since it requires a finite time for timing information to travel from one ground station to another, some means of delay must be provided at each individual ground station except the last of a system between the time of reception of a timing signal and the transmission of a synch or information pulse if all stations are to transmit corresponding pulses simultaneously. For example, if in Fig. 1a the master timer was located at ground station A, it would be necessary to insert a delay in the transmitter at station A equal to the time required for the synchronizing signal to travel from station A to station B. Thus, at one instant the master timer at station A would send out a synchronizing signal which would be immediately received by the transmitter of station A and there delayed by the delay device inserted therein until the instant that the synchronizing signal was received by station B, thereby allowing the synchronizing pulses from stations A and B to be transmitted simultaneously as required by the system operation previously described.

In Figs. 4a and 4b is shown in block diagram form a ground station for transmitting and receiving information in a sequence code to a plurality of altitude zones. Block 70 represents the synchronization receiver and block 71 the synchronization transmitter, each being of conventional design. Signals from the master timer (not shown here) are received at the individual ground station by antenna 72 of receiver 70 and conveyed along line 73 to pulse width discriminator 74, adjustable station delay 75, and trigger circuit 76. Trigger circuit 76 actuates transmitter 71, which merely repeats the synchronizing signal received for transmission to the next ground station along the air lane. As previously discussed, station delay 75 is adjusted such that signals from this ground station will be transmitted simultaneously with those of every ground station if all blocks are of the same length or such that corresponding signals from each two adjacent ground stations will reach the block boundaries therebetween simultaneously if the blocks are of unequal lengths. The output from discriminator 74 is fed to another input of trigger circuit 76, a 4:1 time divider 77, a 16,500 microsecond gate generator 78, and a 16,666 microsecond saw-tooth generator 79. The output of divider 77 is fed to a 66,666 microsecond saw-tooth generator 80 and a 66,500 microsecond gate generator 81, the outputs of generators 80 and 81 in turn being fed to block 82 which includes the sequencing gate circuits. One output of generator 78 is fed to block 82 and to blocks 83 and 84, the latter two blocks including the altitude occupancy gate circuits and occupancy and double occupancy detection circuits respectively. A second output of generator 78 and the output of generator 79 are fed to block 85, which includes the altitude gate circuits. The output of block 85 is fed to block 8, which includes the sequencing and signal pulse selection circuits and to another input of block 83. The output of block 82 is fed to block 87, which includes the signal relay circuits, to another input of block 84, and to normal pulse forming circuits 88 of pulse transmitter 89. The output of block 86 is fed to a second input of normal pulse forming circuits 88 and to pulse forming circuits 90 of transmitter 89, and a portional synchronizing output from modulator 91 of pulse transmitter 89 is fed to occupancy receiver gate circuit 92 and to another input of block 83. The output of block 92 is used to control the operativeness of I-F amplifier 93 of occupancy receiver 94, the output of this receiver being fed through pulse width discriminator 95 to receiver output switch 96. Pulse transmitter 89 and occupancy receiver 94 are both of conventional design as indicated. The two outputs of receiver output switch 96 are fed to block 84, whose output in turn controls block 87. Block 87 is connected by means of line 41 (see also Fig 1a) to the line wires for the transmittal of information between different ground stations, and a second output of block 87 is connected to block 86. Adjustable station delay 75 is connected to a third input of block 86 and the output of block 83 is connected to detection circuits 84.

Figs. 5a through 5d show the waveforms pertinent to the operation of the embodiment shown in Figs. 4a and 4b, assuming a four sequence code being used to receive and convey information to two altitude zones, and the encircled capital letters on Figs. 4a and 4b indicate the points at which the waveforms shown in lines A through BB of Figs. 5a through 5d appear. These waveforms are not drawn to scale, although important relative time relationships are shown, and all waveforms are shown as positive although in actual operation of the embodiment described some are negative. Line A shows a series of 2 microsecond synch trigger pulses $$\frac{10^6}{60}$$

or approximately 16,666 microseconds apart, each separated by seventeen regularly spaced 1 microsecond altitude trigger pulses which are $$\frac{10^6}{1080}$$

or approximately 926 microseconds apart. These trigger pulses are the ones received by synchronization receiver 70 and similar pulses are retransmitted by synchronization transmitter 71. It is obvious that a small delay will be introduced between the time of reception of the triggers by receiver 70 and retransmission by transmitter 71, but this difference is of no importance in the overall operation of the system and can be taken care of by proper adjustment of the adjustable station delays at each ground station. Hence for simplicity in this explanation it is being disregarded. Line B shows these same trigger pulses, all now converted to 1 microsecond pulses and delayed by adjustable station delay 75 by 500 microseconds, which is assumed for this example to be the delay necessary to be introduced at this particular ground station. This delay is adjustable from 100 to 900 microseconds at each ground station and is set when the air lane network is originally established, not being changed thereafter unless the master timer station is relocated. Discriminator 74 rejects the one microsecond trigger pulses of line A, passing only those which are more than one microsecond long, or in other words, passing only the synch trigger pulses shown in line A. Line C shows the output of 4:1 time divider 77, the sequence scan triggers which are respectively coincident with the first of each four successive synch triggers received, these sequence scan triggers being located approximately 66,666 microseconds apart. They trigger 66,666 microsecond sawtooth generator 80 and 66,500 microsecond gate generator 81 into operation to produce the 66,666 microsecond sequence scan saw-tooth shown in line D and the 66,500 microsecond sequence scan gate shown in line E, respectively. This 66,500 microsecond gate reaches its maximum value approximately 166 microseconds after the start of the 66,666 microsecond saw-tooth of line D. The output of discriminator 74 is shown in line F, consisting of a pulse coincident with each 2 microsecond synch trigger pulse of line A, and in line G is shown the output of block 79, this being in the form of altitude scan saw-tooth waves, each 16,666 microseconds long. Line H shows the output of block 78, which is the same at both output terminals, and is in the form of voltage gates of 16,500 microseconds duration, each voltage gate reaching its maximum value approximately 166 microseconds after the start of its corresponding 16,666 microsecond saw-tooth. The combination of the waveforms of lines D, E, and H are fed to block 82 and produce four separate outputs, shown in the block diagram of Fig. 4b by a single line for the sake of simplicity, these four outputs being represented by lines J, K, L and M of Figs. 5a and 5b. As indicated, each sequence gate output of block 82 is 16,500 microseconds long and the four occur one after the other in sequence, the start of each one being delayed approximately 166 microseconds after the previous one due to the delayed sequence gate triggers 16,666 microseconds apart which are utilized in the operation of block 82 as will be more fully described hereinafter and which are here shown in line I.

Lines N, O and P show respectively the three voltage gate outputs of altitude gate circuits 85, these three outlets being shown by a single line in Fig. 4b for the sake of simplicity. Line N shows the gates for the synch pulses, line O those for the first altitude zone pulses, and line P those for the second altitude zone pulses, this explanation being limited to two altitude zones for the sake of simplicity. Block 85 can, however, in the embodiment shown, have as many as fifteen voltage gate outputs corresponding to fifteen separate altitude zones, the maximum number being determined by the number of altitude trigger pulses sent out by the master timer between synch pulses. As shown in line A, there are seventeen of these altitude triggers between adjacent synch trigger pulses, but because of circuit considerations with regard to the time required to start the trigger circuits into operation and also to allow time to recover their normal state before another scan or interval starts, the altitude trigger pulse adjacent each synch pulse is not used, thus reducing the total available number to fifteen as above-stated. The particular altitude gates desired are chosen by means of adjustable manual controls contained in block 85 which bias switch tubes contained therein to provide a proper altitude gate output at the desired time as will be more fully described hereinafter in connection with the detailed circuit description.

For purposes of explanation, arbitrary four sequence codes have been chosen for altitude zones 1 and 2, that for zone 1 being normal-normal-6-6 and that for zone 2 normal-normal-normal-normal. By "normal" is meant the particular pulse width corresponding to the particular code sequence. In other words, assume that pulse width No. 1 characterizes the first code sequence, pulse width No. 2 the second, pulse width No. 3 the third, and pulse width No. 4 the fourth. For any code sequence, pulse width No. 5 or pulse width No. 6 may be substituted for the normal pulse, however, thus giving thirty-one possible code combinations if widths No. 5 and No. 6 are not mixed in any one code combination. In this explanation it is assumed that the normal-normal-normal-normal code is sent up to any altitude zone which is believed by the ground station to be unoccupied and which has a clear travel course. The code sent to an occupied altitude zone which has a clear travel course will be normal-normal-5-5 until the reception of this code by the aircraft is checked back to the ground station, and then this code will change to normal-normal-6-6 to show the aircraft that the ground station knows of its presence and that the code was properly received and checked by the aircraft. This coding is controlled by block 87 which is actuated by information from line 41 and detection circuits 84. Block 87 controls one input to each coincidence or switch tube in block 86, the other inputs to these tubes comprising an altitude gate and the delayed triggers shown in line B. According to the inputs received by block 87 and 86, the output of block 86 will enable or turn on either normal pulse-forming circuits 88 or pulse-forming circuits 90 of transmitter 89. The output of pulse-forming circuits 90 is either a synchronizing pulse, a No. 5 pulse, or a No. 6 pulse and that of normal pulse-forming circuits 88 the normal pulse corresponding to the proper code sequence. A switch in block 90 controls whether synch pulses of A or B width are sent out, this switch being set at the time the ground station is initially put into operation and not being changed thereafter unless the station is relocated. Since this ground station was assumed to be an A station, this pulse-forming circuit 90 will provide only synch pulses of A width, and this output is shown in line Q (Figs. 5c and 5d). Line R shows the output of circuits 88 for the first code sequence, line S that for the second code sequence, line T that for the third code sequence and line U that for the fourth code sequence, these outputs being produced only if a normal pulse is being sent to the particular altitude zone. Line V shows the output of the No. 5 pulse-forming circuit of block 90 and its output is here indicated as dotted for the third and fourth code sequences to indicate the relative time at which these No. 5 pulses have previously been sent, it being assumed that in this example the presence of the aircraft has already been checked by the ground station as indicated in line W, which shows the No. 6 pulses which are sent to the first altitude zone during the third and fourth code sequences to indicate this check. Line X shows the output of transmitter 89, the capital letter A beside each synch pulse indicating that it is of A width and the numeral beside each altitude pulse indicating its particular width. Thus during the first code sequence an A synch pulse is sent out followed by a No. 1 pulse to the first altitude zone and a No. 1 pulse to the second altitude zone, during the second code sequence an A synch pulse followed by a No. 2 pulse to the first altitude zone and a No. 2 pulse to the second altitude zone, during the third code sequence an A synch pulse followed by a No. 6 pulse to the first altitude zone and a No. 3 pulse to the second altitude zone, and during the fourth code sequence an A synch pulse followed by a No. 6 pulse to the first altitude zone and a No. 4 pulse to the second altitude zone. A small trigger is abstracted from modulator 91 coincident with each output pulse from transmitter 89 and fed via the portional synchronizing output line to occupancy receiver gate circuit 92 and block 83 as above-mentioned. In block 83 this trigger is supplied to a coincidence or switch tube along with the 16,500 microsecond gate shown in line H and the particular altitude gate desired to produce an altitude occupancy gate. In this example, because this description is limited to two altitude zones, there are only two such switch tubes, resulting in two outputs from block 83, these being shown in lines Y and Z, Y corresponding to the first altitude zone and Z to the second. As indicated, these gates start coincident with their respective altitude output pulses from transmitter 89. These same small portional synchronizing triggers from modulator 91 when applied to occupancy receiver gate circuit 92 produce similar gates delayed by a fixed time after each altitude output pulse from transmitter 89, which are fed to I-F amplifier 93 to turn it on for a predetermined time after each pulse is transmitted, this predetermined time being fixed by radius R as above-described. The fixed time delay is made at least long enough to insure that I-F amplifier 93 will not be turned on until after the longest pulse that transmitter 89 can produce has ceased to be transmitted. The output of occupancy receiver gate circuit 92 is shown in line AA. Pulses transmitted by the aircraft in response to the altitude pulses from transmitter 89 after reception by receiver 94 and passage through discriminator 95 are channelled by receiver output switch 96 into one of its two outputs, depending upon whether it is the first or second such pulse received during a particular altitude occupancy gate. Discriminator 95 is inserted in the circuit in order to insure that only pulses of the proper width or widths are channelled to receiver output switch 96, as will be more fully discussed hereinafter. The pulse received from aircraft 26 is shown in line BB, and it will be noted that the aircraft responds in this example only to normal altitude pulses and not to synch pulses or altitude pulses of widths 5 or 6. Had there been a second aircraft in altitude zone 1, a second pulse would have been received by occupancy receiver 94 during the time of the first altitude occupancy gate and this would have been channelled by receiver output switch 96 into its second output to indicate double occupancy of an altitude zone to detection circuits 84 and thereby change the code sent to that altitude zone to warn both aircraft that they were simultaneously occupying the same altitude zone in the same block.

A detailed description of the circuits of the blocks shown in Figs. 4a and 4b and their operation will now be given with reference to Figs. 6a through 6n. Again, the encircled capital letters indicate the points at which the waveforms shown in lines A through BB of Figs. 5a through 5d appear. In Fig. 6a is shown the synchronization pulse width discriminator and output circuit 74 and 4:1 divider 77. The synchronization triggers received from the master timer at this ground station and available at line 73 are negative and are connected through coupling condenser 100 to the control grid of electron tube 101. The plate of this tube is connected to ground through condensers 104 and 105 in series and to a positive source of potential through plate resistor 102 and resistor 103 in series. The junction point of condensers 104 and 105 is connected to the grid of electron tube 106 and through resistor 107 to arm 108 of potentiometer 109, whose end terminals are respectively connected to a negative source of potential and ground. The plate of tube 106 is connected through coupling condenser 110 to the grid of electron tube 111, whose plate in turn is connected through coupling condenser 112 to the inputs of blocks 76, 77, 78 and 79. The control grid of tube 101 is also connected to ground through the parallel combination of diode 113 and resistor 114. The other circuit connections of block 74 are conventional as shown in Fig. 6a. Tube 101 normally is on or conducting due to its cathode being connected directly to ground and a negative input applied to its grid will turn the tube off, allowing condenser 105 to start charging up toward the potential of the positive potential source. By making the capacity of condenser 105 small in relation to that of condenser 104, the time constant for this charging path is controlled mainly by the resistance of resistor 102 and the capacitance of condenser 105. When the negative input to the grid of tube 101 is removed the tube again conducts, with the result that a saw-tooth wave is produced at the junction of condensers 104 and 105 whose peak amplitude is a measure of the length of time that the grid of tube 101 was negative, or in other words, a measure of duration of the negative input pulse applied to this grid. By adjustment of arm 108 of potentiometer 109, amplifier tube 106 can be biased so that it will conduct only for an input sawtooth whose peak amplitude exceeds a predetermined value. In the operation of the embodiment herein described this adjustment is made so that tube 106 will be turned on only for a sawtooth whose amplitude corresponds to an input pulse applied at the grid of tube 101 of 1.5 microseconds duration or greater. The output of tube 106 is inverted and amplified by tube 111 and then connected to blocks 76, 77, 78 and 79 as above-described by means of line 120. The purpose of diode 113 is to prevent grid current from flowing in tube 101 and also to prevent positive or negative "overshoots" when the negative impulse is removed from the grid. This pulse width discriminator of blocks 74 is described more fully and claimed in the application of Lionel H. Orpin for Pulse Duration Discriminator filed April 22, 1947, Serial No. 743,149, Patent No. 2,552,013, issued May 8, 1951. The output of line 120, which is positive, is applied through coupling condenser 121 to the cathode of electron tube 122, whose grid is connected to ground through variable resistor 123 and to the plate of electron tube 124 by means of coupling condenser 125. The grid of tube 124 is coupled back to the plate of tube 122 by means of condenser 126 and thus the combination of tubes 122 and 124 constitute a multivibrator. The plate of tube 124 is connected through a differentiating circuit consisting of small condenser 127 and resistor 128 to the grid of electron tube 129, whose plate in turn is directly coupled to the grid of electron tube 130. Tube 130 is normally off or nonconducting due to its cathode being returned to the source of positive plate potential through resistor 132 and to ground through resistor 133. Multivibrator tube 122 is normally conducting and each positive pulse from line 120 applied to its cathode has the same effect as a negative pulse applied to its grid, turning this tube off and turning tube 124 on very abruptly. The length of time that this condition continues is determined by the time constant of the multivibrator, which is controlled by variable resistor 123, and this is normally adjusted to be in the neighborhood of 60,000 microseconds. The negative gate output thus produced at the plate of tube 124 is differentiated by the combination of condenser 127 and resistor 128, resulting in a negative trigger pulse at the grid of tube 129 coincident with the leading edge of the 60,000 microsecond negative gate produced at the plate of tube 124. This negative trigger pulse is inverted and amplified by tube 129 and coupled as a positive pulse through tube 130, which acts as a cathode follower, to line 131 leading to blocks 80 and 81. Thus one positive pulse is produced at line 131 coincident with the first of each four pulses applied to line 120.

In Fig. 6b are shown the detailed circuits of blocks 78, 79, 80 and 81. The positive pulses from line 120 are connected through condenser 135 and resistor 136 in series to the grid of gas tube 137 of 16,666 microsecond saw-tooth generator 79. The junction point of condenser 135 and resistor 136 is connected through another resistor 138 to a negative source of potential so that tube 137 is normally off or nonconducting in the absence of a positive input at its grid. The screen grid and cathode of tube 137 are connected to ground and its plate is connected directly to the grid of electron tube 139 and through condenser 140 to ground. The plate of tube 139 is connected to a positive source of potential and the plate of tube 137 is connected through resistors 141 and 142 in series to the same positive source of potential. The junction point of resistors 141 and 142 is coupled through condenser 143 to output line 144 and to the cathode of tube 139. Each positive pulse applied to the grid of tube 137 causes it to be turned on or conduct, thus quickly discharging condenser 140 through tube 137. Condenser 140 then immediately starts to recharge toward the positive potential applied to the plate circuit of tube 137, resulting in a positive saw-tooth being applied to the grid of tube 139, the amplitude of this saw-tooth (16,666 microseconds) being controlled by the time constant of charge of condenser 140, which is fixed by the sizes of condenser 140 and resistors 141 and 142. A similar positive saw-tooth appearing at the junction of resistors 141 and 142 is coupled by condenser 143 to the cathode of tube 139, giving feed-back action to increase the linearity of the positive saw-tooth appearing at the cathode of tube 139 and line 144. The same positive pulses from line 120 are applied through condenser 150 and resistor 151 in series to the control grid of gas tube 152 of 16,500 microsecond gate generator 78, whose screen grid and cathode are connected together and to ground through the parallel combination of resistor 153 and condenser 154. The junction point of condenser 150 and resistor 151 is connected to a negative source of potential through resistor 155, and the same source of potential is connected to the cathode and screen grid of tube 152 through another resistor 156. The plate of tube 152 is connected to ground through condenser 157, to the grid of cathode follower 158 through resistor 159, and to the control grid of cathode follower 160 through resistor 161. The plates of cathode followers 158 and 160 are directly connected to a positive source of potential and the plate of tube 152 is connected to the same source of potential through plate resistor 162. The cathode of tube 158 is connected to blocks 82, 83 and 84 by means of line 163 and to a negative source of potential through cathode resistor 164. The cathode of tube 160 is connected to block 85 by means of line 165 and to ground through cathode resistor 166. By making the size of condenser 157 and resistor 162 each relatively small, the output at the plate of tube 152 is made a saw-tooth which reaches its maximum value very quickly after condenser 157 is discharged through tube 152 whenever a positive input pulse is applied to its grid, thus producing in effect positive voltage gates of 16,500 microseconds duration at the grids and cathodes of cathode followers 158 and 160. The circuit of 66,666 microsecond saw-tooth generator 80 is similar to that of 16,666 microsecond saw-tooth generator 79 except that the circuit constants are changed so that the time constant of charge of condenser 170 is made larger than that for condenser 140 in order to produce a 66,666 microsecond saw-tooth at line 171 in response to each positive trigger applied to saw-tooth generator 80 by means of line 131. 66,500 microsecond gate generator 81 is similar to 16,500 microsecond gate generator 78 except that since it produces only one output (at line 172), only one cathode follower 173 is required.

Figure 6C:
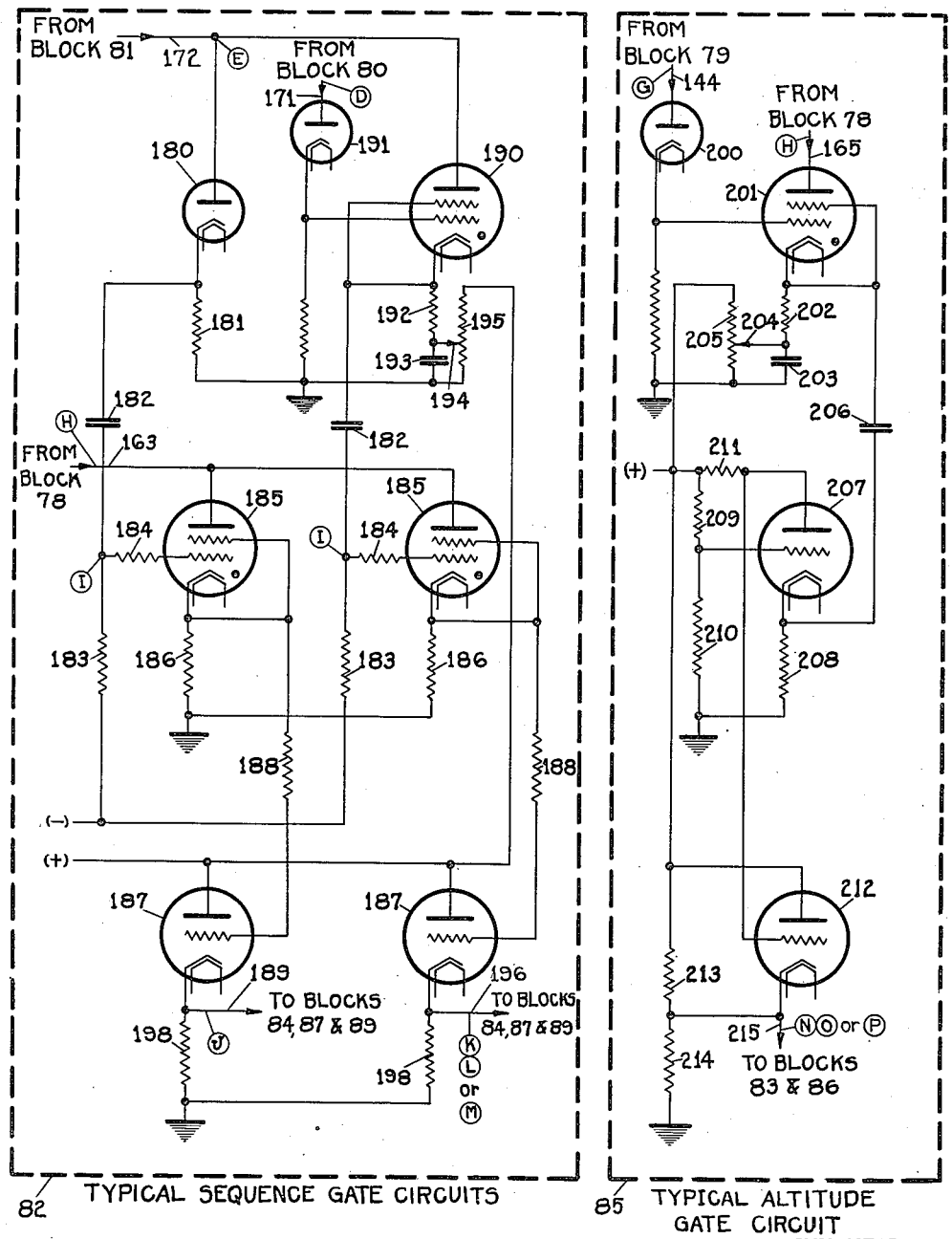

In Fig. 6c are shown only typical detailed circuits of blocks 82 and 85 since these blocks include a plurality of similar circuits, the exact number for block 82 depending upon the number of sequences in the code and the number for block 85 depending upon the number of altitude zones to which information is being conveyed. In block 82, line 172 from block 81 is connected to the plate of isolating diode 180, whose cathode is connected to ground through cathode resistor 181 and to one terminal of differentiating condenser 182. The other terminal of condenser 182 is connected through resistor 183 to a negative source of potential to complete the differentiating circuit, and the junction point of condenser 182 and resistor 183 is connected through another resistor 184 to the control grid of gas tube 185, whose plate is connected to line 163 from block 78. The screen grid and cathode of tube 185 are connected together and to ground through cathode resistor 186 and to the grid of cathode follower 187 through protective resistor 188. The plate of tube 187 is connected to a positive source of potential and its cathode is connected through cathode resistor 198 to ground, the output at the cathode of this tube being available at line 189. The circuit thus far described in block 82 constitutes the first sequence gate circuit which produces the waveform shown in line J of Figs. 5a and 5b. The rest of the circuit shown within this block in Fig. 6c is a typical circuit for producing a sequence gate such as that shown in line K, L or M (Figs. 5a and 5b). The components of this circuit which are similar to the components of the circuit for producing the waveform of line J are numbered identically with those. This circuit differs, however, in that a fourth tube, gas tube 190, has been added since sequence gates subsequent to the first must be started a predetermined time after the start of the 66,500 microsecond gate which initiates the action of the circuit to produce waveform J. Gas tube 190 has its plate connected to line 172 and its control grid is connected through isolating diode 191 to line 171 from block 80. The cathode and screen grid of tube 190 are connected together and to one terminal of another differentiating condenser 182. The cathode of tube 190 is also connected through resistor 192 and condenser 193 in series to ground, and the junction point of resistor 192 and condenser 193 is connected to arm 194 of potentiometer 195, whose end terminals are respectively connected to a positive source of potential and ground. The output of cathode follower 187 of this circuit is available at line 196 and will produce an output corresponding to line K, L or M (Figs. 5a and 5b) according to the setting of arm 194 of potentiometer 195. The ohmic value of resistor 192 is made small in order to prevent gas tube 190 from becoming a relaxation oscillator, and protective resistors 188 are inserted in the circuits in case of failure of gas tubes 185. The control grids of gas tubes 185 are returned to a negative source of potential through resistors 183 and 184 in series to insure that these tubes will not conduct even with voltage on their plates (due to the 16,500 microsecond gate from line 163) unless the grid is simultaneously raised by waveform I (Figs. 5a and 5b). The operation of the left-hand circuit of block 82 is as follows: The 66,500 microsecond gate applied through isolating diode 180 is differentiated by the differentiating circuit consisting of condenser 182 and resistor 183, resulting in a positive trigger (line I, Figs. 5a and 5b) appearing at the grid of gas tube 185 coincident with the leading edge of the 66,500 microsecond gate. Since the 16,500 microsecond gate of line 163 is applied simultaneously to the plate of tube 185, this tube will be turned on and continue to conduct until the voltage upon the plate is reduced at the end of the 16,500 microsecond gate. The result then is a voltage gate of 16,500 microseconds duration at the cathode of tube 185 which starts coincident with the leading edge of the 66,500 microsecond and 16,500 microsecond gates. This 16,500 microsecond gate is then coupled through cathode follower 187 and line 189 to blocks 84, 87 and 89. The same 66,500 microsecond gate from line 172 controls the plate voltage of gas tube 190 and this tube will fire at a time dependent upon the bias upon its cathode, determined by the setting of potentiometer arm 194, and the amplitude of the 66,666 microsecond saw-tooth applied to its control grid. In operation for a four sequence code, the first of these circuits has its potentiometer arm 194 set so that tube 190 will fire approximately 16,832 microseconds after the start of the 66,500 microsecond gate, the second 16,666 microseconds later, and the third 16,666 microseconds later. The leading edge of each voltage gate thus produced at the cathode of the particular gas tube 190 is differentiated as above-described to fire gas tube 185 and produce at its cathode a properly timed 16,500 microsecond voltage gate, which is then coupled through cathode follower 187 and line 196 to blocks 84, 87, and 89.

One of the typical altitude gate circuits of block 85 shown is required for the synch pulses and one for each series of altitude or information pulses intended for a particular altitude zone. The 16,666 microsecond saw-tooth from line 144 of block 79 is connected through isolating diode 200 to the control grid of gas tube 201, whose plate is connected to line 165 of block 78. The screen grid and cathode of tube 201 are connected together and to ground through resistor 202 and condenser 203 in series. The ohmic value of resistor 202, like that of resistor 192, is made small in order to prevent oscillations. The junction point of resistor 202 and condenser 203 is connected to arm 204 of potentiometer 205, whose end terminals are respectively connected to ground and a positive source of potential. The cathode of tube 201 is connected through differentiating condenser 206 to the cathode of tube 207, which is connected to ground through cathode resistor 208. The grid of tube 207 is connected to a positive source of potential through resistor 209 and to ground through resistor 210, and its plate is connected to the same positive source of potential through resistor 211 and is also directly connected to the grid of cathode follower 212. The plate of tube 212 is directly connected to the same source of positive potential and its cathode is positively biased by means of a resistance network consisting of resistors 213 and 214. This positive bias on cathode follower 212 is employed to prevent a long trailing edge on the voltage gate output of this tube. The output of cathode follower 212 is connected by means of line 215 to blocks 83 and 86. The operation of gas tube 201 is similar to that of gas tube 190 except that it is controlled by a 16,500 microsecond gate and 16,666 microsecond saw-tooth instead of the 66,500 microsecond gate and 66,666 microsecond saw-tooth. Potentiometer arm 204 is adjusted so that the output voltage gate at line 215 is properly positioned to bracket the desired altitude or synch pulse. The voltage gate produced at the cathode of the tube 201 is differentiated by the differentiating circuit consisting of condenser 206 and resistor 208, resulting in a positive trigger at the cathode of tube 207 coincident with the leading edge of the voltage gate produced at the cathode of tube 201. Tube 207 is normally conducting due to the positive bias upon its grid and this positive trigger applied to its cathode will turn the tube off, producing a positive pulse or voltage gate at its plate which is then coupled through cathode follower 212 and via line 215 to blocks 83 and 86.

Figure 6D:
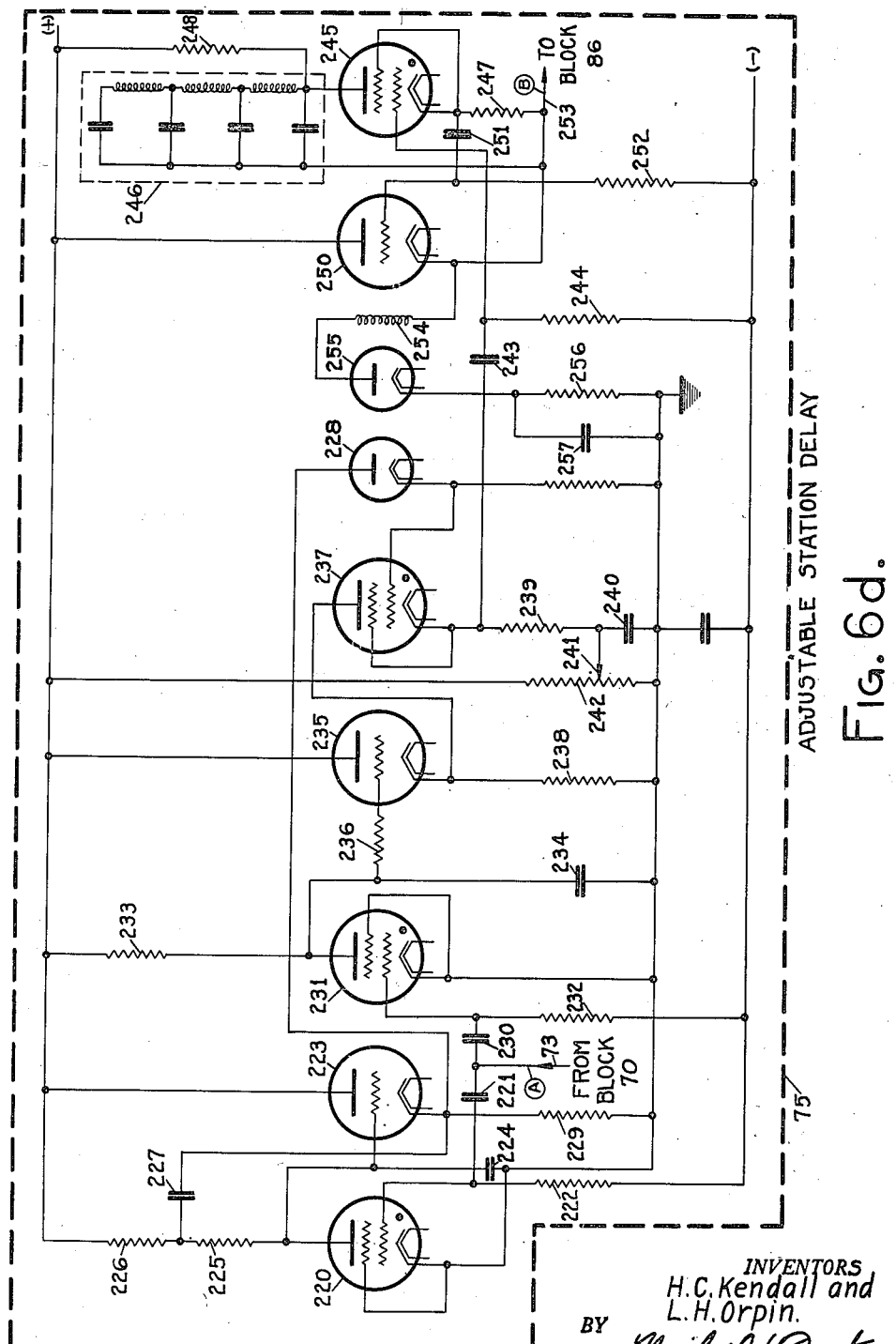

In Fig. 6d is shown the detailed circuit of adjustable station delay 75. Starting at the left-hand side of the sheet, gas tube 220 is part of a saw-tooth generator similar to that of block 80 above-described. The two microsecond synch trigger pulses and one microsecond altitude trigger pulses of line A (Figs. 5a and 5b) from line 73 of block 70 are applied through coupling condenser 221 to the grid of gas tube 220, which is returned to a source of negative potential through resistor 222. The cathode and screen grid of tube 220 are connected together and to ground, and the plate is connected directly to the grid of cathode follower 223, to ground through condenser 224, and to a source of positive potential through resistors 225 and 226 in series. The junction point of resistors 225 and 226 is connected through condenser 227 to the cathode of tube 223, whose plate is directly connected to the same source of positive potential. The cathode of tube 223 is also connected to the plate of isolating diode 228 and to ground through cathode resistor 229. The synch and altitude trigger pulses from line 73 are also applied through coupling condenser 230 to the control grid of gas tube 231, which is connected in a manner similar to that of the gate generator of block 81. The cathode and screen grid of tube 231 are connected together and to ground and the control grid is returned to a source of negative potential through resistor 232. The plate of tube 231 is connected to the source of positive potential through resistor 233, to ground through condenser 234, and to the grid of cathode follower 235 through resistor 236. The plate of tube 235 is connected to the same source of positive potential and its cathode is directly connected to the plate of gas tube 237 and to ground through cathode resistor 238. The cathode of isolating diode 228 is connected to the control grid of gas tube 237, whose screen grid and cathode are connected together and to ground through resistor 239 and condenser 240 in series. The junction point of resistor 239 and condenser 240 is connected to arm 241 of potentiometer 242, whose end terminals are respectively connected between the positive source of potential and ground. The cathode of tube 237 is coupled through a differentiating circuit, consisting of condenser 243 and resistor 244, to the control grid of gas tube 245, which has a pulse-forming line 246 connected in series with a resistor 247 between its plate and cathode. The plate of tube 245 is also connected to the positive source of potential through resistor 248 and its cathode is connected to its screen grid and to the control grid of tube 250 through coupling condenser 251. The plate of tube 250 is directly connected to the same source of positive potential, its grid is returned to the negative source of potential through resistor 252, and its cathode is connected to output line 253 and through tail-clipping inductance 254, diode 255, and the parallel combination of resistor 256 and condenser 257 to ground. Each pulse applied at line 73 will cause gas tubes 220 and 231 to fire, discharging condensers 224 and 234 respectively. By making the capacitance of condenser 234 small with relation to that of condenser 224, the output at the cathode of cathode follower 235 will be a fast action saw-tooth wave, in effect a voltage gate, whereas the output at the cathode of cathode follower 223 will be a normal saw-tooth wave. Varying the position of arm 241 of potentiometer 242 varies the cathode bias of tube 237, thus controlling the time at which this tube fires to produce a pulse at its cathode when the above-mentioned voltage gate is applied to its plate and the saw-tooth to its control grid as above-described. Arm 241 can be adjusted to delay the pulse produced at the cathode of tube 237 from 100 to 900 microseconds after the initiating trigger pulse applied at line 73, but in the embodiment herein described it will be remembered that it has been assumed that this adjustment has been made to give a delay of 500 microseconds. The output at the cathode of tube 237 is differentiated by the differentiating circuit consisting of condenser 243 and resistor 244, resulting in a trigger pulse appearing at the control grid of gas tube 245 coincident with the leading edge of the pulse at the cathode of tube 237. This trigger pulse fires gas tube 245, causing pulse-forming line 246 to discharge through the gas tube and the effective resistance of its cathode circuit. For this reason the ohmic value of resistance 247 is made approximately equal to the characteristic impedance of pulse-forming line 246. The pulse appearing across resistor 247 is coupled to the grid of "boot-strapping" tube 250 whose cathode is also simultaneously raised in potential by the pulse due to the "boot-strap" connection shown. The length of time that pulse-forming line 246 continues to discharge across resistor 247 is determined by the circuit constants of pulse-forming line 246, here assumed to be such that the discharge continues for one microsecond, with the result that a positive one microsecond pulse is produced at line 253 for each synch or altitude trigger pulse applied to line 73, each pulse at line 253 being delayed after its corresponding pulse applied to line 73 by a predetermined time fixed by the setting of arm 241 of potentiometer 242. Tail-clipping inductance 254 is inserted in the circuit in order to increase the rate of fall of the trailing edge of each pulse at line 253, and diode 255 is inserted to prevent oscillations from occurring following the trailing edge of each pulse.

In Fig. 6e is shown a typical altitude occupancy gate circuit of block 83, there being one such circuit for each altitude zone to which altitude or information pulses are being sent. Cathode followers 260 and 261 of Fig. 6e, however, are common to all the altitude occupancy gate circuits, the plates of switch tubes 262 of the circuits being connected together and in parallel to cathode follower 261 and the control grids of switch tubes 262 being connected through their respective resistors 263 and isolating diodes 264 to coupling condenser 265 from the cathode of cathode follower 260. Starting at the left-hand edge of the sheet, each small trigger abstracted from modulator 91 coincident with each output pulse from transmitter 89 is fed via portional synchronizing output line 266 and coupling condenser 267 to the grid of cathode follower 260, whose plate is connected to a source of positive potential and whose grid and cathode are returned to ground through resistors 268 and 269 respectively. The plate of isolating diode 264 is returned to ground through resistor 270 and its cathode is returned through resistor 271 to a point of negative potential on a network consisting of resistors 272 and 273 and condenser 274, this network being connected between a source of negative potential and ground. The 16,500 microsecond gates of line H (Figs. 5a and 5b) from line 163 of block 78 are connected to the grid of cathode follower 261, its plate is directly connected to the sources of positive potential above-mentioned, and its cathode is returned to the source of negative potential above-mentioned through resistor 275. The desired altitude gate (line O or P, Figs. 5c and 5d, in the embodiment herein described) of line 215 from block 85 is applied through condenser 276 to the plate of clamper tube 277 and the screen grid of switch tube 262, which is of the gas type. The screen grid of tube 262 is connected to the same point of negative potential on the network above-mentioned through resistor 278, and its cathode is connected to ground through resistor 279 and to the cathode of isolating tube 280 through differentiating condenser 292. The plate of tube 280 is directly connected to the grid of cathode follower tube 281 and also is returned to the above-mentioned urce of positive potential through plate resistor 282, its cathode is returned through cathode sistor 283 to ground, and its grid is positively ased by means of resistors 284 and 285 connected in series between the above-mentioned urce of positive potential and ground. The ate of tube 281 is connected to the same source positive potential and its cathode is positively ased by means of resistors 286 and 287 connected in series between the same source of positive potential and ground. The cathode of tube 11 is coupled through condenser 288 to the plate clamper tube 289 and output line 290, which ads to block 84, the waveform at line 290 corresponding to that of either line Y or Z (Figs. 5c and 5d) depending upon whether the waveform line O or P (Figs. 5c and 5d) respectively is connected to clamper tube 277 from line 215. The late of clamper tube 289 is returned to the same egative point on the network above-mentioned irough resistor 291. In operation switch tube 32 will be normally off or nonconducting, even ith the positive potential upon its plate due to le 16,500 microsecond gate, because of its two rids being returned to the point on the negative etwork above-mentioned. This tube will fire, owever, when its grids are simultaneously aised by the application of a portional synchroizing trigger from block 91 and an altitude gate om block 85. Clamper tube 277 prevents the creen grid from ever rising above ground poential. When switch tube 262 fires, a positive ulse is produced at its cathode which continues ntil the potential of the plate falls at the end of he 16,500 microsecond gate, and the leading edge f this cathode output is differentiated by differentiating condenser 292, which in this case is ade large enough so that its time constant of ischarge through resistor 283 is approximately 00 microseconds. Tube 281 is normally off due o its cathode being returned to a positive poential as above-described. Isolating tube 280 is iormally on due to its positive grid bias, and his differentiated positive pulse applied to its athode will turn the tube off for approximately 00 microseconds, resulting in a positive pulse of 00 microseconds duration at its plate which urns cathode follower tube 281 on. The result hen is a positive pulse of approximately 500 nicroseconds duration being produced at the athode of tube 281 whose leading edge is coincident with the corresponding portional synchroizing trigger from block 91, and this positive pulse is then coupled to output line 290, clamper ube 289 being inserted to prevent this pulse from ever going above ground potential.

In Fig. 6f are shown the detailed circuits of occupancy receiver gate circuit 92 and pulse width discriminator 95. In block 92 the same small triggers abstracted from modulator 91 coincident with each output pulse from transmitter 89 are fed via portional synchronizing output line 266 and resistor 295 to isolating and inverter ube 296, whose cathode is connected to ground and whose plate is connected to one end of delay line 297 through coupling condenser 298 and to a positive source of potential through plate resistor 299. The other end of delay line 297 is connected across resistor 300, which is connected in series with condenser 301 between the same source of positive potential and the control grid of tube 302. The suppressor grid and cathode of tube 302 are connected together and to ground, and its plate is connected to the above-mentioned positive source of potential through plate resistor 303 and to the grid of cathode follower 304 through coupling condenser 305. The grid of cathode follower 304 is returned to ground through resistor 306. The screen grid of tube 302 is returned to the above-mentioned source of positive potential through resistor 307 and coupled to the control grid of tube 308 though coupling condenser 309, and the control grid of tube 302 is also connected to ground through variable resistor 310 and to the screen grid of tube 308 through coupling condenser 311. The suppressor grid and cathode of tube 308 are connected together and to ground, its plate is returned to the above-mentioned source of positive potential through plate resistor 312, its screen grid is returned to the same source of positive potential through resistor 313, and its control grid is returned to ground through resistor 314. Thus, tubes 302 and 308 constitute an electron-coupled multivibrator. The plate of cathode follower 304 is directly connected to the above-mentioned source of positive potential, and its cathode is connected to output line 315 leading to block 93 and returned to a source of negative potential through cathode resistor 316. A network consisting of resistors 317 and 318 and condenser 319 is connected between this same source of negative potential and ground, and line 266 is returned to a point of negative potential on this network through resistor 320. In operation tube 296 is normally off due to this negative bias on its grid, but is turned on by the positive pulse from modulator 91 coincident with each output pulse of transmitter 89, thus causing a pulse to appear at the plate of tube 296 coincident with each transmitter output pulse. The ohmic value of resistor 300 is made approximately equal to the characteristic impedance of delay line 297, and each pulse appearing at the plate of tube 296 is delayed by delay line 297 a finite amount of time determined by the circuit constants of this delay line. In this particular embodiment, it will be assumed that delay line 297 introduces a delay of 10 microseconds in order that I-F amplifier 93 of occupancy receiver 94 will not be made operative until after the termination of transmission of the longest pulse that transmitter 89 produces. Each delayed pulse appearing at the grid of multivibrator tube 302 will turn this tube off and turn tube 308 on abruptly due to the well-known multivibrator action. Tube 302 will remain off and tube 308 on for a length of time determined by the circuit constants of the multivibrator, in this case being controllable from approximately 0 to 300 microseconds by means of variable resistor 310. In the operation of this embodiment, it will be assumed that variable resistor 310 has been adjusted to keep tube 302 turned off for 300 microseconds, thus resulting in a voltage gate at the plate of tube 302 of 300 microseconds duration whose leading edge starts 10 microseconds after the leading edge of its corresponding portional synchronizing trigger at line 266, this 300 microsecond pulse then being coupled through cathode follower 304 and output line 315 to I-F amplifier 93 to control its operativeness.

In pulse width discriminator 95 each pulse received by occupancy receiver 94 during the time I-F amplifier 93 is operative is coupled via line 325 through coupling condenser 326 to the control grid of integrator pentode 327, whose screen grid is returned to a positive source of potential through resistor 328 and whose suppressor grid and cathode are connected together and to ground. The plate of tube 327 is connected to the same source of positive potential through resistor 329 and to ground through condensers 330 and 331 in series, and its control grid is returned to ground through resistor 332. The junction point of condensers 330 and 331 is connected to ground through resistor 333 and to the control grid of phase inverter pentode 334, whose screen grid is connected to the above-mentioned source of positive potential through resistor 335 and whose suppressor grid and cathode are connected together and to ground through the resistance strip of potentiometer 336. The plate of pentode 334 is connected to the above-mentioned source of positive potential through the resistance strip of potentiometer 337. Arm 338 of potentiometer 336 is connected through coupling condenser 339 to the grid of tube 340 and arm 341 of potentiometer 337 is connected through coupling condenser 342 to the grid of tube 343. The plate of tube 340 is connected to the same source of positive potential through resistor 344, to the grid of tube 345 through condenser 346, and to the grid of pentode 347 through differentiating condenser 348, and its control grid is returned to ground through resistor 349. The plate of tube 345 is connected to the above-mentioned source of positive potential through resistor 350 and to the grid of tube 340 through coupling condenser 351, its grid is returned to the same source of positive potential through resistor 352, and its cathode and that of tube 340 are connected together and to ground through resistor 353. Thus tubes 340 and 345 constitute a delay multivibrator. The plate of tube 343 is connected to the above-mentioned source of positive potential through resistor 355 and to the grid of tube 356 through condenser 357, its grid is returned to the same source of positive potential through resistor 358, and its cathode and that of tube 356 are connected together and to ground through cathode resistor 359. The plate of tube 356 is connected to the same source of positive potential through resistor 360 and to the screen grid of sharp cut-off pentode 347 through condenser 361, and its grid is connected to ground through resistor 362. Thus, tubes 343 and 356 constitute a second multivibrator. The screen grid of pentode 347 is also connected to the junction point of resistors 365 and 366, which are connected in series between the above-mentioned source of positive potential and ground, thus positively biasing this screen grid. The control grid of pentode 347 is returned to ground through resistor 367, its suppressor grid and cathode are connected together and to the same source of positive potential through resistor 368 and to ground through resistor 369 and condenser 370 connected in parallel, and its plate is connected to the same source of positive potential through resistor 371 and to output line 372 leading to block 96. Pentode 347 is thus normally off or nonconducting due to this cathode biasing. In the operation of this system, as will be more fully discussed hereafter in connection with the airborne components, it may be desirable for dependability of operation to insure that only pulses of the proper width or widths are channelled to receiver output switch 96 in order to reduce the possibility of operation by spurious, interfering or other unwanted pulses. These unwanted pulses include those from aircraft in adjacent blocks, but within the receiver gate limits of this block. For this reason, pulse width discriminator 95 is inserted in the circuit so that only pulses whose duration lies between predetermined limits will be passed. Each pulse received at line 325 from occupancy receiver 94 will be negative and will turn integrator pentode tube off for a time dependent upon its duration or pulse width. Whenever pentode 327 is turned off, condenser 331 starts charging towards the potential of the positive source, and thus a positive saw-tooth is produced at the control grid of phase inverter tube 334, the peak amplitude which this saw-tooth attains being a direct measure of the duration of the received pulse at line 325. A portion of the positive saw-tooth at the cathode of tube 334 is picked off by arm 338 of potentiometer 336 and connected to the delay multivibrator consisting of tubes 340 and 345, and a portion of the corresponding negative saw-tooth appearing at the plate of tube 334 is picked off by arm 341 of potentiometer 337 and connected to the multivibrator consisting of tubes 343 and 356. If the duration of the pulse coming from block 94 is equal to, or greater than, the minimum pulse length to be accepted by this discriminator, the portion of the positive saw-tooth thus applied to the grid of tube 340 will turn this tube on and tube 345 abruptly off and this condition will obtain for a time fixed by the circuit constants of the multivibrator, here assumed to be approximately three microseconds. The resulting negative pulse at the plate of tube 340 is differentiated by the differentiating circuit consisting of condenser 348 and resistor 367, and the positive differentiated pulse produced coincident with the trailing edge of this negative pulse is applied to the control grid of output pentode 347 to produce an output at the plate of this tube, providing that a negative voltage gate is not applied to its screen grid. If the width of the pulse applied from block 94 is greater than the maximum pulse width to be accepted by this discriminator, the portion of the negative saw-tooth applied to the grid of tube 343 will be of sufficient magnitude to turn this tube off and tube 356 on abruptly, producing a negative voltage gate at the plate of tube 356, and this condition will continue for a time fixed by the circuit constants of this multivibrator. Adjustment of arm 338 of potentiometer 336 controls the minimum input pulse duration which will trigger the multivibrator consisting of tubes 340 and 345 into operation to produce an output at line 372, and adjustment of arm 341 of potentiometer 337 controls the maximum duration pulse passed by this circuit, since if a pulse of duration greater than this maximum setting is received, it will trigger the multivibrator consisting of tubes 343 and 356 into operation, thus producing a disabling negative voltage gate at the plate of multivibrator tube 356 which will then be coupled to the screen grid of pentode 347 to prevent its operation even though a differentiated positive pulse from condenser 348 is received at its control grid. This pulse width discriminator is more fully described and claimed in the application of Lionel H. Orpin for Pulse Duration Discriminator filed April 22, 1947, Serial No. 743,149, Patent No. 2,552,013, issued May 8, 1951.

In Fig. 6g is shown the detailed circuit diagram of receiver output switch 96. Line 372 from block 95 is coupled through condenser 380 to the primary of pulse transformer 381, whose primary and secondary are wound oppositely from one another as indicated on the drawing. The high side of the secondary of pulse transformer 381 is connected to the grid of cathode follower 382, whose plate is connected to a source of positive potential and whose cathode is connected to ground through cathode resistor 383, to the grid of inverter tube 384 through coupling condenser 385, and directly to the control grids of electron switch tubes 386 and 387. The cathode of tube 384 is connected directly to ground, its grid is returned to a source of negative potential through resistor 388, and its plate is connected to the above-mentioned source of positive potential through resistor 389 and directly connected to the control grid of tube 390. The suppressor grid and cathode of tube 390 are connected together and to ground, its screen grid is connected to the above-mentioned source of positive potential through resistor 391 and to the control grid of tube 392 through coupling condenser 393, its control grid is also connected to ground through resistor 394 and to the screen grid of tube 392 through coupling condenser 395, and its plate is connected to the same source of positive potential through resistor 396 and directly connected to the screen grid of tube 386. The suppressor grid and cathode of tube 392 are connected together and to ground, its control grid is returned to a source of negative potential through resistor 397, its screen grid is returned to the above-mentioned source of positive potential through resistor 398, and its plate is connected to the same source of positive potential through resistor 399 and directly connected to the screen grid of tube 387. Thus the circuits of tubes 390 and 392 constitute an electron-coupled multivibrator. The suppressor grids and cathodes of switch tubes 386 and 387 are all connected together and to ground through the parallel combination of resistor 400 and condenser 401 and to the above-mentioned source of positive potential through resistor 402. The grid of tube 382 is also connected to the junction point of resistors 400 and 402 through resistor 403. The plate of tube 386 is connected to the above-mentioned source of positive potential through resistor 404 and to the grid of inverter tube 405 through coupling condenser 406, and the plate of tube 387 is connected to the same source of positive potential through resistor 407 and to the grid of inverter tube 408 through condenser 409. The cathode of tube 405 is directly connected to ground, its grid is connected to ground through resistor 410, and its plate is connected to the above-mentioned source of positive potential through resistor 411 and to output line 412 leading to block 84. The cathode of tube 408 is directly connected to ground, its grid is connected to ground through resistor 413, and its plate is connected to the same source of positive potential through resistor 414 and to output line 415 leading to block 84. Each signal received by occupancy receiver 94 and passed by pulse width discriminator 95 as a negative pulse is inverted by pulse transformer 381 to produce a positive pulse at the grid of cathode follower 382 and hence also a positive pulse at its cathode. This positive pulse is coupled to the control grids of electron switch tubes 386 and 387 and will be passed by whichever of these switch tubes has its screen grid simultaneously raised in potential at the same time. This positive pulse at the cathode of cathode follower 382 is also coupled to the grid of inverter tube 384 and the resulting negative pulse produced at its plate is coupled to the control grid of multivibrator tube 390. Multivibrator tube 392 is normally off or nonconducting due to the negative bias applied to its control grid, and multivibrator tube 390 is normally on or conducting. The negative pulse applied to the control grid of tube 390 will turn that tube off and tube 392 on abruptly due to the well-known multivibrator action, thus producing a positive voltage gate at the plate of tube 390 and a corresponding negative voltage gate at the plate of tube 392 whose durations are equal and are controlled by the circuit constants of the multivibrator. In the embodiment herein described, it will be assumed that these have been chosen to produce voltage gates at the plates of the multivibrator of approximately 300 microseconds duration in order that any second pulse received during any one of the occupancy receiver gates of line AA (Figs. 5c and 5d) will be channelled into the proper double occupancy detection circuit. These positive and negative voltage gates are applied to the screen grids of switch tubes 386 and 387 respectively to control their operation. Switch tube 386 will conduct in response to a positive pulse applied to its control grid only when a positive voltage gate is simultaneously applied to its screen grid, and switch tube 387 will conduct in response to a positive pulse applied to its control grid only when a negative voltage gate is not applied to its screen grid. Since it requires a finite time for the operation of the multivibrator to produce output voltage gates in response to a negative signal received at line 372, the first signal pulse received at line 372 during any one occupancy receiver gate will be passed by switch tube 387 and coupled through inverter tube 408 to produce a positive pulse at line 415 (the single occupancy circuit). Immediately following this pulse, the negative voltage gate from the multivibrator (produced by this initial signal at line 372) will disable switch tube 387 and the corresponding positive gate will enable switch tube 386, and this condition will continue for approximately 300 microseconds so that any ensuing signals received by occupancy receiver 94 and passed by pulse width discriminator 95 during that particular occupancy receiver gate will be channelled through switch tube 386 and inverter tube 405 to produce positive pulses at line 412 (the double occuancy circuit) leading to block 84.

Figure 6H:
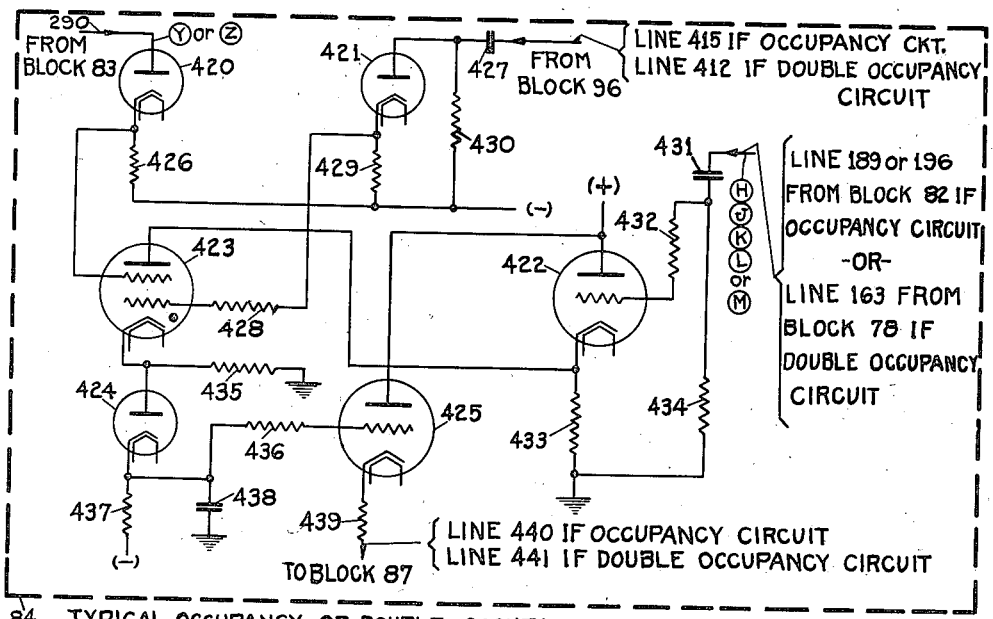

In Fig. 6h is shown a detailed typical occupancy or double occupancy detection circuit of block 84. Three of the tubes, isolating diodes 420 and 421 and sequence gate output cathode follower 422 are common to all occupancy detection circuits or to all double occupancy detection circuits. One gas tube 423, one charging diode 424, and one cathode follower 425 is required for each occupancy or double occupancy detection circuit. One occupancy detection circuit is required for each altitude zone to which information is being sent for each code sequence. Thus if communication is being had with two altitude zones and a four sequence code is being used (as assumed in the embodiment described) eight occupancy detection circuits are required. Similarly, one double occupancy detection circuit is required for each altitude zone, and in the embodiment described, two are thus required. Line 290 from block 83 is connected to the plate of isolating diode 420, whose cathode is directly connected to the screen grid of gas tube 423 and returned to a source of negative potential through resistor 426. Line 415, if an occupancy circuit, or line 412, if a double occupancy circuit, is connected from block 96 through coupling condenser 427 to the plate of isolating diode 421, whose cathode is connected through resistor 428 to the control grid of gas tube 423 and is also returned to the above-mentioned source of negative potential through resistor 429. The plate of isolating diode 421 is also connected to the same source of negative potential through resistor 430. Line 189 or 196 from block 82, if an occupancy circuit, or line 163 from block 78, if a double occupancy circuit, is connected through coupling condenser 431 and resistor 432 to the grid of cathode follower 422, whose plate is connected to a source of positive potential and whose cathode is connected to ground through cathode resistor 433 and to the plate of gas tube 423. The junction point of condenser 431 and resistor 423 is connected to ground through resistor 434. The cathode of gas tube 423 is connected to the plate of charging diode 424 and to ground through resistor 435. The cathode of charging diode 424 is connected to the grid of cathode follower 425 through resistor 436, to a source of negative potential through resistor 437, and to ground through condenser 438. The plate of cathode follower 425 is connected to the above-mentioned source of positive potential and its cathode is connected through resistor 439 to its corresponding relay of block 87 via line 440 if an occupancy circuit, or via line 441 if a double occupancy circuit. The operation of this typical circuit will first be described with reference to an occupancy detection circuit and the variations in this operation for a double occupancy detection circuit will then be noted. The desired altitude occupancy gate from block 83 (in this embodiment that of line Y or Z, Figs. 5c and 5d) is coupled through isolating diode 420 to the screen grid of gas tube 423. This gas tube will fire in response to a positive pulse applied to its control grid only if its plate supply is on and its screen grid is simultaneously raised in potential. The occupancy signals received by receiver 94 and passed by pulse width discriminator 95 and receiver output switch 96 via line 415 and isolating diode 421 are applied as positive pulses to the control grid of gas tube 423. The proper sequence gate, from line 189 (line J, Figs. 5a and 5b) if the first code sequence, or from line 196 (line K, L, or M, Figs. 5a and 5b) if the second, third or fourth code sequence, respectively, is coupled through gate output cathode follower 422 to provide the plate potential for gas tube 423. Thus the occurrence of a received signal at the control grid of gas tube 423 simultaneously with any one altitude occupancy gate will cause gas tube 423 to conduct and continue to conduct until the plate voltage of the gas tube is reduced at the end of the sequence gate. When gas tube 423 conducts, it causes a current to flow through resistor 435, producing a positive potential at the plate of charging diode 424 and charging condenser 438. Condenser 438 remains charged until gas tube 423 ceases to conduct and thereafter discharges along an exponential discharging path whose time constant is determined by the capacity of condenser 438 and resistance of resistor 437. The pulse of gradually decreasing amplitude thus produced at the grid of cathode follower 425 is reproduced at its cathode and coupled via line 440 to energize the proper occupancy relay in block 87 for a length of time fixed as desired by varying the values of condenser 438 and resistor 437. The operation of a typical double occupancy detection circuit is similar as above-mentioned. Line 412 from block 96 is connected through isolating diode 421 to the control grid of gas tube 423, however, instead of line 415, and the 16,500 microsecond gate (line H, Figs. 5a and 5b) from block 78 is now coupled via line 163 and cathode follower 422 to provide the plate potential for gas tube 423. Thus if a pulse signifying double occupancy is received from block 96 via line 412 and diode 421 at the control grid of gas tube 423 during any one altitude occupancy gate, gas tube 423 will conduct and continue to conduct until the end of the 16,500 microsecond gate or, in other words, continue to fire during that particular code sequence. The result of gas tube 423 conducting will be to produce an output pulse at the cathode of cathode follower 425 similar to that above-mentioned for the occupancy detection circuit, which is then coupled to the proper double occupancy relay of block 87 via line 441.

Figure 6K:
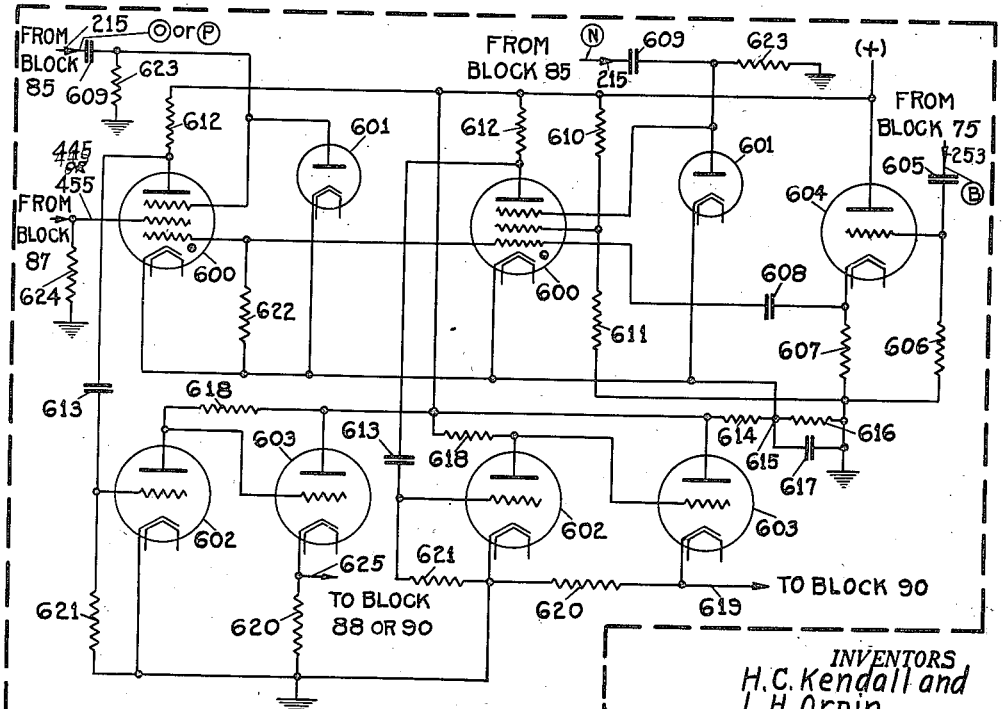
Figure 6I:
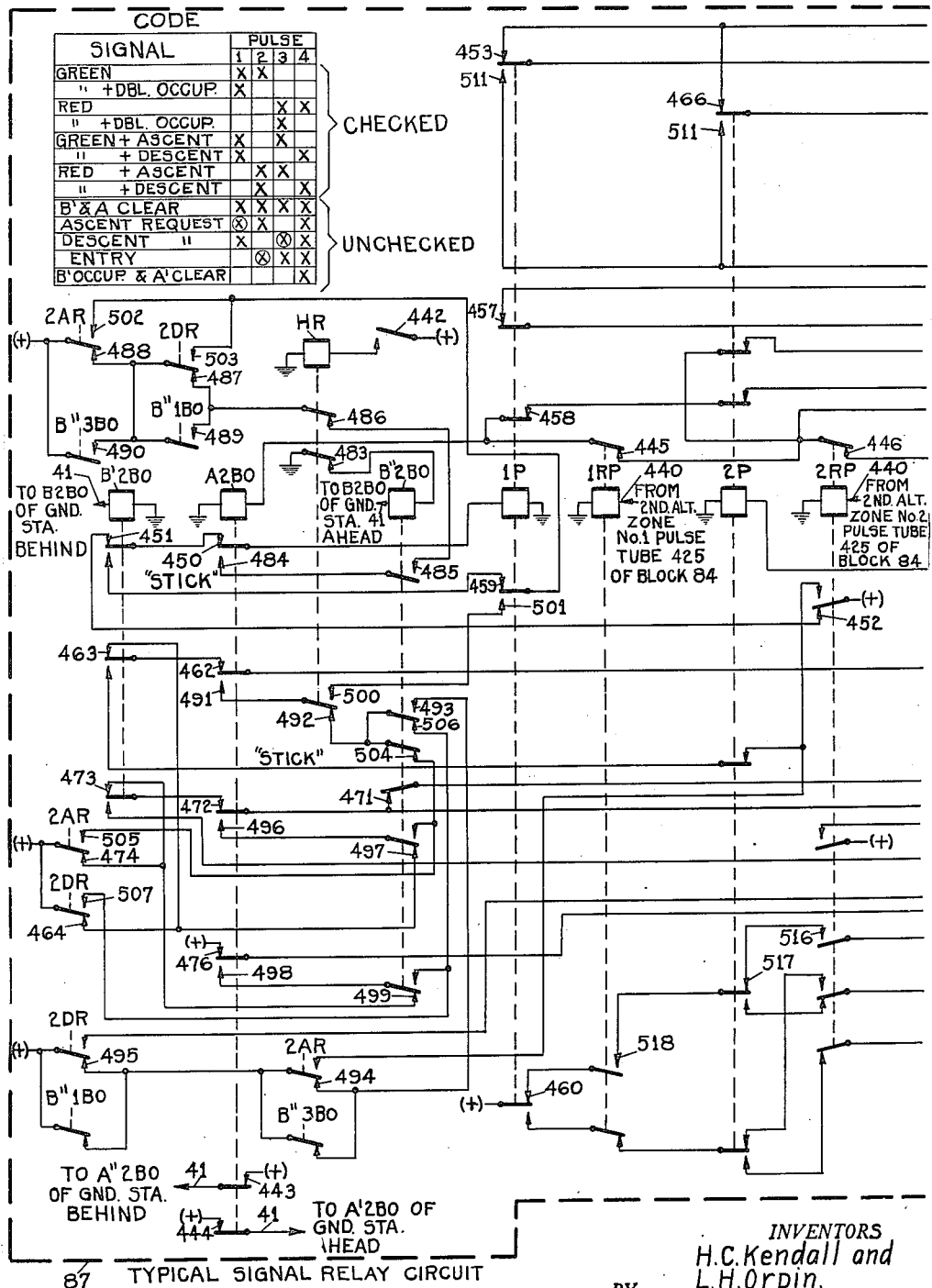
Figure 6J:
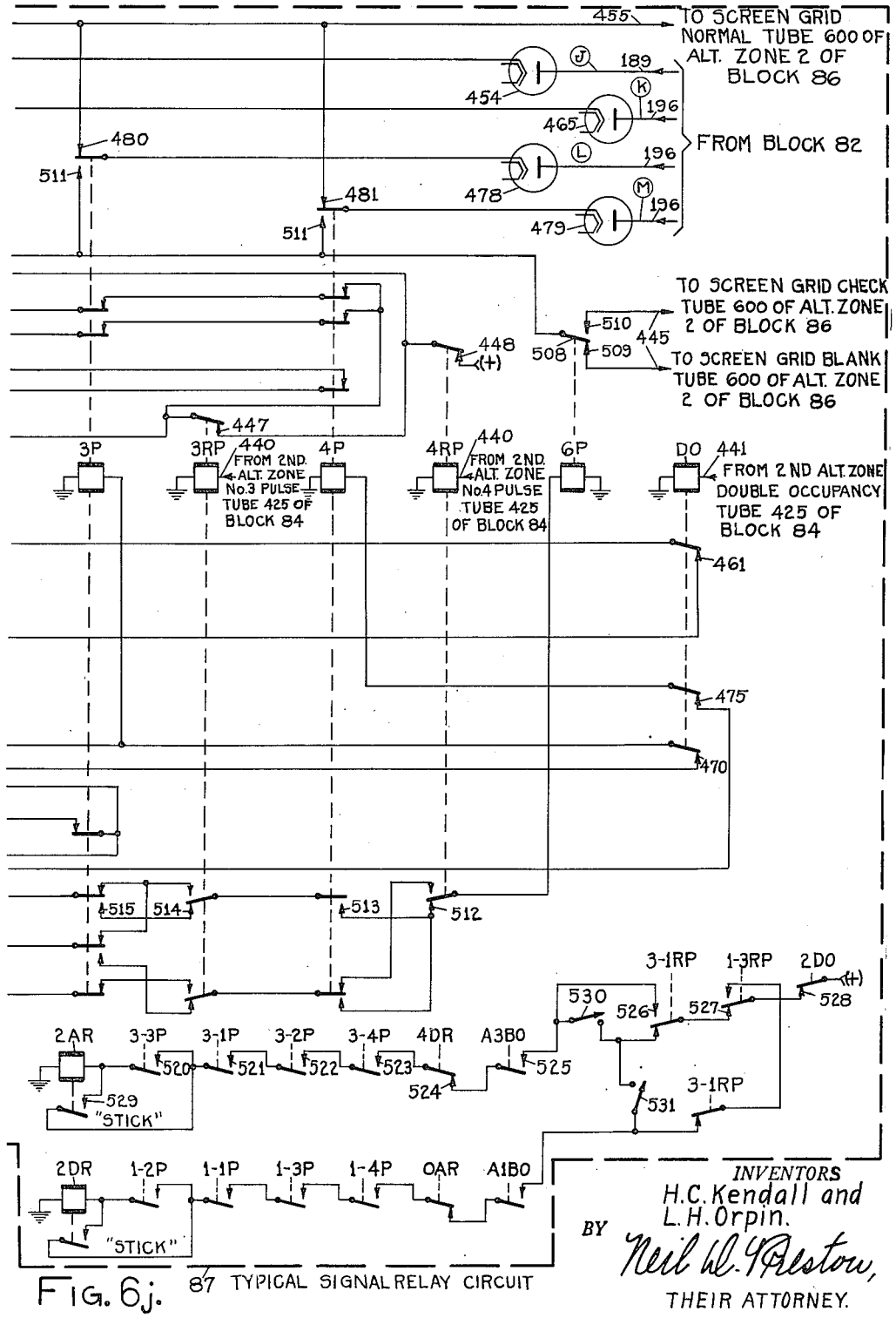

In Figs. 6i and 6j are illustrated a typical signal relay circuit of block 87 and an assumed code for communication between a ground station and an aircraft. In the code, signals shown above the double line are sent to an aircraft within the altitude zone of a block and their reception by the aircraft is checked back to the ground station by means of reply pulses to each transmitted pulse, while signals shown below the double line are sent to the altitude zone only when it is unoccupied and hence ordinarily cannot be replied to, thus being unchecked. The encircled "x's" of certain of the unchecked signals indicate that an aircraft without that altitude zone of the block replies to that single pulse to signify its desire to enter that altitude zone (either by ascent, descent, or from the side as the case may be), no reply being sent corresponding to the other pulses of the unchecked signals. The particular relay circuit shown is the one controlling the information intended for the second altitude zone. In the drawings, the abbreviation A2BO indicates the block occupancy relay for the second altitude zone of this block, B'2BO indicates the block occupancy relay conveying information as to the occupancy conditions of the second altitude zone in the block behind this one, and B"2BO indicates the block occupancy relay conveying information as to the occupancy conditions of the second altitude zone of the block ahead. IP, 2P, 3P, 4P and 6P denote the relays controlling the sending of the Nos. 1, 2, 3, 4, and 6 pulses respectively, to the second altitude zone of this block and IRP, 2RP, 3RP, 4RP and DO denote the relays which are energized to signify the reception of Nos. 1, 2, 3 and 4 reply pulses from an aircraft in the second altitude zone of this block and a double occupancy condition within the second altitude zone respectively. HR denotes the "hold" relay which may be energized by means of switch 442 to indicate orders from the ground station to an aircraft with which communication is being had in the second altitude zone of this block to hold its position within the block, as by circling. 2AR and 2DR denote the ascent relay and descent relay respectively for ordering or granting permission to an aircraft within the second altitude zone to ascend or descend as the case may be. Since it is not feasible to show the correspondence of certain relay armatures and contacts with the proper relay by the physical arrangement of the components on the drawing, the correspondence of these armatures and contacts has been designated by letters and numerals. For instance, B"IBO above a relay armature and contacts indicates that they correspond to the block occupancy relay of the first altitude zone of this block conveying information as to the occupancy conditions of the first altitude zone of the block ahead, 3—1P above a relay armature and contacts indicates that they correspond to the No. 1 pulse relay of the third altitude zone of this block, 0AR the ascent relay of zone 0 of this block, etc. The convention has been adopted in Figs. 6i and 6j that all relay armatures are energized in the upward position and de-energized in the downward position irrespective of the physical position of the relay upon the drawing, and the relay armatures have been shown in the drawings in the proper positions for the second altitude zones of this block and the block behind this being clear or unoccupied. While all relay circuits have been shown as being returned to ground, it is of course obvious that if desired they may be returned instead directly to the negative terminal of the relay potential source in accordance with standard relaying practice. As shown, the DO or double occupancy relay is energized by means of line 441 from the second altitude zone double occupancy tube 425 of block 84, and the 1RP, 2RP, 3RP and 4RP reply pulse relays are energized by means of lines 440 from the second altitude zone Nos. 1, 2, 3 and 4 pulse tubes 425 respectively of block 84. Relay B'2BO is energized from line wire 41 from the B2BO relay of the ground station behind, and relay B"2BO is energized from line wire 41 from the B2BO relay of the ground station ahead. Block occupancy relay A"2BO of the ground station behind this one is energized through contact 443 corresponding to relay A2BO, and block occupancy relay A'2BO of the ground station ahead is similarly energized through contact 444 of relay A2BO. As shown by the code in the upper left-hand portion of Fig. 6i, whenever a particular altitude zone of both the B' (block behind) and A (this) block are clear or unoccupied, Nos. 1, 2, 3 and 4 pulses are sent to that altitude zone of this block, and, since that altitude zone is unoccupied, no reply pulses are received. This condition for the second altitude zone is manifested in the signal relay circuits by block occupancy relay A2BO being energized, the circuit path being through relay contacts 445, 446, 447 and 448 corresponding to the 1RP, 2RP, 3RP, and 4RP relays, respectively. Since block occupancy relay B'2BO is also energized (from the ground station behind), relay 1P is energized through upper contacts 450 and 451 of block occupancy relays A2BO and B'2BO respectively and lower contact 452 of reply relay 2RP. Relay 1P being energized results in the topmost circuit of the figure being closed through upper contact 453, which connects the cathode of diode 454 to output line 455 leading to the screen grid of normal tube 600 of altitude zone 2 of block 86. The plate of diode 454 is connected to line 189 from block 82, which corresponds to waveform J of Figs. 5a and 5b, the first sequence gate. Thus through the succeeding circuits of the ground station system the normal pulse for the first sequence, or, in other words, the No. 1 pulse, will be sent from transmitter 89. Simultaneously, other circuits are closed through contacts 457, 458, 459, and 460, whose purposes will be indicated hereinafter. Relay 2P is similarly energized at the same time through contact 461 of the DO relay, upper contacts 462 and 463 of the A2BO and B'2BO relays respectively, and lower contact 464 of the 2DR relay. Diode 465, whose plate is connected to the line 196 from block 82 corresponding to the second sequence gate (line K, Figs. 5a and 5b), is then connected through upper contact 466 of the 2P relay to line 455, so that the normal or No. 2 pulse will be sent out by transmitter 89 for the second sequence, and other circuits are also closed through upper contacts corresponding to the 2P relay as shown in the drawing. Relay 3P is energized through contacts 470 and 471 of the DO and B"2BO relays respectively in parallel if the second altitude zone of the block ahead is occupied or through contact 470 alone if that altitude zone is unoccupied, upper contacts 472 and 473 of relays A2BO and B'2BO respectively, and lower contact 474 of the 2AR relay. Relay 4P is energized through contact 475 of the DO relay and upper contact 476 of the A2BO relay. When the 3P and 4P relays are energized, diodes 478 and 479, whose plates are connected to the lines 196 from block 82 corresponding to the third and fourth sequence gates respectively (lines L and M, Figs. 5a and 5b), are connected to line 455 through upper contacts 480 and 481 respectively, resulting in the normal pulses for the third and fourth sequences (Nos. 3 and 4 pulses) also being sent out by transmitter 89. When an aircraft enters the second altitude zone of this block, it will begin to reply to each normal pulse and reply relays 1RP, 2RP, 3RP and 4RP will then be energized, which will thus open the circuit to relay A2BO through contacts 445, 446, 447, and 448. If the second altitude zone of the block ahead is clear, the B"2BO relay will be energized through contact 483 providing the HR relay is not energized, a green signal should be sent to the aircraft, and as required by the code, the 1P relay will then be energized through lower contact 484 of the A2BO relay, contact 485 of the B"2BO relay, contact 486 of the HR relay, and lower contacts 487 and 488 of the 2DR and 2AR relays, respectively, if neither the HR, DR, or AR relays have been energized. Even if the 2DR relay is energized, a path from contact 486 is provided through contact 489 of the B"1BO relay if the first altitude zone of the block ahead is clear, and if the 2AR relay is energized and the 2DR relay is de-energized, the circuit is completed through contact 490 of the B"3BO relay rather than through contact 488 if the third altitude zone of the block ahead is clear. Simultaneously the 2P relay is energized through contact 461 of the DO relay, lower contacts 491 and 492 of the A2BO and HR relays, upper contact 493 of the B"2BO relay, and lower contacts 494 and 495 of the 2AR and 2DR relays respectively if the HR, 2AR, and 2DR relays are not energized. At the same time it can be shown that the 3P and 4P relays are not energized, resulting in only the normal pulses corresponding to the first and second sequences, or, in other words, Nos. 1 and 2 pulses being sent to the second altitude zone of this block. If another aircraft should then enter the second altitude zone, the DO relay will be energized, resulting in the 2P relay being de-energized since it is no longer connected through contact 461, and the code being transmitted would thus change as desired. If the ground station wishes to hold the aircraft in the second altitude zone of this block, energization of the HR relay through switch 442 will de-energize both the 1P and 2P relays since connections to the potential source will no longer be made through contacts 486 and 492, respectively. Simultaneously, relay B"2BO will be de-energized since its circuit no longer will be completed through contact 483, and this will result in pulse relays 3P and 4P being energized, giving the aircraft a red signal. Relay 3P is energized through contacts 470 and 471 of the DO and B"2BO relays, respectively, in parallel and lower contacts 496, 497 and 464 of relays A2BO, B"2BO and 2DR respectively, and relay 4P is energized through contact 475 of the DO relay and lower contacts 498, 499 and 474 of relays A2BO, B"2BO, 2AR, respectively. This red signal may be produced by the same relaying sequence, of course, if relay B"2BO is de-energized due to an aircraft being present in the second altitude zone of the block ahead rather than by energizing the HR relay through hold switch 442. However, after receiving the red signal the aircraft in the second altitude zone of this block can then request permission or be ordered by the ground station to ascend or descend, and if altitude zone block occupancy conditions are met, this will result in energizing the No. 2 pulse or 2P relay through contacts 461 and 491, as before, and upper contact 500 of the HR relay if the HR relay is energized, lower contact 501 of the IP relay, and upper contact 502 of the 2AR relay for ascent or through upper contact 503 of the 2DR relay and contact 488 of the 2AR relay for descent. If the HR relay is not energized, the corcuit to relay 2P is completed through contacts 461 and 491, as before, and lower contacts 492 and 504 of the HR and B"2BO relays, respectively, and upper contact 505 of the 2AR relay for ascent or through lower contact 506 of the B"2BO relay and upper contact 507 of the 2DR relay for descent. Thus in the case of ascent the No. 4 pulse is no longer sent since the circuit to relay 4P will not then be completed through contact 474, and in the case of descent the No. 3 pulse is no longer sent since the circuit to relay 3P will not then be completed through contact 464. The circuitry for an aircraft requesting permission or the ground station ordering the aircraft to ascend or descend will be more fully discussed hereinafter in connection with the 2AR and 2DR relays. As has been indicated previously, whenever a normal pulse is not sent to an aircraft during a particular code sequence, either a No. 5 (blank) or No. 6 (check) pulse is sent, the No. 5 pulse being sent until reception of the particular code by the aircraft has been checked back to the ground station, all No. 5 pulses thereafter being replaced by No. 6 pulses. This is accomplished by the circuitry shown at the top and bottom of Figs. 6i and 6j whenever a No. 1, 2, 3 or 4 pulse is not being sent as evidenced by the IP, 2P, 3P or 4P relays, respectively, not being energized. When the 6P relay is de-energized, its armature 508 is connected through lower contact 509 to the screen grid of the blank (No. 5 pulse) tube 600 of altitude zone 2 of block 86, and when relay 6P is energized, armature 508 is connected through upper contact 510 to the screen grid of the check (No. 6 pulse) tube 600 of altitude zone 2 of block 86. Armature 508 is directly connected to four lower contacts 511, one associated with each of relays IP, 2P, 3P, and 4P, so that whenever the IP, 2P, 3P, or 4P relay is not energized, the cathode of the corresponding diode 454, 455, 478, or 479 is connected to armature 508. Thus, when the normal pulse for a sequence is not being sent during that sequence, the No. 5 pulse will be sent unless the 6P relay is energized. Energization of the 6P relay is accomplished after checking reception of the green code, when the Nos. 1 and 2 pulses are being sent and no Nos. 3 or 4 pulses are being sent, through lower contacts 512, 513, 514, and 515 and upper contacts 516, 517, 518, and 460 corresponding to the 4RP, 4P, 3RP, 3P, 2RP, 2P, IRP and IP relays, respectively. Similarly, it can be shown for any of the eight signals marked "checked" in the code in the upper left-hand corner of Fig. 6i that the 6P relay will be energized when each pulse relay that is energized has its corresponding reply pulse relay energized and each pulse relay that is de-energized has its corresponding reply pulse relay de-energized. The other circuitry illustrated can be similarly shown to give the desired code signals assumed, but the individual operation of each circuit will not be described with the exception of the ascent and descent circuits. In these circuits, relay contacts are shown corresponding to one and two altitude zones above and below the particular aircraft with which communication is being had, and these are utilized in case there is air lane traffic in these zones. In case traffic is limited to two altitude zones, as was previously assumed for the embodiment presently being described, such relay contacts are shorted out of the circuit. Ascent relay 2AR may be energized through contacts 520, 521, 522, 523, 524, 525, 526, 527, and 528 of relays 3—3P, 3—IP, 3—2P, 3—4P, 4DR, A3BO, 3—IRP, I—3RP, and 2DO, respectively. The circuit includes contacts closed by pulse relays IP, 2P, 3P and 4P and block occupancy relay A3BO of the third altitude zone of this block in order that an ascent permission cannot be granted or ordered unless the altitude zone above of this block and of the block behind are both clear. A relay contact corresponding to the descent relay of two altitude zones above in this block (4DR) is included in order that ascent and descent permission or orders into the same altitude zone cannot be given simultaneously, and a contact corresponding to the double occupancy relay of this altitude zone of this block (2DO) is included in order that permission or orders to ascend or descend can never be given in case of double occupancy. Similarly, contacts corresponding to the No. 1 reply pulse relay of the altitude zone above (3—IRP) and the No. 3 reply pulse relay of the altitude zone below (I—3RP) are included in order that both ascent and descent requests cannot be made by an aircraft at the same time. Contact 520 of relay 3—3P is by-passed by a "stick" circuit through contact 529 since ascent permission or orders are manifested to the altitude zone into which entry is desired by the ground station ceasing to send the No. 3 pulse to that altitude zone, and contact 526 of relay 3—IRP is by-passed by a switch 530 which when closed by the ground station orders the aircraft to ascend, the circuit being completed through contact 526 only when an aircraft requests permission to ascend by responding to the first pulse of the code being sent to the altitude zone above that in which it is located, in this case the third altitude zone. The descent relay 2DR circuit is similar, including relay contacts corresponding to relays I—2P, I—IP, I—3P, I—4P, 0AR, AIBO, 3—IRP, I—3RP and 2DO. This descent circuit also includes a "stick" circuit around the contact corresponding to the I—2P relay and a manual or local switch 531 for ordering descent which by-passes the contact corresponding to relay I—3RP through which the circuit is closed when an aircraft requests descent permission.

In Fig. 6k are shown typical sequencing and signal pulse selection circuits of block 86. One pulse selection circuit is required for each altitude zone with which communication is being had for each pulse width which it is desired to transmit to the altitude zone, and one pulse selection circuit is required to control the altitude synch pulses. A typical pulse selection circuit for controlling pulses of one width to one altitude zone includes a coincidence or switch tube 600 of the gas type, a clamper tube 601, an inverter tube 602, and a cathode follower 603. These are shown in the left-hand portion of Fig. 6k. In the right-hand portion of Fig. 6k is shown the pulse selection circuit for controlling the synch pulse output of the transmitter, and this similarly includes a coincidence or switch tube 600 of the gas type, a clamper tube 601, an inverter tube 602, and a cathode follower 603. Input cathode follower 604, shown in the upper right-hand portion of the drawing, is common to all pulse selection circuits. The delayed trigger pulses of line B (Figs. 5a and 5b) from line 253 of block 75 are connected through coupling condenser 605 to the grid of cathode follower 604. The plate of tube 604 is connected to a source of positive potential, its grid is returned to ground through resistor 606, and its cathode is returned to ground through resistor 607, and also is connected to the control grids of all coincidence or switch tubes 600 connected in parallel through coupling condenser 608. Referring now to the pulse selection circuit controlling the synch pulses (the right-hand portion of Fig. 6k), the altitude gates of line N (Figs. 5c and 5d) are connected from line 215 of block 85 through coupling condenser 609 to the suppressor grid of switch tube 600 and to the plate of clamper tube 601. The screen grid of tube 600 is connected to the above-mentioned source of positive potential through resistor 610 and to ground through resistor 611, and its plate is connected to the same source of positive potential through resistor 612 and also is connected to the grid of inverter tube 602 through condenser 613. Resistor 614 is connected between junction point 615 and the same source of positive potential, and resistor 616 and condenser 617 are connected in parallel between ground and junction point 615. The cathodes of all switch tubes 600 and clamper tubes 601 are connected together and to junction point 615. Relative values of resistors 610, 611, 614, and 616 are chosen such that the positive bias at the screen grid of tube 600 is greater than that at its cathode. The plate of inverter tube 602 is connected to the above-mentioned source of positive potential through resistor 618 and is directly connected to the grid of cathode follower 603, whose plate is directly connected to the same source of positive potential and whose cathode is connected to output line 619 leading to block 90 and also to ground through resistor 620. The cathode of tube 602 is directly connected to ground and its grid is returned to ground through resistor 621. The control grids of all coincidence tubes 600 are returned to junction point 615 through resistor 622, and the plates of clamper tubes 601 are returned to ground through resistors 623. The operation of this synch pulse selection circuit is as follows: Switch tube 600 is normally off or non-conducting due to the positive bias upon its cathode obtained from junction point 615. Due to the greater positive bias upon the screen grid of switch tube 600 produced by the network consisting of resistors 610 and 611, whenever an altitude gate such as is shown in line N (Figs. 5c and 5d) is applied to its suppressor grid, this tube will conduct in response to whichever delayed trigger from block 75 occurs during the duration of this altitude gate appearing at its suppressor grid. When switch tube 600 conducts, the negative trigger produced at its plate is inverted by inverter 602 and coupled by cathode follower 603 to line 619 leading to block 90, where it will be used to trigger the proper synch pulse-forming circuit. In the embodiment described, since it is assumed that information is being sent to two altitude zones and since, as abovementioned, it is desired to send any one of three pulses, either the normal, the No. 5 or the No. 6 pulse, to any altitude zone, six of the typical pulse selection circuits shown in the left-hand portion of Fig. 6k will be required. Similar circuit parameters in this circuit and that of the right-hand portion of the drawing are numbered identically. The major differences between the typical pulse selection circuits and the synch pulse selection circuit already described are: (1) The altitude gates of either line O or line P of Figs. 5c and 5d from line 215 of block 85 are connected through coupling condenser 609 to the suppressor grid of switch tube 600, depending upon whether communication is desired with the first altitude zone or the second altitude zone, respectively. (2) Instead of always being positively biased, the potential of the screen grid of switch tube 600 is obtained from line 445 or 455 of block 87, being thus controlled by the signal relay circuits according to occupancy conditions of the particular altitude zone in the embodiment described, and this requires that the screen grid of switch tube 600 be returned to ground through resistor 624. (3) Plate resistor 612 and the subsequent portions of the circuit, including inverter 602 and cathode follower 603, are common to each pulse selection circuit controlling a particular pulse width, either normal, No. 5, or No. 6, and the output at the cathode of cathode follower 603 is connected to the line 625 leading to the proper pulse-forming circuit of block 88 or block 90. The operation of the typical pulse selection circuit is as follows: Switch tube 600 being off or non-conducting due to the positive bias upon its cathode, it will conduct only in response to its three grids being simultaneously raised in potential, and this occurs only when the desired altitude gate of line O or line P (Figs. 5c and 5d) is applied to its suppressor grid and the proper sequence gate is applied to its screen grid as determined by the signal relay circuits of block 87. When these gates are applied to these grids simultaneously, the corresponding delayed trigger pulse of line B (Figs. 5a and 5b) will cause switch tube 600 to conduct, producing a current flow through the common plate resistor 612 and a consequent negative pulse at the grid of common inverter 602, the positive pulse produced at its plate being conducted through common cathode follower 603 and the proper line 625 to the proper pulse-forming circuit of block 88 or 90.

In Fig. 6l are shown pulse-forming circuits 90 and normal pulse-forming circuits 88. Any output from any one of the pulse-forming circuits operates driver tube 630. Each normal pulse-forming circuit includes a pulse-forming network 631, a switch tube 632 of the gas type, and a clamper tube 633. The control grids of switch tubes 632 of all normal pulse-forming circuits are connected together and to the cathode of isolating diode 634. The low sides of all pulse-forming networks 631 are connected together, to the cathode of driver tube 630, and to output line 635 leading to modulator 91. The high side of each pulse-forming network 631 is connected to a source of positive potential through a resistor 636 and to the plate of the corresponding switch tube 632, whose screen grid is connected to the plate of its corresponding clamper tube 633 and to a source of negative potential through resistor 637. The cathodes of all switch tubes 632 and clamper tubes 633 are connected together, to the grid of driver tube 630 through condenser 638, and to one end of resistor 639, whose other end is connected to the cathode of tube 630. The ohmic value of resistor 639 is made approximately equal to the characteristic impedance of each pulse-forming network 631. A damping diode 640, cathode resistor 641, and tail-clipping inductance 642 are connected together in parallel between the cathode of driver 630 and a second source of negative potential, which source of potential, however, is not as great as that to which the screen grids of switch tubes 632 are returned. The grid of driver 630 is connected through resistor 643 to the same source of negative potential as that to which the screen grids of switch tubes 632 are returned, and its plate is connected to ground through condenser 644 and to the above-mentioned source of positive potential through resistor 645. While all pulse-forming networks 631 have been shown in the drawing as including the same number of sections, it is to be understood that this is merely diagrammatic and that the proper number of sections are included in each pulse-forming network to produce a pulse of the desired width. The operation of the normal pulse-forming circuits is as follows: Line 625 from cathode follower 603 of block 86 controlling the normal pulse circuits is connected through condenser 646 to the plate of isolating diode 634. The source of negative potential to which the screen grids of switch tubes 632 is returned is connected to the plate and cathode of tube 634 through resistors 647 and 648, respectively. The sequence gates shown in line J (Figs. 5a and 5b) from line 189 of block 82 are connected through coupling condenser 649 to the plate of the clamper tube 633 which is connected to the screen grid of the switch tube 632 controlling the normal pulse-forming network for the first sequence. Lines 196 from the second, third and fourth sequence gate circuits, respectively, are connected through similar condensers 649 to the plates of the clamper tubes 633 and associated circuits controlling the normal pulse-forming networks of the second, third and fourth sequences, respectively. All switch tubes 632 are normally off or non-conducting due to the negative potential supplied to their screen grids being greater than that supplied to their cathodes, and each switch tube 632 will fire only when its screen grid is raised in potential by the application of its sequence gate simultaneously with a trigger pulse from line 625 being applied to its control grid through isolating diode 634. Whenever one of the switch tubes 632 is turned on or conducts, it allows its pulse-forming network 631 to discharge across cathode resistance 639 to produce a pulse thereat. If the gas tube 632 corresponding to the first sequence normal pulse-forming circuit is the one that fires, a pulse corresponding to one of those of line R (Figs. 5c and 5d) will be produced at its cathode and across cathode resistor 639; if the second sequence normal pulse-forming circuit, it will be one of those of line S; if the third sequence normal pulse-forming circuit, it will be one of those of line T; and if the fourth sequence normal pulse-forming circuit, it will be one of those of line U. This pulse produced across cathode resistor 639 will be coupled to the grid of driver tube 630 through condenser 638, and since, as shown, this driver tube 630 is connected in a 'boot-strapping" circuit, a similar amplified positive pulse will be produced across its cathode resistor 641 and at line 635 leading to modulator 91. Tail-clipping inductance 642 is inserted to insure a sharp trailing edge of the pulse. In the absence of tail-clipping inductance 642, the end of the pulse would trail off gradually due to the distributed capacitance of the circuit, which is not desirable. However, the insertion of inductance 642 alone would produce oscillations including a negative swing of the waveform after the sharp trailing edge if damping diode 640 were not inserted in the circuit.

The pulse-forming circuits of block 90 are similar to those of block 88 except that the screen grids of their gas-type switch tubes 632 are all connected together and to their cathodes, and the control grid of each tube 632 is connected through its isloating diode 634 and coupling condenser 646 to its corresponding cathode follower 603 of block 86. Similar circuit parameters in blocks 90 and 88 which are similarly connected have been numbered identically. Either one of two pulse-forming networks, which produce synch pulse widths A and B, respectively, may be connected to the plate of the gas tube 632 corresponding to the synch pulse-forming circuit by means of switch 650, and this switch is normally set to either A or B, depending upon which type of ground station this is to be, as abovementioned, at the time the ground stations are put into operation and not thereafter changed. Since this embodiment has been assumed to be an A ground station, switch 650 is shown in the A position, thus connecting its switch tube 632 to the A pulse-forming network 631, and this gas tube 632 has its control grid connected through its isolating diode 634 and coupling condenser 646 to line 619 from block 86. The pulse-forming networks 631 producing pulse widths No. 5 and No. 6, respectively, are connected to their respective switch tubes 632, whose control grids are connected through their respective isolating diodes 634 and coupling condensers 646 to the proper line 625 from block 86 connected to the corresponding cathode follower 603. The operation of these pulse-forming circuits of block 90 is similar to that of the pulse-forming circuits of block 88 except that each of these switch tubes 632 will conduct in response to a trigger from block 86 applied to its control grid alone, no supplementary voltage gate being required at its screen grid. The output at the cathode of the gas tube 632 corresponding to the synch pulse-forming circuit is shown in line Q (Figs. 5c and 5d), that of the No. 5 pulse-forming circuit is indicated in line V, and that of the No. 6 pulse-forming circuit is shown in line W.

In Fig. 6m is shown the modulator of block 91. The output from "boot-strap" driver 630 at line 635 is connected to the grids of modulator tubes 660 in parallel through parasitic resistors 661. The screen grids of these two tubes are connected together and to the high voltage source of the transmitter through resistor 662. The plate of each tube 660 is connected through its parasitic resistor 663 and resistor 662 to the same high voltage source. The junction point of resistors 662 and 663 is connected to ground through resistor 664 and to one terminal of condenser 665; the other terminal of condenser 665 is connected to ground through inductance 666, to output line 667 leading to the cathode of the transmitter oscillator, and to the plate of damping diode 668. The cathode of damping diode 668 is connected to ground through resistor 669 and to portional synchronizing line 266 leading to blocks 83 and 92 through coupling condenser 670. The cathode of modulator tubes 660 are connected together and to ground. Modulator tubes 660 are normally off or non-conducting due to line 635 being connected to a source of negative potential within block 90 as above-described, and hence condenser 665 is normally charged to the potential of the high voltage source, its charging path being essentially through resistor 662 and inductance 666. Whenever a positive pulse from "boot-strap" driver 630 is applied via line 635 to the grids of modulator tubes 660, these tubes conduct heavily and allow condenser 665 to discharge through the transmitter oscillator, which may be a magnetron, lighthouse tube and cavity, or the like. At the end of the pulse applied to the modulator tubes 660, these tubes again cease to conduct and condenser 665 ceases to discharge, and the result would be a slow trailing edge pulse at line 667 if tail-clipping inductance 666 were not inserted in the circuit. Tail-clipping inductance 666 produces a sharp trailing edge of the pulse, and damping diode 668 is inserted to prevent the pulse at line 667 from going very far positive after the trailing edge, as it would do due to the presence of inductance 666 if the damping diode were not present as previously discussed. When damping diode 668 conducts, it produces a sharp pulse across resistor 669 which is then utilized as a portional synchronizing trigger in blocks 83 and 92 of the system. While it is stated elsewhere in this disclosure that these portional synchronizing triggers occur simultaneously with the output of the transmitter, it will be noted that actually these occur immediately following the output of the transmitter, when damping diode 668 conducts. This difference in time, however, is so small that it can be disregarded in the operation of the system, and this is the reason that elsewhere in this disclosure these portional synchronizing triggers are treated as occurring simultaneously with the transmitter output.

In Fig. 6n are shown the trigger circuit of block 76 and the pulse-forming circuits 675 of block 71. Pulse-forming circuits 675 include a gas type switch tube 676 associated with a 1 microsecond pulse-forming network 677, a gas type switch tube 678 associated with a 2 microsecond pulse-forming network 679, and a "boot-strap" driver 680. Trigger circuit 76 includes a trigger amplifier 681 and cathode follower 682 and a 1½ microsecond delay tube 683 having associated with it a pulse-forming network 684 and a delay line 685. Each output pulse from line 120 of discriminator 74 (shown in line F, Figs. 5a and 5b) is applied to the cathode of amplifier 681 and thence through cathode follower 682 to the control grid of switch tube 678, turning this tube on and causing pulse-forming network 679 to discharge through the tube, forming a 2 microsecond pulse across cathode resistor 686. This 2 microsecond pulse is then coupled through "boot-strap" driver 680 to the modulator of transmitter 71, the construction and operation of driver 680 being similar to that of "boot-strap" driver 630 of Fig. 6l previously discussed. Each pulse from the output circuit of synchronization receiver 70 (see line A, Figs. 5a and 5b) is coupled via line 73 to the control grid of tube 683 which is also of the gas type, turning this tube on and thus discharging pulse forming network 684 through the tube. Pulse forming network 684, which preferably produces a pulse of 1 microsecond duration, is introduced in the circuit to insure a sharp leading edge pulse at this point, and this pulse is then delayed by delay line 685 by a time preferably equal to about 1½ microseconds before being applied through differentiating condenser 687 to the control grid of switch tube 676. This time delay is chosen such that a 2 microsecond pulse applied from line 73 simultaneously to tube 683 and discriminator 74 will trigger switch tube 678 an instant before switch tube 676 is triggered. Delay line 685 terminates in a resistance 688 whose ohmic value is equal to the characteristic impedance Zc of the line. As shown, the cathodes of switch tubes 676 and 678 are coupled together so that whenever one fires the other is disabled due to the rise of its cathode potential, and hence only one switch tube can fire at a time, tube 676 firing in response to each 1 microsecond altitude pulse from line 73 and tube 678 firing in response to each pulse from line 120 corresponding to each 2 microsecond synch pulse received at this ground station. The circuits shown in Fig. 6n thus repeat each synch and altitude or information pulse received by synchronization receiver 70 for transmission by synchronization transmitter 71, and although a 1½ microsecond delay of each pulse is introduced, this can be taken care of at successive ground stations by varying the delay introduced by each adjustable station delay 75.

In Fig. 7a is shown a block diagram of one embodiment of the airborne apparatus to be carried in each aircraft of the system. Pulses radiated from the ground station are received by antenna 700 and fed to mixer 701. The output of local oscillator 702 is also fed to mixer 701, resulting in each pulse being converted to an intermediate frequency, and thereafter the intermediate frequency pulse is fed to I-F and video amplifier 703. The output of amplifier 703 is fed to timer 704 whose function is to pass only those altitude information pulses intended for the altitude zone in which the aircraft is flying and also to separate and identify the synch pulses. Altitude switch 705 provides a bias voltage to timer 704 which is a direct measure of the altitude at which the aircraft is flying to aid in the first function abovementioned. The proper altitude information pulses passed by timer 704 are next conveyed to normal discriminators 706. After reception, separation, and identification of the synch pulses, timer 704 actuates relays in modulator 707 to control the width of the output pulse which the modulator will produce and in indicator 708 to indicate the pulse width of the synch pulses and thus the type of ground station whose pulses are being received, that is, either A or B. The purpose of controlling the pulse width of the modulator output is to assist in preventing confusion between adjacent ground stations as above-described, and in the embodiment herein described it will be shown that if synch pulses from an A ground station are received the reply pulse from the aircraft will be of corresponding A width, and if from a B ground station the corresponding pulse will be of B width. The normal discriminators 706 separate the pulses passed by timer 704 which are of different widths and whenever a pulse of a certain width is separated the corresponding relay in local relay circuits 709 will be actuated and at the same time modulator 707 may be actuated to initiate a reply pulse from the aircraft as will be hereinafter described. In addition to forming pulses of proper width as above-described which are then fed to oscillator 711 and thence to output antenna 712, modulator 707 also produces a blanking pulse which is fed to I-F and video amplifier 703 to turn this amplifier off whenever a reply pulse is transmitted from antenna 712 in order to prevent the passage of such reply pulses to timer 704. High voltage source 713 is connected to modulator 707 as indicated to provide the necessary voltage for producing the large input pulse required by oscillator 711. In addition to the A and B indicators provided on indicator 708 as above-described, green, red, and double occupancy lights are provided on the face thereof to indicate respectively freedom of movement to the next block, necessity of holding the position in that particular block, and warning of another aircraft in the same altitude zone in the same block, these lights being controlled by local relay circuits 709.

In Fig. 7b is shown an alternative embodiment of the airborne apparatus of Fig. 7a which includes "look-in" and associated circuits for the purpose of allowing the aircraft operator to investigate traffic conditions in adjacent altitude zones and also includes an entry circuit for the purpose of allowing an aircraft to enter upon an air lane from the side. Similar components of Figs. 7a and 7b which are similarly connected have been identically numbered and will not be discussed. Altitude switch 705′ differs from altitude switch 705 in that bias voltages corresponding to several altitude zones are provided for use in timer 704′ as will be described hereinafter, the availability of certain of these bias voltages being controlled by local relay circuits 709′, and timer 704′ differs from timer 704 of Fig. 7a in that a second output (to "look-in" discriminators 714) is provided, timer 104′ passing to discriminators 714 only the altitude pulses for the altitude zone which the aircraft operator desires to "look-in." The output of "look-in" discriminators 714, like the output of normal discriminators 706 and indicator 708′, is fed to local relay circuits 709′, which in turn controls the operation of altitude switch 705′ as above stated, various indicators in indicator 708′, the operation of a delay circuit in modulator 707′, and the operation of various keying circuits in "look-in" discriminators 714. "Look-in" discriminators 714 may also initiate a pulse output from modulator 707′ if such is desired, as for instance, to indicate to the ground station that the aircraft operator wishes to ascend or descend, as the case may be, to the "look-in" altitude zone. Indicator 708′ as shown includes in addition to the indicators provided on indicator 708 separate ones for ascent, descent, and entry and corresponding push-buttons for requesting permission to ascend, descend, and enter a given altitude zone. Modulator 707′ differs from modulator 707 in that a 100 microsecond delay circuit for entry purposes is provided so that each trigger from a keyed amplifier 780 of normal discriminators 706 or "look-in" discriminators 714 is ordinarily delayed by 100 microseconds before being applied to the driver tube of modulator 707′. Because of the fact that each ground station receiver is gated or disabled so that it will not receive reply pulses from aircraft beyond its block boundary, it would be impossible to request entry permission from an aircraft outside a block boundary were such as delay not inserted in the airborne reply circuit. Whenever an aircraft just outside the block boundary desires to request entry, this can be done by removing the delay circuit for one or more reply pulses in a predetermined fashion, and thus these reply pulses will be received at the ground station receiver during the time it is turned on, assuming of course, that the occurrence of the ground station enabling gate is correspondingly delayed by 100 microseconds more than the time required for the passage of a pulse from the ground station to the block boundary and back plus the normal apparatus delay between reception of a pulse by an aircraft and transmission of a reply pulse as above described.

In Fig. 8a is shown a block diagram of timer 704 of Fig. 7a. The output pulses from I-F and video amplifier 703, which are positive, are fed to normally off amplifier 720 and normally on amplifier 721. Amplifier 720 will produce an output leading to normal discriminators 706 only when it is gated on by means of its screen grid as will be hereinafter described. The output of amplifier 721, which is negative, is connected to delay multivibrator 722 and integrator 723. Each negative pulse received by delay multivibrator 722 produces a negative gate at its output of five microseconds duration if the received negative input pulse is less than five microseconds long and equal to the duration of the input pulse if it is greater than five microseconds long. This negative gate is then fed to four separate differentiating circuits 724, 725, 726 and 727, respectively. The resultant positive output from differentiating circuit 727, which thus occurs five or more microseconds after the output of amplifier 721, is connected to its corresponding multivibrator 728 to produce a negative voltage gate of approximately 900 microseconds duration to turn off normally on amplifier 721 in order to insure that no other pulses will be passed by this amplifier until the next regularly scheduled pulse from the ground station is received. A corresponding positive pulse delayed by five or more microseconds at the output of differentiating circuit 725 is connected to normally on gated amplifier 729. If the pulse which initiates the action of delay multivibrator 722 is other than a synch pulse, the screen grid of amplifier 729 will have impressed upon it a negative voltage gate of 20 microseconds duration as will be hereinafter described, and thus gated amplifier 729 will produce a negative output pulse only in response to a synch pulse. Each synch pulse (being of less than five microseconds duration) thus produces a negative pulse delayed after itself by five microseconds at the output of amplifier 729. This delayed pulse is connected to a biased diode 730, to which is also connected a bias voltage obtained from altitude switch 705 that is a direct measure of the altitude zone in which the aircraft is flying. The output of biased diode 730 is connected through cathode follower 731 to altitude phantastron 732 to produce a negative voltage gate ending in a sharp positive spike, the duration of this voltage gate and hence the relative time of occurrence of the positive spike being in turn a direct measure of the altitude at which the aircraft is flying. The output of phantastron 732 is connected to multivibrator 733 and the positive spike at the end of the negative gate will initiate a positive gate at the output of multivibrator 733 which is then fed to the screen grid of normally off amplifier 720 as above described. The positive pulse at the output of differentiating circuit 726, which is delayed by five microseconds after the corresponding input pulse unless the input pulse is longer than five microseconds, in which case it is delayed by a time corresponding to the pulse width as above stated, is fed through inverter amplifier 734 and rectifier 735 to the abovementioned input of multivibrator 733 to turn the output of this multivibrator off. Briefly then the action thus far described is as follows: Each synch pulse produces a positive spike phantastron output to trigger multivibrator 733 into operation at the proper time corresponding to the altitude zone in which the aircraft is located so that normally off amplifier 720 will be gated on by means of its screen grid just prior to the scheduled arrival time of the signal pulses for the particular altitude zone. Any subsequent altitude information pulse will be passed by amplifier 720 and also by amplifier 721 to produce a corresponding negative pulse at the output of inverter amplifier 734 to turn multivibrator 733 off, hence causing its voltage gate output to cease and preventing amplifier 720 from passing any further pulses. Timer 704 may be modified to provide a timer 704', such as is required for the block diagram of Fig. 7b, by including another normally off amplifier 720, another biased diode 730, another cathode follower 731, another altitude phantastron 732, and another multivibrator 733, these being similarly connected to control the passage of pulses received from I-F and video amplifier 703 to "lookin" discriminators 714. The remainder of Fig. 8a includes a pulse width discriminator for separating and identifying synch pulses of A and B widths. Its operation is as follows: Each negative pulse at the input of integrator 723 produces at its output a saw-tooth voltage wave whose peak amplitude is a measure of the duration of the negative input pulse. This saw-tooth wave is coupled through cathode follower 740 to the inputs of two biased amplifiers 741 and 742, respectively. Assuming that the A pulse width is 0.7 microsecond and that the B pulse width is 1.5 microseconds in this system, amplifier 741 might be biased so that it would produce an output only if an input saw-tooth had a peak amplitude corresponding to a pulse of 1.2 or greater microseconds. Similarly amplifier 742 would be biased so that it would produce an output only for an input saw-tooth whose peak amplitude corresponded to a pulse duration of 2.5 or greater microseconds. Any output of biased amplifier 741 is coupled to multivibrator 743 and any output from biased amplifier 742 is connected to multivibrator 744. The output of multivibrator 744, which is a negative voltage gate of 20 microseconds duration, is coupled through rectifiers 745 and 758 to the screen grids of gated amplifiers 746 and 729, respectively. The output of multivibrator 743 is connected to differentiating circuit 747 and also through rectifier 748 to the screen grid of gated amplifier 749. The output of gated amplifier 749 triggers multivibrator 750, whose square wave output is amplified by power amplifier 751 and rectified by bridge rectifier 752 before being fed to A pulse relay 753, and the output of amplifier 746 is similarly connected to multivibrator 754, whose output is coupled through power amplifier 755 and bridge rectifier 756 to B pulse relay 757. The contacts of pulse relays 753 and 757 (A line and B line, respectively) are connected to modulator 707 and indicator 708 as shown in Fig. 7a. Any pulse whose duration is less than 1.2 microseconds will trigger delay multivibrator 722 to produce a positive pulse delayed five microseconds thereafter at the input of normally on gated amplifier 749. The positive pulse at the input of amplifier 749 will produce a negative pulse at the input of multivibrator 750, whose output consists of positive voltage gate of approximately 8,333 microseconds duration which is then amplified by power amplifier 751 and rectified by rectifier 752 to actuate A pulse relay 753. Any pulse greater than 1.2 microseconds duration will produce the same positive pulse delayed by five microseconds at the input of amplifier 749 but at the same time a negative pulse will be produced at the input of multivibrator 743 which will then produce a negative voltage gate at its output of 15 microseconds duration and this is coupled through rectifier 748 to the screen grid of gated amplifier 749, thus preventing amplifier 749 from producing a negative output to close A pulse relay 753. At the same time, differentiating circuit 747 will produce a positive pulse at its output delayed by 15 microseconds after the corresponding input pulse applied to integrator 723, and this being applied to gated amplifier 746 will produce a negative pulse output to trigger multivibrator 754 into operation and close B pulse relay 757 unless the input pulse is of greater than 2.5 microseconds duration. If the input pulse is greater than 2.5 microseconds long, biased amplifier 742 will produce a negative output which triggers multivibrator 744 to produce at its output a 20 microsecond negative voltage gate, and this is then coupled through rectifier 758 to the screen grid of amplifier 729 as above described and through rectifier 745 to the screen grid of amplifier 746 to prevent amplifier 746 from producing a negative pulse at its output to trigger multivibrator 754, thus preventing B pulse relay 757 from closing. Thus it is seen that A pulse relay 753 will be closed only in response to a pulse of less than 1.2 microseconds duration and that B pulse relay 757 will be closed only by a pulse whose duration is within the limits of 1.2 to 2.5 microseconds, and that an output will be produced from gated amplifier 729 only if the input pulse is less than 2.5 microseconds long, or in other words a synch pulse. These discriminator ciruits above disclosed are more fully described and claimed in the application of Lionel H. Orpin for Pulse Duration Discriminator filed concurrently herewith.

In Fig. 8b is shown a detailed block diagram of normal discriminators 706. Each negative pulse passed by timer 704 is coupled to integrator 770, which converts it into a saw-tooth wave whose peak amplitudes is a measure of the width of the input pulse. This saw-tooth is coupled through cathode follower 771 to the inputs of six biased amplifiers 772, assuming that pulses of six different widths are to be separated one from the other as above-mentioned. For purposes of illustration assume that the No. 6 or check pulse is the shortest, being 3 microseconds long, and that the four "normal" pulses, Nos. 1, 2, 3 and 4 are four, five, six and one-half, and eight microseconds long, respectively, and that the No. 5 or blank pulse is the longest, being 10 microseconds long. Amplifier 772 of the top line of the drawing (corresponding to the No. 6 pulse width circuit) is biased such that it will produce an output only for a saw-tooth whose peak amplitude corresponds to an input pulse of greater than 2.5 microseconds duration. The five successive amplifiers 772, going from top to bottom, are biased to limits of 3.5 microseconds, 4.5 microseconds, 5.8 microseconds, 7.3 microseconds and 9 microseconds, respectively. The output of each biased amplifier 772 is connected to its corresponding delay multivibrator 773, and each successive delay multivibrator 773, going from the top of the drawing to the bottom, is arranged to produce a slightly longer output gate than the preceding multivibrator for disabling purposes as will be explained hereinafter. The output of each delay multivibrator 773 except that of the bottom line is connected through its corresponding differentiating circuit 774 to its corresponding gated or double input amplifier 775, and in addition the output of each delay multivibrator 773 except that of the top line is connected to the input of the gated amplifier 775 of the line above. The output of each gated amplifier 775 is connected to its corresponding 60 cycle multivibrator 776, whose output is then coupled through its power amplifier 777 and bridge rectifier 778 to actuate its corresponding relay. In addition, the output of each gated amplifier 775 except that of the top line is coupled through its corresponding pulse transformer 779 to its keyed amplifier 780, whose operation is controlled by its corresponding relay (782, 783, 784, or 785) in order to insure that no keyed output results unless the corresponding relay operates, and whose output leads to modulator 707. The relay of the first line, corresponding to the No. 6 pulse, is 781; that of the second line, the No. 1 relay, is 782; the No. 2 relay is 783; the No. 3 relay is 784; and the No. 4 relay is 785. The output of each relay is also connected to local relay circuits 709. The operation of this discriminator briefly is as follows: Assuming that a 3 microsecond pulse has been received from the ground station by the airborne apparatus at a time corresponding to the altitude zone in which the aircraft is located, this 3 microsecond pulse would have then been passed by timer 704 to integrator 770 to produce a saw-tooth voltage of commensurate amplitude at the input of each biased amplifier 772. Only the amplifier 772 of the top line of the drawing, however, would produce an output because of the successively greater bias on the successive amplifiers 772, and its output, which is negative, would trigger its delay multivibrator 773 to produce a negative voltage gate at its output. The trailing edge of this negative gate is differentiated by differentiating circuit 774 to produce a delayed positive pulse which is then applied through gated amplifier 775 to trigger 60 cycle multivibrator 776 into operation. The positive voltage gate output of multivibrator 776 is amplified by power amplifier 777 and rectified by rectifier 778 to actuate No. 6 relay 781, indicating the reception of a No. 6 pulse at the aircraft from the ground station. Similarly, if a 4 microsecond pulse were received from the ground station, a delayed positive output would be produced from differentiating circuit 774 of the top line and also from the differentiating circuit 774 of the next lower line. Since the output of the delay multivibrator 773 of the second line, which is a negative gate, is also coupled to the input of the gated amplifier 775 of the top line, however, the delayed positive pulse applied to this amplifier 775 would produce no output and the No. 6 relay 781 would not be closed. However, there would be a resultant output from the gated amplifier 775 of the second line, and this in a similar manner to that described above would result in the closing of the No. 1 relay 782. The same negative pulse from gated amplifier 775 of the second line that initiated the closing of No. 1 relay 782 would also be connected through the pulse transformer 779 corresponding to the second line to its keyed amplifier 780, and this amplifier 780 being keyed on by the closing of relay 782, an output would result to modulator 707 to initiate a reply pulse from oscillator 711 of the aircraft back to the ground station. The operation of the next three circuits is similar to that of the second line, successively longer pulses of approximately five, six and one-half, and eight microseconds being required to actuate the successive amplifiers 772 as above-described. The biased amplifier 772 of the lowest line has been assumed to correspond to the No. 5 or blank pulse, thus not requiring any actuation of the local relay circuit 709 or modulator 707, and hence the output of its delay multivibrator 773 is utilized merely to insure that the gated amplifier 775 of the previous line is prevented from producing an output if a No. 5 pulse is passed by timer 704. Thus it is seen that because of the disabling function of each successive discriminator, only one discriminator at a time can operate, insuring reliable operation; that no synch pulses can produce operation of these discriminators, since all are biased to a sufficiently great magnitude that a synch pulse saw-tooth output from integrator 770 will not produce an output from any discriminator; and that any pulse whose width is greater than that normally used in code sequences (in the examples given, greater than 10 microseconds) will prevent operation of any discriminator by producing a blanking or disabling voltage gate from the output of the delay multivibrator 773 of the lowest line. It will also be noted in this embodiment that only the Nos. 1, 2, 3, 4 and 6 relay circuits control the local relay circuits 709, and that only the Nos. 1, 2, 3 and 4 discriminator circuits can initiate a reply pulse from the aircraft. These discriminator circuits above-disclosed are described more fully and claimed in the application of Lionel H. Orpin for Pulse Duration Discriminators filed concurrently herewith.

In Fig. 8c is shown a detailed block diagram of "look-in" discriminators 714, whose circuit components are similar to those of normal discriminators 706. Similar circuit components have been similarly numbered in Figs. 8b and 8c. "Look-in" discriminators 714 comprise five circuits adjusted respectively to pass the Nos. 1, 2, 3, 4, and 5 pulses transmitted from the ground station. The No. 1 and No. 3 pulse circuits include a keying amplifier 780 whose output is delivered to modulator 707' and whose operation is controlled from the ascent and descent circuits respectively of local relay circuits 709'. As is shown in the circuit diagram, only the Nos. 1, 2, 3 and 4 pulse circuits control the local relay circuits 709', the biased amplifier 772 and delay multivibrator 773 shown in the lowest line of the figure, corresponding to the No. 5 pulse circuit, being included only in order to disable the No. 4 pulse circuit in the event a No. 5 pulse is received.

Figure 9A:
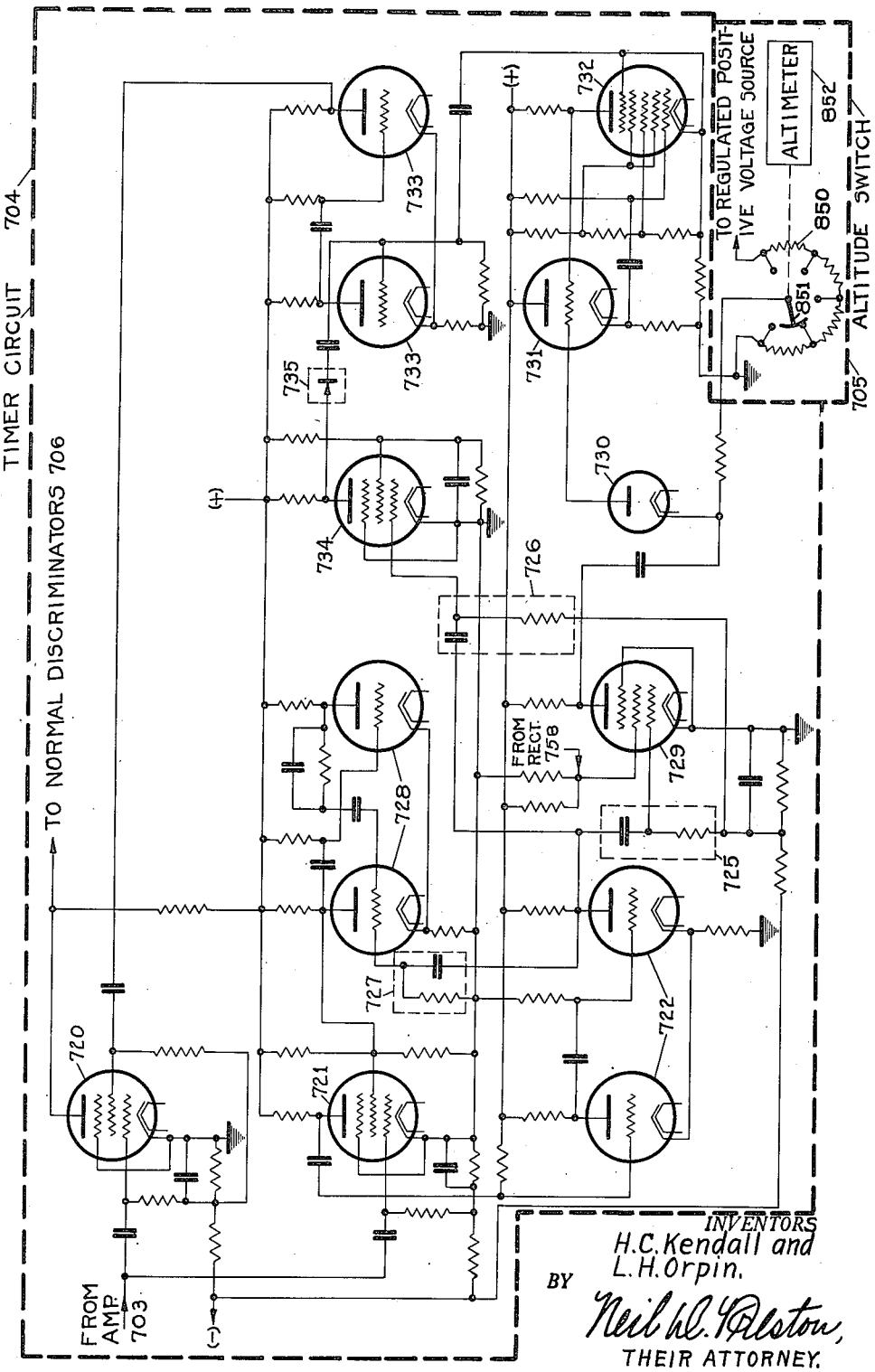
Figure 9D:
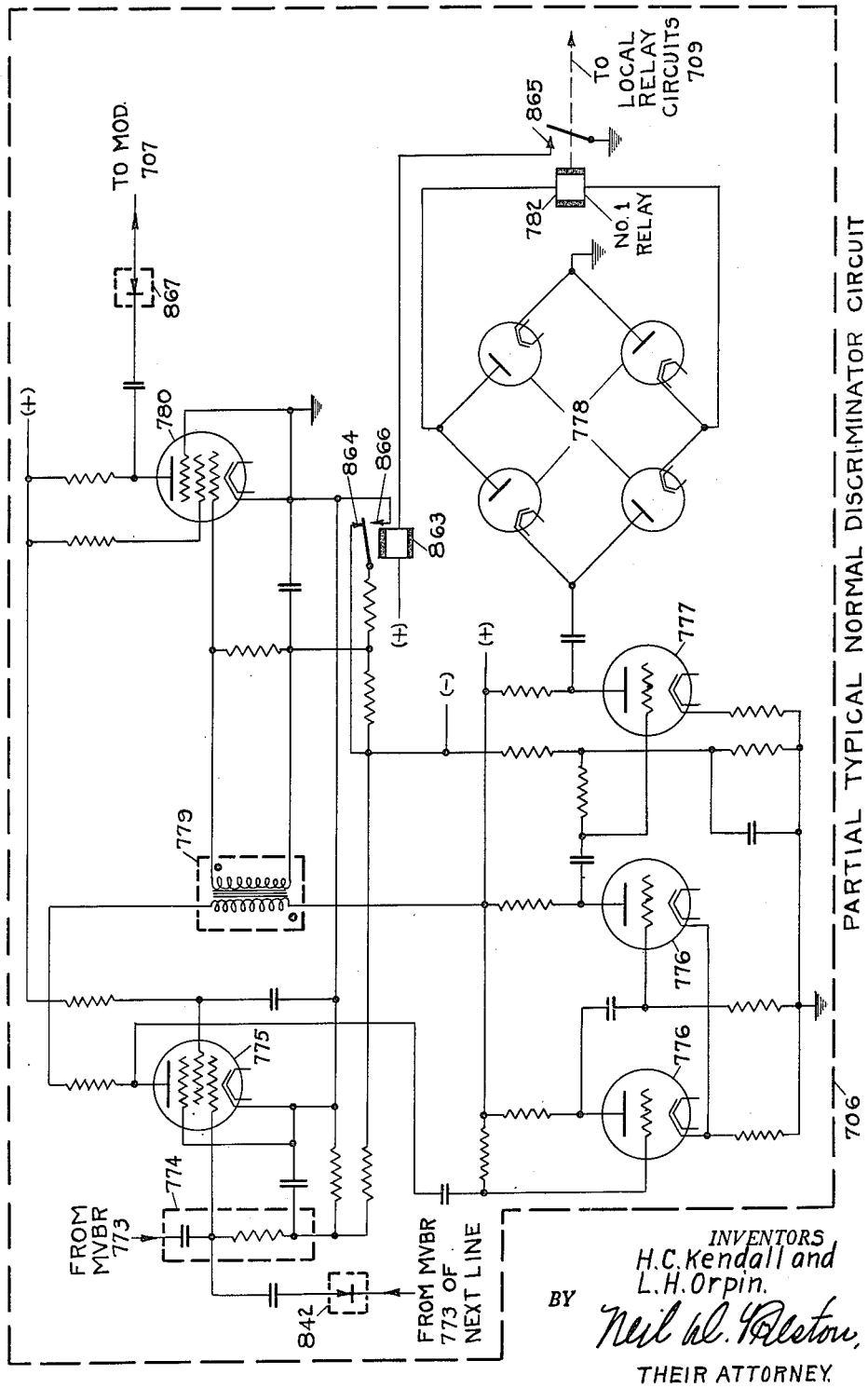

In Figs. 9a, 9c and 9d are shown in detail circuit diagrams of those circuit components illustrated in block diagram form in Figs. 8a, 8b and 8c. In Fig. 9a is shown the timer circuit portion of timer 704, which includes roughly the upper half of Fig. 8a, and altitude switch 705. Since the connections between circuit components and their operation have been above-described in connection with Fig. 8a, no detailed description will be given except for altitude switch 705. As shown, it comprises a step-by-step potentiometer 850 whose end terminals are connected respectively between a regulated positive voltage source and ground, each step corresponding to one altitude zone. Slider 851 of potentiometer 850 is electrically connected through a resistor to the cathode of biased diode 730 and is mechanically connected to the shaft 20 of an altimeter 852. Thus the voltage at slider 851 is a direct measure of the altitude zone in which the aircraft is located. Timer 704' as above-described differs from timer 704 in that an additional biased diode 730, cathode follower 731, altitude phantastron 732, multivibrator 733 and amplifier 720 are provided and similarly connected, the plate of the second amplifier 720, however, being connected to "look-in" discriminators 714 and the cathode of the second biased diode 730 being connected to altitude switch 705' as shown in Fig. 9b.

In Fig. 9b is illustrated the detailed circuit diagram of altitude switch 705'. Altitude switch 705' differs from switch 705 in that additional slider arms are provided on potentiometer 850'. For instance, assuming it is desired to "look in" the altitude zone above and below the altitude zone in which the aircraft is located, two additional sliders 853 and 854 are required on potentiometer 850', one on either side of slider 851, all three sliders being electrically insulated one from the other but all three being mechanically connected to the shaft of altimeter 852. These two additional sliders 853 and 854 are then electrically connected by means of remote controlled relays 855 and 856 to the cathode of the second biased diode 730 of timer 704' in such a way that the second altitude phantastron 732 will turn on the second amplifier 720 at the proper time to receive the altitude or information pulses intended for the altitude zone above or below the normal altitude zone in which the aircraft is located as desired. As shown, relay 855 is energized by the descent circuits of block 709' and relay 856 is energized by the ascent circuits of block 709'. When relay 855 is energized and relay 856 is de-energized, slider 853, corresponding to the altitude below the normal altitude zone, is connected to the cathode of the second biased diode 730 of timer circuit 704' through relay contacts 857 and 858, and when relay 856 is energized and relay 855 is de-energized, slider 854, corresponding to the altitude zone above the normal altitude zone, is connected to the cathode of the second biased diode 730 of timer 704' through relay contacts 859 and 860. As in timer 705, slider 851 is directly connected to the cathode of the first biased diode 730.

Fig. 9c shows in detail a typical timer discriminator circuit, the one for separating the B synch pulses shown in block diagram form in the lower half of Fig. 8a. The A synch pulse timer discriminator circuit is similar. Again, since the connections between its components and its operation have already been discussed, it will not be taken up here in detail except as regards the operation of B pulse relay 757. When B synch pulses are being received by the aircraft, relay 757 is energized and the control circuit leading to indicator 708 is completed to the indicator lamp voltage source through contact 861. At the same time, the control circuit leading to modulator 707 is completed through contact 862. Both of these control circuits will be discussed more fully hereinafter.

In Fig. 9d is shown part of a typical normal discriminator circuit, the one that controls the No. 1 relay shown in block diagram form in Fig. 8b. Since integrator 770, cathode follower 771, biased amplifier 772, and delay multivibrator 773 are similar to integrator 723, cathode follower 740, biased amplifier 741, and multivibrator 743 of Fig. 9c, these have not been shown in detail here, Fig. 9d starting with the output from the No. 1 circuit multivibrator 773. Amplifier 775 is similar to amplifier 746 of Fig. 9c except that the disabling or blanking pulse from the successive discriminator is applied to its control grid through rectifier 842 whereas the disabling or blanking voltage for amplifier 746 is applied to its screen grid, the result being the same in either case. Relay 863, controlled by No. 1 relay 782, is shown connected in the control grid bias circuit of keyed amplifier 780. When relay 863 is de-energized, its armature is connected to the upper contact 864 as shown, resulting in a large negative bias being applied to the control grid of amplifier 780 and thus preventing the amplifier 780 from producing an output. When the No. 1 pulse has been received by the air-borne equipment and passed through normal discriminators 706, the No. 1 relay 782 is energized, which then results in relay 863 being energized through contact 865. When relay 863 is energized, its armature is grounded through the lower contact 866, thus reducing the bias upon amplifier 780 and allowing this tube to amplify pulses received at its grid from pulse transformer 779. These amplified pulses are then coupled through rectifier 867 to modulator 707. Since the other connections between the components of this discriminator circuit and its operation have been above-described, it will not be discussed further in detail. This same discriminator circuit is used in "look-in" discriminators 714, the only difference being that relay 863 controlling the bias of keyed amplifier 780 is there controlled by the ascent or descent circuit of block 709' as indicated in Fig. 8c rather than by the corresponding No. 1, 2, 3 or 4 pulse relay circuits as indicated in Fig. 9d for normal discriminators 706.

Figure 9E:
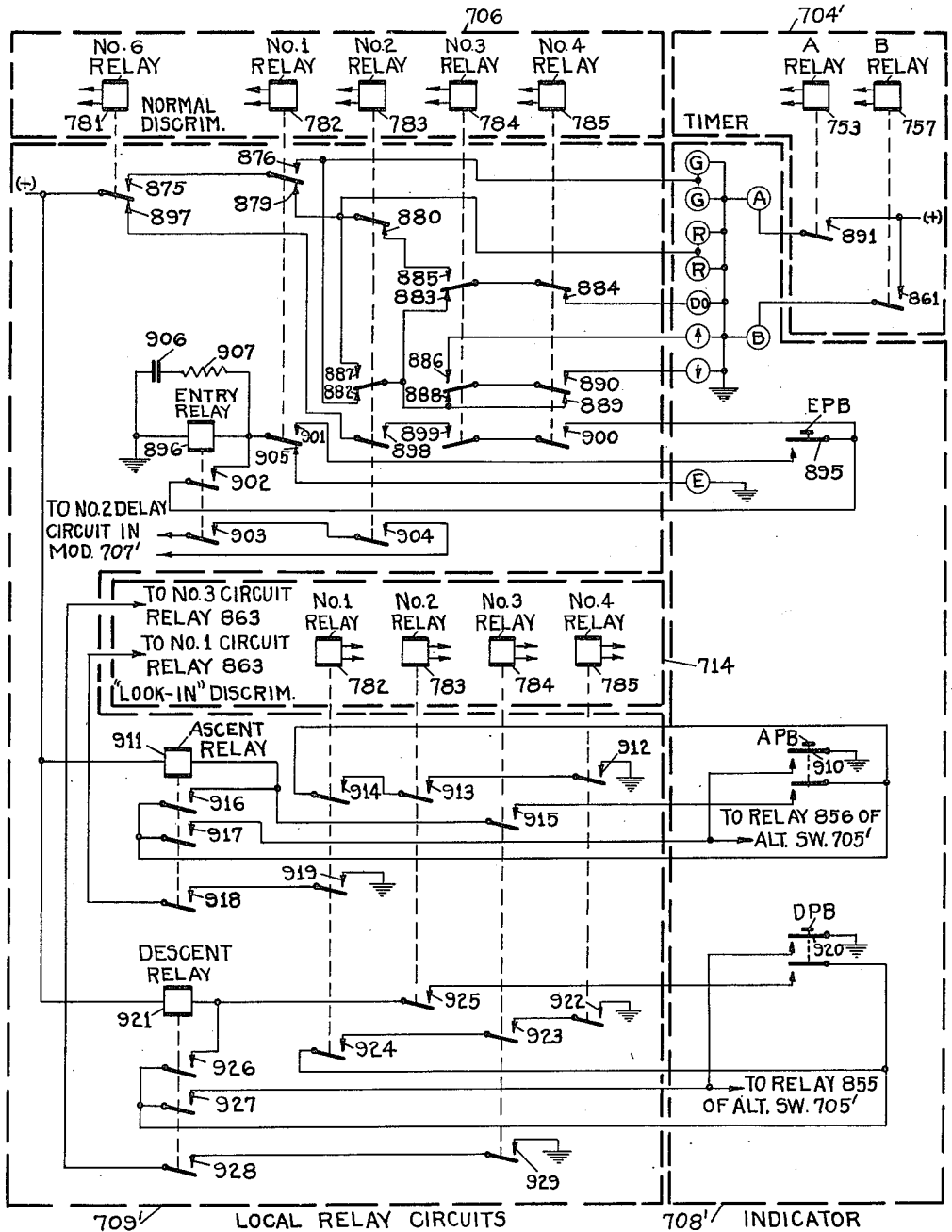

In Fig. 9e are shown the detailed components of local relay circuits 709' and their inter-relation with the components of normal discriminators 706, "look-in" discriminators 714, timer 704', and indicator 708'. Assuming the same codes as those shown in Fig. 6i, the green lights of indicator 708', represented by the circles with a G inscribed therein, will be lighted whenever a No. 1 pulse is received by the airborne equipment and this reception is checked with the ground station, since the No. 6 or check relay 781 and No. 1 relay 782 then will be energized, the source of potential then being connected to the green lights through relay contacts 875 and 876. Similarly, when a No. 1 pulse is not being received by the aircraft and this non-reception has been checked with the ground station, the red lights (similarly represented as above) will be lighted through contacts 875 and 879 as shown. Also with the assumed codes supra, in case of double occupancy following a green or cruising signal, the double occupancy light will be lighted through contacts 875, 876, 882, 883, and 884, and if following a red or hold signal, through contacts 875, 879, 880, 885, and 884. The ascent light, represented by the circle with an arrow pointing upward incribed therein, will be lighted through contacts 875, 876, 882, 889, and 886 if permission or an order to ascend is specified by the ground station following a green or cruising signal, and through contacts 875, 879, 887, 889, and 886 if following a red or hold signal. Similarly the descent light, represented by a circle with an arrow pointing downward inscribed therein, will be lighted through contacts 875, 876, 882, 888, and 890 if permission or an order to descend is specified by the ground station following a green or cruising signal, and through contacts 875, 879, 887, 888, and 890 if following a red or hold signal. The A pulse light indicating the reception of A synch pulses by the aircraft is lighted through contact 891 whenever A relay 753 of timer 704' is energized and the B light is similarly lighted through contact 861 whenever B relay 757 is energized. If an aircraft desires to enter a block of the air lane from the side, the operator must close entry push-button 895 (marked EPB in Fig. 9e) of indicator 708'. If the altitude zone which the aircraft desires to enter is clear, as indicated by Nos. 1, 2, 3 and 4 pulses being sent and no No. 6 pulse being sent to that altitude zone, entry relay 896 will be energized through contacts 897, 898, 899, 900, and 901 and entry push-button 895. Once entry relay 896 is energized it is no longer necessary to hold down entry push-button 895 since it is by-passed by a "stick" circuit through contact 902. This "stick" circuit also by-passes contact 901 associated with the No. 1 relay 782 since permission to enter, if granted by the ground station, will be manifested to the aircraft by a change in the ground station code consisting of the ground station thereafter ceasing to transmit the No. 1 pulse. When entry relay 896 is energized, the control circuit to the No. 2 pulse delay circuit in modulator 707' is completed through contacts 903 and 904, resulting in the 100 microsecond delay being removed from the No. 2 pulse reply circuit of modulator 707', thus manifesting a desire for entry into the particular altitude zone by the aircraft to the ground station. If this is permitted by the ground station, it will be acknowledged in the ground station pulse code by a change to omit the sending of the No. 1 pulse as above-described, which then energizes the entry light (represented by a circle with an E inscribed therein) through contact 905, indicating to the aircraft operator permission to enter at that particular altitude zone into that block of the air lane. Condenser 906 and resistor 907 are connected in series across the coil of relay 896 in order to make it of the slow release type so that the entry circuit will not be disabled in case of momentary failures to continue the checking of the code received with the ground station. It will be noted that closing entry push-button 895 cannot energize entry relay 896 and thus request permission to enter within the block boundaries by closing the circuit through contacts 903 and 904 unless the altitude zone within the block corresponding to the altitude at which the aircraft is flying is unoccupied. Ascent and descent requests by an aircraft are controlled through the pulse relays of "look-in" discriminators 714. In case an aircraft flying in a particular altitude zone of a block desires to ascend, the operator must close ascent push-button 910 which completes the circuit of relay 856 of altitude switch 705' to ground as shown, thus connecting the discriminator circuits of block 714 to receive the altitude or information pulses intended for the altitude zone above that in which the aircraft is located as above-described in connection with Fig. 9b. If the zone above is unoccupied, its Nos. 1, 2, 3 and 4 pulses will be received by "look-in" discriminators 714 and relays 782, 783, 784 and 785 will be energized, and therefore ascent relay 911 will be energized through contacts 912, 913, 914 and 915, and the lower contact of ascent push-button 910. Thereafter, since ascent relay 911 is energized, ascent push-button 910 need no longer be held closed since its lower contact is by-passed by a "stick" circuit through contact 916 and its upper contact is now also grounded through contacts 912, 913, and 914 and contact 917 of a second "stick" circuit. The "stick" circuit through contact 916 also by-passes contact 915, since once permission is granted to an aircraft to ascend to the altitude zone above, the ground station ceases to send the No. 3 pulse to that zone in order that other aircraft may not thereafter request entry into that zone. Ascent relay 911 when energized will complete the ascent control circuit through contacts 918 and 919, and this ascent control circuit is connected to the No. 1 circuit relay 863 in "look-in" discriminators 714 where it turns on the No. 1 pulse circuit keyed amplifier 780 (Fig. 8c) to allow it to trigger modulator 707' into operation to manifest to the ground station a desire for entry into the altitude zone above. When the reply pulse from the aircraft corresponding to the No. 1 pulse of the altitude zone above is received at the ground station, the request for ascent if permitted is acknowledged by the ground station thereafter ceasing to send the No. 3 pulse to the altitude zone above and changing the code sent to the altitude zone in which the aircraft is located to light the ascent light as above-described. Requests for descent to the altitude zone below that in which the aircraft is located are controlled in a similar fashion, the closing of descent push-button 920 completing the circuit of relay 855 of altitude switch 705' to ground as shown, thus connecting the discriminator circuits of block 714 to receive the altitude or information pulses intended for the altitude zone below that in which the aircraft is located as above-described in connection with Fig. 9b. If the altitude zone below is unoccupied, its Nos. 1, 2, 3, and 4 pulses will be received by "look-in" discriminators 714 and relays 782, 783, 784 and 785 will be energized as before for ascent, and therefore descent relay 921 will be energized through contacts 922, 923, 924, and 925 and the lower contact of descent push-button 920. The lower contact of descent push-button 920 and relay contact 925 are by-passed by a "stick" circuit through descent relay contact 926, the lower contact being by-passed in order that the descent relay will remain energized without requiring the descent push-button to be closed continuously and contact 925 being by-passed since the No. 2 pulse to the altitude zone below is no longer sent from the ground station when permission to the aircraft is granted to descend in order that other aircraft may not thereafter request entry into that particular altitude zone in that block. Similarly, a second "stick" circuit through descent relay contact 927 is provided as shown so that descent push-button 920 need no longer be depressed in order to complete the circuit to relay 855 once descent relay 921 is energized, since then the circuit from relay 855 to ground is completed through contacts 922, 923, 924, and 927. The descent control circuit is closed through contacts 928 and 929 and is connected to the No. 3 circuit relay 863 of "look-in" discriminators 714, the operation of this control circuit being similar to that of the ascent control circuit above-described. Thus it is seen that lights are provided in indicator 708' to show in which type of block, that is, either A or B, the aircraft is located; that green or cruising and red or hold signals are provided for the particular altitude zone in which the aircraft is located within the block and that the green and red lights cannot be on simultaneously; that lights indicating double occupancy, permission or an order to ascend, and permission or an order to descend are provided and can be lighted simultaneously with either the green or red lights; that an entry-push-button is provided to request permission to enter within a block from the side and this permission if granted will light an entry light provided in indicator 708'; that ascent and descent push-buttons are provided for the purpose of requesting permission to ascend or descend into the next altitude zone from the altitude zone in which the aircraft is located in a particular block, and that this permission if granted will result in the lighting of the corresponding ascent or descent light, whichever is requested as above-described; and that once an aircraft has been granted permission to enter, ascend, or descend into an unoccupied altitude zone of a particular block, the clear signal code sent to that altitude zone is thereafter changed in order to prevent other aircraft from requesting entrance into that block. It will be noted that only entry into an air lane block from the side is governed by the entry circuit above-described. In case an aircraft desired to take off from an airport within the limits of a block boundary, the procedure would be to turn on its airborne equipment when ready for taking off, which would then express its occupancy in zone 0, and thereafter request permission to ascend to the next altitude zone by pushing ascent push-button 910, continuing this procedure from altitude zone to altitude zone until the aircraft reaches the desired altitude.

In Fig. 9f are shown the detailed components of local relay circuits 709 and their inter-relation with the components of normal discriminators 706, timer 704, and indicator 708. The relaying circuits of local relay circuits 709 are all included in local relay circuits 709' and are similarly numbered, and their operation and interconnections having been described above, they will not be discussed further here.

Figure 9H:
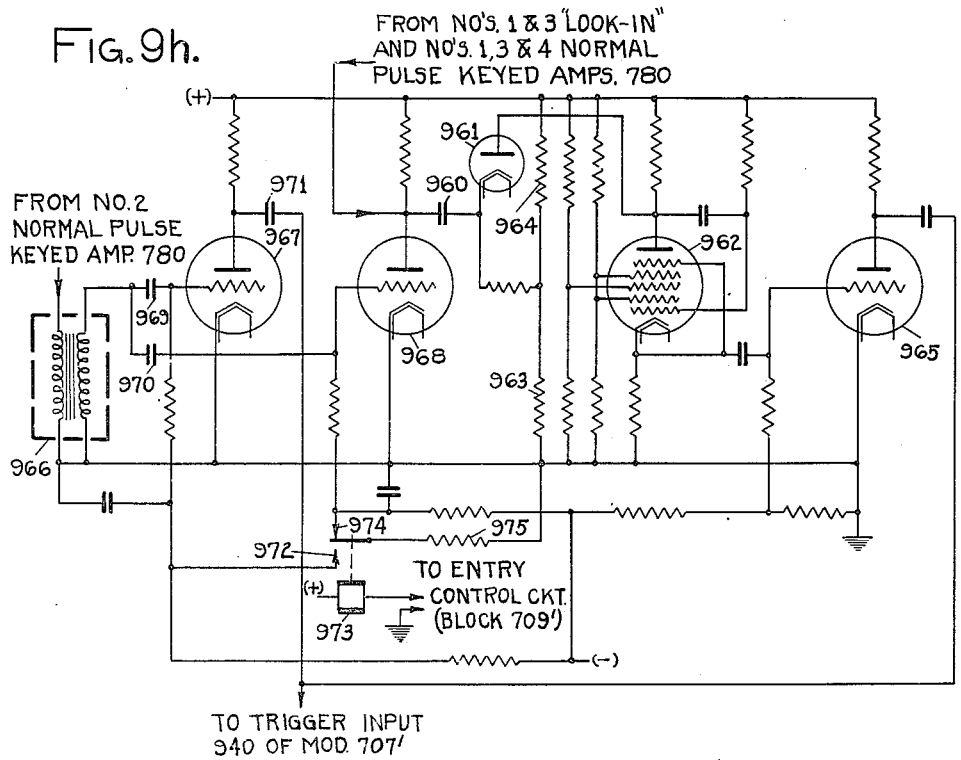
Figure 9G:
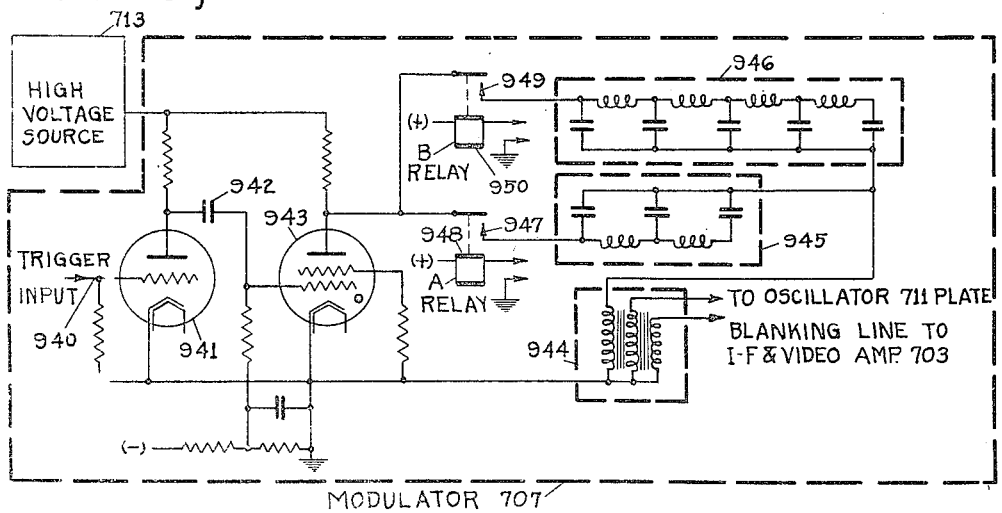

In Fig. 9g are shown the detailed circuits of modulator 707. The output of each keyed amplifier 780 of normal discriminators 706 is connected to trigger input line 940 leading to the grid of inverter-amplifier tube 941. The plate of tube 941 is coupled through condenser 942 to the control grid of gas-type switch tube 943, high voltage source 713 supplying the plate potential for both tubes 941 and 943. The primary of output pulse transformer 944 is connected between the cathode of gas tube 943 and one terminal of each of pulse forming networks 945 and 946, the A and B pulse forming networks respectively. The other terminal of network 945 may be connected through contact 947 of A relay 948 to the plate of tube 943, and similarly the other terminal of network 946 may be connected through terminal 949 of B relay 950 to the plate of tube 943. Whenever an output from a keyed amplifier 780 of normal discriminators 706 occurs, this being negative will produce an amplified positive trigger pulse at the plate of tube 941 and at the control grid of switch tube 943. Either pulse forming network 945 or 946 will be connected in series with the primary of pulse transformer 944 between the plate and cathode of tube 943 because A relay 948 and B relay 950 are energized from the outputs of A and B pulse relays 753 and 757, respectively (Fig. 8a), and either one or the other of these relays will be closed since the aircraft if within a block boundary is continuously receiving either A or B synch pulses, depending upon in which type of block the aircraft is located. Assuming that network 945 produces a 1 microsecond pulse and network 946 a 2 microsecond pulse, and as above-mentioned that the aircraft being discussed is in an A block, whenever tube 943 is turned on due to a positive pulse being applied to its control grid, pulse forming network 945 will discharge through tube 943, thus producing a pulse of 1 microsecond duration in the primary coil of transformer 944. A similar pulse is induced in the first secondary of transformer 944 and is coupled to the plate of oscillator 711, and a similar smaller pulse from the second secondary of transformer 944 is coupled via a "blanking" line to I-F and video amplifier 703 for disabling purposes as above-mentioned.

In Fig. 9h is shown the detailed circuit which when added to that of modulator 707 transforms it into modulator 707'. Briefly, it consists of a delay circuit for introducing a fixed delay between the time of reception of an altitude information pulse by the aircraft and transmission of a corresponding reply pulse to the ground station for the purpose of allowing entry requests to be communicated to a ground station from without the block boundary as above discussed. The outputs from the keyed amplifiers 780 corresponding to the Nos. 1 and 3 pulse "look-in" discriminators 714 and Nos. 1, 3 and 4 pulse normal discriminators 706 are connected through condenser 960 to the cathode of clamping diode 961. The plate of diode 961 is connected to the plate of phantastron 962 and its cathode voltage, which is determined by the relative values of resistors 963 and 964, in turn determines the positive potential at which the plate voltage of phantastron 962 is "clamped" or held fixed. In this embodiment, as above stated, it will be assumed that relative values of resistors 963 and 964 are chosen such that phantastron 962 produces a 100 microsecond delay. The operation of phantastron 962 is similar to that of phantastron 732 discussed in connection with Figs. 8a and 9a, and the output at its cathode consists of a negative gate ending in a positive pip, the start of the gate coinciding with the negative pulse applied through condenser 960 to the cathode of diode 961 and the positive pip being delayed by the predetermined chosen time, in this case 100 microseconds. This positive pip is amplified and inverted by trigger amplifier tube 965 and is then connected to trigger input line 940 of inverter-amplifier 941. The output from the keyed amplifier 780 corresponding to the No. 2 pulse normal discriminator 706 is connected to the primary of pulse transformer 966. The secondary of this transformer is connected to the control grids of switch tubes 967 and 968 through condensers 969 and 970 respectively. The plate of switch tube 967 is connected to trigger input 940 through condenser 971 and the plate of switch tube 968 is connected through condenser 960 to the cathode of diode 961 as above described. The grid bias circuit of tube 967 is connected to lower contact 972 of entry relay 973 and the grid bias circuit of tube 968 is similarly connected to upper contact 974. Entry relay 973 is connected to the entry control circuit of local relay circuits 709' (Fig. 9e), and hence the operation of switch tubes 967 and 968 is controlled by the entry circuit. When the aircraft operator desires to request entry from off the airway, entry relay 973 is energized in a manner above described, which results in the bias on switch tube 967 being reduced since lower contact 972 is then returned to ground through resistor 975. Similarly when entry is not requested, the bias on tube 968 is reduced through upper contact 974, it being assumed that the negative potential applied to tubes 967 and 968 is great enough to keep them "cutoff" in the absence of a connection to ground through resistor 975. Thus, when switch tube 967 has its bias reduced, each input negative pulse from the No. 2 normal pulse keyed amplifier 780 is coupled directly to trigger input 940 with no delay, whereas when the bias on tube 968 is reduced, the input pulse is coupled through phantastron 962, introducing a 100 microsecond delay.

In Fig. 10 is shown in block diagram form the circuit of a master timer for synchronizing the output of the ground stations. As shown, the 1080 cycles per second (c. p. s.) source 980 has its output amplified by amplifier 981 before being fed to phase inverter 982. One output of phase inverter 982 is fed to blocking oscillator 983, whose trigger output occurs approximately 450 microseconds after the start of each negative cycle of the sine wave fed to its input, this trigger output being fed to the control grids of 1 and 2 microsecond switch tubes 984 and 985 respectively in parallel. The other output of phase inverter 982 is fed to blocking oscillator 986, whose output is divided down by 18:1 divider 987, resulting in 60 cycle triggers being fed to multivibrator 988. One output of multivibrator 988 is fed to the screen grid of 1 microsecond switch tube 984, and the other output is similarly fed to the screen grid of 2 microsecond switch tube 985. The output of both switch tubes 984 and 985 are fed to driver 989, whose output in turn is coupled to oscillator 990 which feeds transmitter antenna 991. The output of blocking oscillator 983 is a series of triggers at the 1080 c. p. s. frequency or in other words, one trigger occurring approximately every 926 microseconds, and each trigger will turn on whichever switch tube (984 or 985) has a positive gate simultaneously applied to its screen grid. Approximately 450 microseconds before every 18th trigger at the output of blocking oscillator 983, a trigger from the output of 18:1 divider 987 will trigger multivibrator 988, disabling one microsecond switch tube 984 and enabling two microsecond switch tube 985. Thus driver 989 and oscillator 990 will produce a series of pulses whose leading edges are approximately 926 microseconds apart, every 18th pulse being two microseconds wide and all other pulses one microsecond wide.

In Figs. 11a through 11c are shown the detailed circuits shown in block diagram form in Fig. 10. In Fig. 11a is shown 1080 c. p. s. source 980, which is a beat frequency oscillator. Two electron tubes 1000 and 1001 are connected in modified Colpitts circuits as shown, tube 1000 having its frequency controlled by a 100 kc. crystal 1002 and tube 1001 being controlled by a 101.080 kc. crystal 1003. These two frequency outputs are then fed to detector 1004, whose output is connected through a 100 kc. filter 1005 and then through amplifier 1006 and cathode follower 1007. As shown, cathode follower 1007 is connected in a partial boot-strap circuit, and its output at a frequency of 1080 c. p. s. is connected by a line 1008 to the control grid of amplifier 981.

In Fig. 11b is shown amplifier 981, phase inverter 982, blocking oscillator and cathode follower 983, blocking oscillator 986, 9:1 divider 987a, and 2:1 divider and inverter 987b. The 1080 c. p. s. output from the cathode of tube 1007 of block 980 is connected to the grid of amplifier tube 1010, which amplifies the sine wave and clips its top and bottom because of the high value of plate resistance 1011 and cathode resistor 1012 being by-passed by cathode condenser 1013. The output of tube 1010 is coupled to the grid of tube 1015 of phase inverter 982, and the output at the cathode of tube 1015 is coupled to the grid of blocking oscillator tube 1016 whose pulse transformer 1017 is connected in the plate circuit as shown. Variable resistor 1018 in the grid circuit is adjusted so that the trigger output of tube 1016 occurs near the end of the positive half cycle of the input and thus gives approximately a 450 microsecond delay. The output of tube 1016, taken from a secondary winding of pulse transformer 1017, is coupled through cathode follower tube 1019 and thence via line 1020 to the plate of diode 1021 of driver 989. The grid of tube 1016 being returned to ground causes this tube to be normally on and the positive cycle of the clipped and amplified sine wave applied to its cathode thus turns the tube off and initiates the blocking oscillator action desired. The output from the plate of tube 1015 is connected to the cathode of another blocking oscillator tube 1025, whose pulse transformer 1026 is similarly connected in its plate circuit and whose variable grid resistor 1027 is adjusted so that the output of this blocking oscillator occurs substantially simultaneously with the leading edge of the negative cycle of the clipped amplified sine wave applied to its cathode. The output of tube 1025 is then coupled through a 9:1 divider tube 1028 and 2:1 divider tube 1029, which are also blocking oscillator circuits, in order to obtain at the output of tube 1029 one positive trigger occurring simultaneously with each 18th trigger produced at the output of tube 1025. This output of tube 1029, taken from a secondary of its pulse transformer 1030, is then inverted by inverter tube 1031 and coupled via line 1032 to multivibrator 988.

In Fig. 11c are shown the details of 1 microsecond switch tube 984, 2 microsecond switch tube 985, multivibrator 988, and driver 989. The 60 cycle trigger output from line 1032 of 2:1 divider 987b is connected to the control grid of multivibrator tube 1033 of multivibrator 988. Tubes 1033 and 1034 are connected as shown in an electron-coupled multivibrator circuit. Tube 1033 is normally on or conducting and tube 1034 is normally off, and the output of tube 1033 is connected to the screen grid of gas type switch tube 1035 and the output of tube 1034 to the screen grid of gas type switch tube 1036. D. C. level or restorer diodes 1037 and 1038 are connected between the screen grids of switch tubes 1035 and 1036, respectively, and ground. The delayed 1080 c. p. s. triggers from line 1020 of cathode follower 983 are coupled through isolating diode 1021 to the control grids of switch tubes 1035 and 1036 in parallel as shown. Thus, normally 1 microsecond switch tube 1036 will fire in response to each trigger pulse applied to its control grid because of the positive gate applied to its screen grid from tube 1034, whereas 2 microsecond switch tube 1035 cannot fire in response to the same trigger pulse applied to its control grid because of the negative gate applied to its screen grid from tube 1033. When tube 1033 is triggered off or made non-conducting, a positive gate is produced at its output plate circuit and a corresponding negative gate at the output plate circuit of tube 1034, and this reverses the condition of switch tubes 1035 and 1036, switch tube 1035 now being able to fire in response to a trigger pulse applied to its control grid. Two microsecond pulse forming network 1039 is connected between the plate of switch tube 1035 and the cathode of boot-strap driver tube 1040, and similarly one microsecond pulse forming network 1041 is connected between the plate of switch tube 1036 and the cathode of tube 1040. The cathodes of switch tubes 1035 and 1036 are connected together and to the grid of driver tube 1040 through coupling condenser 1042. Thus when 1 microsecond switch tube 1036 fires a one microsecond pulse is produced at the cathode output of driver tube 1040, and when tube 1035 fires a two microsecond pulse is formed at the same cathode output. The cathode of tube 1040 is also connected via line 1044 to oscillator 990, which may be of conventional design and hence is not shown except in block diagram form in Fig. 10, and to ground through damping diode 1043. The circuitry of "boot-strap" driver tube 1040 is similar to that of driver tube 630 and 680 above-described and hence will not be discussed here in detail.

Numerous additional applications of the above-described principles and various modifications of the circuitry will occur to those skilled in the art and no attempt has been made to exhaust such possibilities. However, in Fig. 12 is illustrated a detailed circuit which may be used in an alternative embodiment of this invention for obtaining successive gate circuits, this circuit as shown being adapted to replace the circuits contained in blocks 80, 81, and 82 of Fig. 4b to produce the successive sequence gates. Each positive pulse of line C (Figs. 5a and 5b) from line 131 of block 77 is applied to the cathode of normally on tube 1050, turning this tube off and producing at its plate a positive pulse which is then coupled through cathode follower 1051 to the control grid of gas-type switch tube 1052. It is to be noted that the output of tube 1050 is always of constant amplitude as long as the input pulse is of great enough magnitude to turn this tube off, since whenever tube 1050 is turned off its plate potential jumps to the value of the positive source applied thereto. The positive gates of line H (Figs. 5a and 5b) from line 163 of block 78 are applied to the plate of switch tube 1052 and to the plates of all other similar switch tubes of this circuit in parallel. Each positive pulse applied to the control grid of switch tube 1052 then turns this tube on, and it will remain on until the potential at its plate drops due to termination of the gate applied thereto as above described. The resultant gate output at the cathode of tube 1052 thus starts simultaneously with the trigger input from block 77 and ends with the termination of the corresponding gate applied from block 78, and this output, made available at line 1053, corresponds to line J of Figs. 5a and 5b, the first sequence gate output. This same output is coupled to the grid of an inverter-amplifier tube 1054, the output of this tube being coupled through cathode follower 1055 to the control grid of a second gas-type switch tube 1056. Only the trailing edge of the output of tube 1052 has any effect upon tube 1054 since this tube is normally on due to its grid being returned to a positive source of potential and its cathode being returned to ground, and this trailing edge turns tube 1054 off and tube 1056 on, producing a gate output at the cathode of the latter tube corresponding to the second sequence gate shown in line K (Figs. 5a and 5b), which is made available at line 1057. In the detailed circuit diagram two additional similar gate stages are shown for producing outputs corresponding to those of line L and M of Figs. 5a and 5b, but it is obvious that by providing additional stages as many successive gate outputs can be produced as desired.

The circuit of Fig. 12 may also be used to replace the circuits of blocks 79 and 85 (Fig. 4b) in conjunction with the circuit shown in Fig. 13 replacing block 78 (Fig. 4b) to produce successive altitude gates. In that case, instead of the positive gates of line H (Figs. 5a and 5b) from line 163, the output of the circuit shown in Fig. 13 is applied to the plates of gas-type switch tube 1052 and all other similar switch tubes in parallel, and to the input at the cathode of tube 1050 are then connected the master 1,080 cycle triggers (line 3, Figs. 5a and 5b) from line 253 of adjustable station delay 75.

In Fig. 13 is shown a gate circuit which is used to produce gates delayed by approximately 500 microseconds for application to the plates of the altitude gas-type switch tubes in the circuit of Fig. 12 as above described. The master 1,080 cycle triggers (line B, Figs. 5a and 5b) from line 253 of adjustable station delay 75 are applied to the grid of inverter-amplifier tube 1060. Tube 1060 is normally off because of the negative bias applied to its grid, and each one of these positive master 1,080 cycle triggers turns this tube on and produces a corresponding negative pulse at its plate which is then coupled to the cathode of the charging diode 1061, causing diode 1061 to conduct and charge condenser 1062 up negatively. Condenser 1062 thereafter can discharge only through plate resistor 1063, and the resulting negative pulse which has an abrupt leading edge and an exponential rising trailing edge is then applied to the grid of inverter-amplifier tube 1064. The abrupt leading edge of the input pulse turns tube 1064 off, and this condition obtains until the magnitude of the input pulse no longer exceeds the cut-off value of tube 1064. Tube 1064 then again conducts, the resultant wave form at its plate thus being an approximately square wave, and this is coupled to the grid of tube 1065 through small condenser 1066. Condenser 1066 charges up due to the flow of grid current, and the resultant input to the grid of tube 1065 is a square wave of small amplitude whose trailing edge drops suddenly to a negative value, thereafter rising exponentially. The square wave portion of its input has little effect on the output of tube 1065 since this tube is already conducting heavily due to its cathode being connected to ground and its grid being connected to the source of positive potential through resistor 1067, but the negative spike portion of the input produces a corresponding positive spike or trigger at its plate. This is then coupled through cathode follower 1068 to the grid of normally off gas-type switch tube 1069, turning this tube on. The output of switch tube 1069, taken from its plate, is then coupled through another cathode follower 1070 and then via line 1071 to the plates of altitude gas-type switch tubes 1052, 1056, etc., (Fig. 12) as above described. The 500 microseconds delay above mentioned between each pulse and its corresponding output pulse is controlled by the circuit parameters, being the time between the leading and trailing edges of the square wave at the output of tube 1064 and input of tube 1065. The output from line 1071 is similar to that shown for line H (Figs. 5a and 5b) but differs in that each gate is of approximately 926 microseconds duration. When the inputs of tubes 1050 (Fig. 12) and 1060 (Fig. 13) are both connected to output line 253 of station delay 75, in Fig. 12 the output of tube 1052 will be the first altitude gate, the output of tube 1056 will be the second altitude gate, etc., in sequence.

It is thus obvious that the circuits shown in Figs. 12 and 13 illustrate a means of generating successive voltage gates of specific duration from an input of regularly spaced trigger pulses. While the use of these gates is shown and described for a specific purpose, they may, of course, have other uses which will be apparent to those skilled in the art.

Numerous additional applications of the principles above disclosed in the embodiments shown will occur to those skilled in the art and no attempt has been made to exhaust such possibilities. While, in the embodiments shown the outputs of various units have been controlled other than by switching the units off and on, it is contemplated that the outputs can also be controlled by switching the units off and on. The scope of this invention is defined in the following claims.

What is claimed is:

1. In apparatus of the class described, the combination of a fixed transmitter adapted to transmit a plurality of radio pulses, an automatic output control and timer therefor which controls said transmitter to produce a distinctive synch pulse followed by a plurality of information pulses differing from said synch pulse and at predetermined time intervals, an airborne receiver, a control therefor comprising a timer, responsive to said synch pulse and whose timing function is initiated thereby, which controls the output of said receiver to render it effective only for a predetermined period of time selected from the period of time following said synch pulse and co-extensive with the period of time of transmission of one but not all of said information pulses, and an altitude-sensitive device connected to said last-mentioned timer to control the timing of the beginning of said predetermined period of time selected by said last-mentioned timer after said synch pulse.

2. Apparatus according to claim 1 including an airborne radio transmitter connected to said receiver to produce a reply pulse in response to said effective output of said receiver.

3. Apparatus according to claim 2 in which said fixed transmitter is variable to vary the information pulses transmitted and including a fixed receiver adjacent said fixed transmitter to receive said reply pulses, the output of said fixed receiver being connected to said automatic output control and said control being connected to vary said information pulses in response to the output of said fixed receiver.

4. In apparatus of the class described the combination of a plurality of fixed transmitters adapted to transmit a plurality of radio pulses, a corresponding plurality of automatic output controls and timers therefor, each cooperating with and controlling the corresponding transmitter to produce a distinctive synch pulse followed by a plurality of information pulses differing from said synch pulse and at predetermined time intervals, said fixed transmitters and automatic output controls and timers therefor being arranged to define a continuous air lane where each of said transmitters is spaced from the next adjacent transmitter a distance not greater than their combined ranges, whereby each transmitter constitutes a block, a master timer which transmits a plurality of timed radio pulses, a fixed receiver adjacent each fixed transmitter to receive said timed radio pulses produced by said master timer, each fixed receiver being connected to and controlling the operation of the corresponding automatic output control and timer, an airborne receiver, a control therefor comprising a timer, responsive to said synch pulse and whose timing function is initiated thereby, which controls the output of said airborne receiver to render it effective only for a predetermined period of time selected from the period of time following said synch pulse and co-extensive with the period of time of transmission of one but not all of said information pulses, and an altitude-sensitive device connected to said timer to control the timing of the beginning of said predetermined period of time selected by said timer after said synch pulse.

5. Apparatus according to claim 4 wherein each fixed receiver is connected to the corresponding output control and timer through a delay circuit such that the timing of the transmission of corresponding pulses by adjacent fixed transmitters causes said corresponding pulses to arrive at the block boundaries therebetween simultaneously.

6. Apparatus according to claim 4 wherein adjacent fixed transmitters transmit a synch pulse of different character and wherein each reply pulse produced by said airborne transmitter is characteristic of the synch pulse previously received.

7. In apparatus of the class described, the combination of a fixed transmitter adapted to transmit a plurality of radio pulses, an automatic output control and timer therefor which controls the transmitter to produce a distinctive synch pulse followed by an information pulse differing from said synch pulse and at a predetermined time interval thereafter, an airborne receiver, a control therefor comprising a timer, responsive to said synch pulse and whose timing function is initiated thereby, which controls the output of said receiver to render it effective only for a predetermined period of time co-extensive with the period of time of transmission of said information pulse, and an altitude sensitive control rendering the control for said airborne receiver effective only in a predetermined altitude range.

8. In apparatus of the class described, the combination of a radio transmitter at a first location adapted to transmit a plurality of radio pulses, an automatic output control and timer therefor which controls said transmitter to produce a series of distinctive synch pulses each followed by a plurality of timed information pulses differing from said synch pulses, a receiver moveable to a plurality of locations and adapted to receive said synch pulses and said information pulses, and a selective control therefor comprising a timer, responsive to each of said synch pulses and whose timing function is initiated thereby, which controls the output of said receiver to render it effective only for a predetermined period of time selected from each period of time between two successively received synch pulses and co-extensive with the period of time of transmission of one but not all of the information pulses received between the two successively received synch pulses, and a position-sensitive device sensitive to the position of said receiver relative to said transmitter connected to said last-mentioned timer to control the timing of the beginning of said predetermined period of time selected by said timer after each synch pulse, whereby said selective control selects a given period of time from said periods which correspond to different relative positions.

9. Apparatus according to claim 8 including a transmitter connected to the output of said receiver to produce an output in the form of a reply pulse in response to information pulses occurring within the selected period of time.

10. In apparatus of the class described the combination of a receiver located in an aircraft and adapted to receive a series of distinctive synch pulses each followed by a plurality of information pulses differing from said synch pulses and at predetermined timed intervals, a control therefor comprising a timer, responsive to said synch pulses and whose timing function is initiated thereby, which controls the output of said receiver to render it effective only for a predetermined period of time selected from the period of time between synch pulses and co-extensive with the period of time of transmission of one but not all of said information pulses, and an altitude-sensitive device connected to said timer to control the timing of the beginning of said predetermined period of time selected by said timer after each synch pulse.

11. Apparatus according to claim 10 including an airborne radio transmitter adapted to produce a reply pulse in response to the output of said receiver.

12. Apparatus according to claim 10 including an auxiliary "look-in" control for said receiver which also controls the output of said receiver to render it effective for an additional predetermined period of time selected from the period of time following each synch pulse and co-extensive with the period of time of transmission of another one of said information pulses.

13. In apparatus of the class described the combination in a ground station for defining a block of an air lane of a pulse transmitter, an adjacent normally operative receiver and an automatic timed control therefor operatively controlled by said pulse transmitter for actuation by each transmitted pulse and timed to render the receiver output ineffective for a period of time, which period starts only at a time after each transmitted pulse equal to the time it takes a pulse to travel from the ground station to the block boundary and back plus such time as elapses between arrival of a pulse at an aircraft in the block and response thereto, whereby the block boundary is defined about the ground station.

14. Apparatus according to claim 13 wherein there are a plurality of adjacent ground stations defining a plurality of blocks, and wherein there is a control for each ground station connected to the ground station of the next adjacent block for automatically varying pulses transmitted by the controlled ground station for characterizing traffic conditions in said next adjacent block.

15. Apparatus according to claim 14 including a master timer controlling the transmission of pulses by said ground stations and providing timed control signals therefor at each ground station such that corresponding pulses transmitted by adjacent ground stations reach the block boundary therebetween simultaneously.

16. Apparatus according to claim 15 wherein certain pulses simultaneously transmitted by the ground stations are in the form of distinctively characterized synch pulses and including pulse-forming circuits at adjacent ground stations controlling said pulse transmitter thereat to produce differently-characterized synch pulses so that adjacent ground stations transmit synch pulses of different character, whereby the block boundary between adjacent ground stations is definitely defined.

17. Apparatus according to claim 13 including an airborne receiver for receiving said transmitted pulses and an airborne automatic transmitter responsive to the output of said receiver for transmitting pulses in reply to said transmitted pulses, whereby an output from said receiver at the ground station in response to a reply pulse indicates the presence in the block of an aircraft bearing said airborne receiver and transmitter.

18. Apparatus according to claim 17 including an automatic control for rendering said aircraft receiver output effective only for a predetermined period of time synchronized with the sending of pulses by said ground station, whereby said airborne transmitter produces reply pulses only to pulses received within said predetermined period of time.

19. Apparatus according to claim 17 including an altitude sensitive control for rendering the output of said airborne transmitter operative only in a predetermined range of altitudes, whereby upper and lower limits of an altitude zone of the block are defined.

20. Apparatus according to claim 17 wherein there are a plurality of adjacent ground stations defining a plurality of blocks, wherein a master timer controls the transmission of pulses by said ground stations and providing timed control signals therefor at each ground station such that corresponding pulses transmitted by adjacent ground stations reach the block boundary therebetween simultaneously, wherein certain corresponding pulses transmitted by the ground stations are in the form of distinctively characterized synch pulses and including pulse-forming circuits at adjacent ground stations controlling said pulse transmitter thereat to produce differently-characterized synch pulses so that adjacent ground stations transmit synch pulses of different character in order to define definitely the block boundary between adjacent ground stations, and wherein there is a control responsive to the output of said airborne receiver and controlling said airborne transmitter to characterize its reply pulses in accordance with the character of the previous synch pulse received by said airborne receiver and a control rendering the airborne transmitter output ineffective in response to the second of two closely spaced synch pulses.

21. In apparatus of the class described the combination of a ground station comprising a radio pulse transmitter and receiver, an airborne receiver and transmitter, and synchronizing controls for said ground station and said airborne receiver and transmitter comprising a timer control for said ground station transmitter and receiver, and a timer control for said airborne receiver and transmitter whose operation is initiated by pulses transmitted by the ground station receiver and which thereby synchronizes the operation of said airborne equipment with said ground station equipment and which includes an altitude-sensitive control for timing the period of operation of said last-mentioned timer control relative to its inception in accordance with variations in the altitude of said airborne equipment.

22. In apparatus of the class described, the combination of a ground station comprising a radio pulse transmitter and receiver, an airborne pulse receiver and transmitter, a control and timer for said ground station transmitter for causing said ground station transmitter to transmit a synch pulse followed by a plurality of information pulses at predetermined time intervals, a timer and control for said airborne receiver responsive to and the operation of which is initiated by receipt of a ground station synch pulse and which renders the output of said receiver ineffective for certain predetermined periods of time corresponding to the periods of time of receipt at said airborne receiver of certain only of said information pulses, an altitude sensitive control for selectively controlling the time of rendering said airborne receiver output ineffective at different altitudes, a control for said airborne transmitter responsive to the output of said airborne receiver for automatically causing said airborne transmitter to reply in a predetermined time to information pulses from said ground station, and a timer control for said ground station receiver to render its output effective at predetermined intervals after each information pulse, which intervals terminate at a time equal to the time required for a pulse to travel from the ground station transmitter to the boundary of a predetermined area and return plus the delay involved between receipt and response at said airborne receiver and transmitter after the sending of each information pulse and which interval covers the period of receipt at said ground station receiver of reply pulses from aircraft in the predetermined area.

23. Apparatus in accordance with claim 22 including an auxiliary look-in control for said airborne receiver which also controls the output of said receiver to render it effective for one of the predetermined periods of time corresponding to the periods of time of receipt at said airborne receiver of certain only of said information pulses during which it would normally be rendered ineffective by the altitude sensitive control.

24. Apparatus in accordance with claim 22 in which there are a plurality of ground stations and the predetermined areas of adjacent stations form blocks, and in which there are interconnected controls for varying the characteristics of information pulses in a block under control of and according to the responses received at the ground station receiver in the next adjacent block.

25. Apparatus in accordance with claim 22 in which there are a plurality of ground stations and the predetermined areas of adjacent stations form blocks, and in which there are interconnected controls for varying the characteristics of information pulses in a block which are received by and for which the output of the airborne receiver is rendered effective by its altitude sensitive control under control of and according to the pulses received at the ground station receiver in the next adjacent block and in accordance with the traffic conditions at the same altitude in the next adjacent block.

26. In apparatus of the class described controlled by a master timer producing timed synch trigger pulses the combination of a first gate circuit responsive to the output of said master timer for producing occupancy receiver voltage gates at predetermined times after each synch trigger pulse, a receiver adapted to receive occupancy pulses and controlled by said first gate circuit for producing an output in response to occupancy pulses received simultaneously with said occupancy receiver voltage gates, a second gate circuit responsive to the output of said master timer for producing a plurality of altitude occupancy voltage gates each delayed a different predetermined time after said synch trigger pulse and corresponding to a different one of said occupancy receiver voltage gates, and a detection circuit responsive to the outputs of said second gate circuit and said receiver for separately isolating such occupancy pulses as are received simultaneously with each one of said altitude occupancy voltage gates and the corresponding one of said occupancy receiver voltage gates.

27. Apparatus according to claim 26 including a double occupancy detection circuit comprising a first and second repeater, each connected to said detection circuit and each adapted to repeat said occupancy pulses, and a control circuit actuated by said detection circuit and including an interlocking circuit connected between said first and second repeaters such that said first repeater is normally operative and said second repeater is normally inoperative, said control circuit actuating said interlocking circuit to render said first repeater inoperative and said second repeater operative for a predetermined period of time in response to each occupancy pulse at the output of said detection circuit passed by said first repeater, whereby any occupancy pulse subsequent to the first which is isolated by said detection circuit during said predetermined period of time and the duration of the corresponding altitude occupancy voltage gate is repeated by said second repeater as a double occupancy indication.

28. In apparatus of the class described the combination of a master timer for producing a series of timed synch trigger pulses each separated by a series of timed altitude trigger pulses, a delay circuit for delaying said synch and altitude trigger pulses, a sequence scan saw-tooth generator and a sequence scan voltage gate generator, each adapted to be simultaneously triggered by specified ones of said synch trigger pulses, and an altitude scan saw-tooth generator and an altitude scan voltage gate generator adapted to be triggered by specified ones of said synch trigger pulses, a pulse generator for producing a sequence gate trigger pulse delayed after the start of each output gate of said sequence scan voltage gate generator, a plurality of sequence voltage gate generators under control of said sequence scan saw-tooth, pulse, and altitude scan voltage gate generators and each adapted to be triggered by a specified one of said sequence gate triggers, a synch trigger voltage gate generator under control of said altitude scan sawtooth and altitude scan voltage gate generators and adapted to be triggered prior to the occurrence of each one of said delayed synch trigger pulses, a plurality of altitude trigger voltage gate generators under control of said altitude scan saw-tooth and altitude scan voltage gate generators and each adapted to be triggered prior to the occurrence of the corresponding one of said delayed altitude trigger pulses, a first pulse forming circuit under control of said synch trigger voltage gate generator and said delayed synch trigger pulses for producing a synch pulse of predetermined width coincident with a portion of each synch trigger voltage gate, and a second pulse forming circuit under control of said altitude trigger voltage gate and sequence voltage gate generators and said delayed altitude trigger pulses for producing a plurality of altitude pulses, each of a predetermined width and occurring coincident with a portion of the corresponding one of said altitude trigger voltage gates, and a transmitter responsive to said pulse forming circuits for transmitting said synch and altitude pulses.

29. Apparatus in accordance with claim 28 including a first gate circuit responsive to the output of said master timer for producing a plurality of altitude occupancy voltage gates, one for each altitude trigger pulse, the leading edge of each gate occurring substantially simultaneously with its corresponding altitude trigger pulse, a second gate circuit responsive to the output of said master timer for producing a plurality of occupancy receiver voltage gates, one for each altitude occupancy voltage gate and each delayed a predetermined time after the start of its corresponding altitude occupancy voltage gate, a receiver adapted to receive occupancy pulses and controlled by said second gate circuit for producing an output in response to occupancy pulses received simultaneously with said occupancy receiver voltage gates, and a detection circuit responsive to the output of said receiver and controlled by said first gate circuit for separately isolating such occupancy pulses as are received simultaneously with each one of said altitude occupancy voltage gates and the corresponding one of said occupancy receiver voltage gates.

30. Apparatus according to claim 29 including a double occupancy detection circuit comprising a first and second repeater, each connected to said detection circuit and each adapted to repeat said occupancy pulses, and a control circuit actuated by said detection circuit and including an interlocking circuit connected between said first and second repeaters such that said first repeater is normally operative and said second repeater is normally inoperative, said control circuit actuating said interlocking circuit to render said first repeater inoperative and said second repeater operative for a predetermined period of time in response to each occupancy pulse at the output of said detection circuit passed by said first repeater, whereby any occupancy pulse subsequent to the first which is isolated by said detection circuit during said predetermined period of time and the duration of the corresponding altitude occupancy voltage gate is repeated by said second repeater as a double occupancy indication.

31. Apparatus in accordance with claim 30 including signal pulse selection circuits controlled by said altitude gate circuits and said delay circuit and having relay circuits controlled by said detection circuit for controlling said second pulse forming circuits to vary the width of said altitude pulses in accordance with the receipt by said receiver and the isolation by said detection circuit of occupancy pulses corresponding to the previous altitude pulses transmitted by said transmitter.

32. Apparatus in accordance with claim 31 including the combination of a second pulse receiver adapted to receive pulses of various widths including said synch and altitude pulses and whose output varies in accordance with the width of the pulse received, a timer for controlling the output of said second receiver, an altitude switch for controlling the operation of said timer, discriminators for separating and identifying the output pulses of said second receiver according to their respective variations, a second transmitter controlled by said discriminators for producing reply occupancy pulses in response to certain altitude pulses received by said second receiver and for characterizing said occupancy pulses in accordance with the character of one of the previously received pulses, and an indicator having relay circuits controlled by said discriminators for indicating the reception by said second receiver of certain combinations of altitude pulses of certain widths by the separation and identification of the corresponding output pulses by said discriminators.

33. In apparatus of the class described the combination of a pulse receiver adapted to receive pulses of various widths and whose output varies in accordance with the width of the pulse received, a timer for controlling the output of said receiver, an altitude sensitive switch for controlling the operation of said timer, and discriminators for separating and identifying the output pulses of said controlled receiver output according to their respective variations.

34. Apparatus in accordance with claim 33 including an indicator having relay circuits controlled by said discriminators for indicating the reception by said receiver of certain combinations of pulses of certain respective varying characteristics by the separation and identification of the corresponding output pulses by said discriminators.

35. In apparatus of the class described for dividing a section of an air lane serially into a plurality of blocks the combination of a master station for said section for transmitting timed master pulses and a ground station for each block including a receiver adapted to receive said master pulses and a transmitter responsive to the output of said receiver for transmitting pulses corresponding to and timed in accordance with the timing of said master pulses and intended for aircraft in the block, and a delay circuit for and connected to each ground station and timed to delay the transmission of each of its transmitted pulses after the corresponding master pulse for a time such that pulses transmitted by adjacent ground stations corresponding to the same master pulse reach the block boundary therebetween simultaneously.

36. In apparatus of the class described for dividing a section of an air lane serially into a plurality of blocks of equal length the combination of a master station for said section for transmitting timed master pulses and a ground station for each block including a receiver adapted to receive said master pulses and a transmitter responsive to the output of said receiver for transmitting pulses corresponding to and timed in accordance with the timing of said master pulses and intended for aircraft in the block, and a delay circuit for and connected to each ground station except the most distant and timed to delay the transmission of each of its transmitted pulses after the corresponding master pulse for a time proportional to the difference between its distance from the master station and the distance from the master station to the most distant ground station, whereby pulses are transmitted substantially simultaneously by each ground station.

37. Air route block occupancy detecting apparatus for an air route section divided into a plurality of blocks and having a ground station substantially at the middle of each block comprising, a single master synchronizing pulse transmitting station for said section for emitting spaced master pulses, a master pulse receiving unit for each ground station for receiving such pulses, a radio pulse transmitting unit for each ground station including delay means and constructed to transmit a pulse a predetermined time after a pulse is received from said master pulse transmitting station by the associated pulse receiving unit, said delay means imposing a delay such that all of the ground station located pulse transmitting units transmit their respective pulses simultaneously, a reply pulse receiving unit for each station and associated with the radio pulse transmitting unit for that ground station and constructed so as to be receptive only for a predetermined time period after the transmission of a pulse by its associated radio pulse transmitting unit, whereby if said time period for each reply pulse receiving unit is properly chosen a pulse transmitted to an airplane and returned to said ground station will define by a spherical surface the boundary of that block and whereby to avoid gaps between adjacent blocks these time portions are so chosen that slight overlapped portions of these imaginary spherical surfaces will occur.

38. Air route block occupancy detecting apparatus for an air route section divided into a plurality of blocks, and having a ground station substantially at the middle of each block comprising, a single master pulse transmitting station for said section for emitting spaced master pulses, a master pulse receiving unit for each ground station for receiving such pulses, a radio pulse transmitting unit for each ground station including delay means and constructed to transmit a pulse a predetermined time after a pulse is received from said master pulse transmitting station by the associated pulse receiving unit and means to cause the ground station transmitted pulse to be of a character to define traffic conditions in adjacent blocks, a reply pulse receiving unit for each station and associated with the radio pulse transmitting unit for that ground station and constructed so as to be receptive only for a predetermined time period after the transmission of a ground station pulse by its associated radio pulse transmitting unit, said delay means imposing a delay such that all of the ground station located pulse transmitting units transmit their respective pulses simultaneously, whereby if said time period for each reply pulse receiving unit is properly chosen a pulse transmitted to an airplane and returned to said ground station will define by a spherical surface the boundary of that block and whereby to avoid gaps between adjacent blocks these time periods are so chosen that slight overlapped portions of these imaginary spherical surfaces will occur.

39. In an airway traffic controlling system for a section of air route divided vertically into a plurality of altitudes and having a ground located station for said section, airplane carried receiving apparatus located in an airplane flying at a particular altitude over said section, means in said ground located station for transmitting distinctive radiant energy pulses distinctively spaced from each other, said pulses being distinctively spaced to define the particular altitude at which the airplane is flying and one of said pulses being distinctively characterized to constitute a particular message, said receiving apparatus including means including an altitude-sensitive control device to allow the reception of pulses only intended for the altitude at which such airplane is flying.

40. In an airway traffic controlling system for a section of air route divided vertically into a plurality of altitudes and having a ground located station for said section, receiving apparatus located in an airplane flying at a particular altitude over said section, means in said ground located station for transmitting distinctive radiant energy pulses comprising a synch pulse and a signal pulse distinctively spaced therefrom, said pulses being distinctively spaced to define the particular altitude at which the airplane is flying and one of said pulses being distinctively characterized to constitute a particular message, a timer, responsive to said synch pulse and whose timing function is initiated thereby, connected to said receiving apparatus, and an altitude-sensitive device connected to said timer for controlling said receiving apparatus to render it effective after the receipt of said synch pulse only for a period of time, as determined by said distinctive spacing, during which said signal pulse will arrive at said airplane.

41. In an airway traffic controlling system for a section of air route divided vertically into a plurality of altitudes and having a ground located station for said section, receiving apparatuses located in airplanes flying at particular altitudes over said section, means in said ground located station for transmitting distinctive radiant energy pulses including a synch pulse and a plurality of signal pulses each distinctively spaced therefrom, said signal pulses being each distinctively spaced from the synch pulse to define the particular altitude for which the signal pulse is intended, each of said signal pulses being distinctively characterized to constitute a particular message for its particular altitude, said receiving apparatus on each of said airplanes including means including an altitude-sensitive control device to allow the reception only of the signal pulse intended for the altitude at which it is flying.

42. In an airway traffic controlling system for a section of air route divided vertically into a plurality of altitudes and horizontally into a plurality of blocks and having a ground located block station for each block located substantially at the middle of its block, a master station for said section for transmitting master pulses, and means at each block station for repeating said master pulses to airplanes at various altitudes in its block, and a delay circuit for and connected to each block station except the most distant block station for delaying the repeated pulse for a time of an extent proportional to the difference between its distance from the master station and the distance the most distant block station is from the master station.

43. Apparatus for detecting the presence of airplanes and transmitting information thereto to and from respectively the block station for that block as distinguished from adjacent block stations comprising, means at each block station for transmitting omni-directionally at a fixed frequency a pulse characterizing that particular block substantially at the same time a pulse distinctive therefrom is transmitted omni-directionally at the same fixed frequency from adjacent block stations, apparatus on each airplane including means for receiving said pulses of said fixed frequency and further means for characterizing the airplane carried apparatus in accordance with the character of the first received pulse so as to definitely coordinate each airplane carried apparatus with the nearest block station apparatus, which defines the block in which the airplane is flying, and other means including the aforesaid means, for transmitting characteristic occupancy pulses from the airplane carried apparatus so characterized to the block station apparatus of the block in which the airplane is flying and for transmitting other information from such block station to such airplane.

44. In apparatus of the class described the combination of a continuously sensitized receiver, a repeater biased to be normally operative connected to and adapted to be actuated by a signal from said receiver to produce a voltage output, and a control circuit connected to and adapted to be actuated by said signal from said receiver for overcoming the bias on said repeater and thereby disabling said repeater for a predetermined period of time immediately after said voltage output is produced.

45. In apparatus of the class described the combination of a repeater biased to be normally operative for repeating signals and a control circuit therefor responsive to the signals which are repeated for overcoming the bias on said repeater and thereby turning said repeater off for a predetermined period of time immediately after each repeated signal.

46. In apparatus of the class described the combination of a receiver, a first and second repeater, a control circuit including an interlocking circuit and actuated by said receiver and whose output is connected to said first and second repeaters, said interlocking circuit including a switch connected between said repeaters to render said repeaters alternately operative in response to successive signals, whereby alternate signals at the output of said receiver are repeated by said first and second repeaters respectively.

47. In apparatus of the class described the combination of a receiver, a plurality of repeaters having their inputs connected in parallel to said receiver, and an interlocking circuit actuated by said receiver for and including a switch connected between each successive pair of said repeaters to render only one repeater of each pair operative at any time and to render each repeater successively operative in response to successive signals from said receiver, whereby successive ones of said plurality of repeaters produce a voltage output in response to successive output signals from said receiver.

48. In apparatus of the class described the combination of a master timer for producing a series of timed synch trigger pulses each separated by a series of timed altitude trigger pulses, an altitude scan saw-tooth generator and an altitude scan voltage gate generator connected to be triggered by a synch trigger pulse, a delay circuit for said synch and altitude trigger pulses, a synch trigger voltage gate generator under control of said altitude scan saw-tooth and altitude scan voltage gate generators and biased to act prior to the occurrence of each one of said delayed synch trigger pulses, a plurality of altitude trigger voltage gate generators under control of said altitude scan saw-tooth and altitude scan voltage gate generators and each biased to act prior to the occurrence of the corresponding one of said delayed altitude trigger pulses, a first pulse-forming circuit under control of said synch trigger voltage gate generator and said delayed synch trigger pulses for producing a synch pulse of predetermined width coincident with a portion of each synch trigger voltage gate, and a second pulse-forming circuit under control of said altitude trigger voltage gate generators and said delayed altitude trigger pulses for producing a plurality of altitude pulses.

49. In apparatus of the class described the combination of a master timer for producing a series of timed synch trigger pulses each separated by a series of timed altitude trigger pulses, an altitude scan saw-tooth generator and an altitude scan voltage gate generator connected to be triggered by a synch trigger pulse, a successive voltage gates generator under control of said altitude scan voltage gate generator and connected to be triggered by a synch trigger pulse to produce separate successive sequence voltage gates, a delay circuit for said synch and altitude trigger pulses, a synch trigger voltage gate generator under control of said altitude scan sawtooth and altitude scan voltage gate generators and biased to act prior to the occurrence of each one of said delayed synch trigger pulses, a plurality of altitude trigger voltage gate generators under control of said altitude scan saw-tooth and altitude scan voltage gate generators and each biased to act prior to the occurrence of the corresponding one of said delayed altitude trigger pulses, a first pulse-forming circuit under control of said synch trigger voltage gate generator and said delayed synch trigger pulses for producing a synch pulse of predetermined width coincident with a portion of each synch trigger voltage gate, and a second pulse-forming circuit under control of said successive voltage gates and altitude trigger voltage gate generators and said delayed altitude trigger pulses for producing a plurality of altitude pulses.

50. In apparatus of the class described the combination of a master timer for producing a series of timed synch trigger pulses each separated by a series of timed altitude trigger pulses, a delay circuit for said synch and altitude trigger pulses, a delay voltage gate generator circuit under control of said delayed pulses for producing a series of adjacent voltage gates whose leading edges are each delayed a predetermined time after the corresponding delayed synch or altitude trigger pulse, a successive voltage gates generator under control of said delayed adjacent voltage gates and said delayed altitude trigger pulses for producing a series of separate successive altitude trigger voltage gates, and a pulse-forming circuit under control of said successive voltage gates generator and said delayed altitude trigger pulses for producing a plurality of altitude pulses.

51. In apparatus of the class described the combination of a delay circuit adapted to delay by a predetermined time each of a series of input trigger pulses applied thereto, a first switch tube connected to said delay circuit for producing a series of adjacent positive voltage gates in response to said series of input trigger pulses, the leading edge of each voltage gate being delayed by a time fixed by the circuit parameters after the corresponding input trigger pulse, a plurality of additional switch tubes having their plates connected in parallel to said first switch tube, a plurality of differentiating circuits, one for and connected between each successive pair of said additional switch tubes, each of said additional switch tubes being so biased as to be normally non-conducting and the first of said additional switch tubes being connected to be triggered on by a positive input pulse occurring simultaneously with one of said adjacent positive voltage gates, whereby successive ones of said additional switch tubes produce successive voltage gate outputs, each successive additional switch tube being triggered on by the differentiated output of the previous tube.

52. In an airway traffic controlling system for a section of an air route divided horizontally into a plurality of blocks and having a ground-located block station for each block located substantially at the middle of its block, a transmitter for and at each block station for transmitting omni-directionally a pulse substantially at the same time a pulse is transmitted omni-directionally from each other block station, a receiver for and at each block station for receiving reply pulses to its transmitted pulses, and timer control means for and at each block station and connected to the associated receiver to control the responsiveness of said receiver to render it receptive only for a predetermined time period timed after the transmission of each pulse by its associated transmitter.

53. Apparatus for detecting the presence of aircraft adjacent each block station of a plurality of block stations arranged serially to define an air lane as distinguished from adjacent block stations comprising, transmitter means at each block station for transmitting omni-directionally at a radio frequency a pulse characterizing that particular block substantially at the same time a pulse distinctive therefrom is transmitted omni-directionally at the same frequency from adjacent block stations, and receiver means at each block station for receiving only reply pulses to its transmitted pulses which are characteristic of its transmitted pulses.

54. Apparatus according to claim 53 including timer control means for each receiver means and connected to the associated transmitter means and controlling said receiver means to render it receptive only for a predetermined time period timed after the transmission of each pulse by the associated transmitter means.

55. In an airway traffic signalling system for indicating in an airplane cab traffic conditions in advance of such airplane comprising, means located partly on the airplane and partly on the ground for detecting at a ground station of a particular block the presence of an airplane by the time it takes a pulse of radio energy to travel from such ground station to such airplane and back to such ground station, ground station apparatus including said means for characterizing the pulse transmitted by such ground station apparatus in accordance with air traffic conditions existing in adjacent blocks, and airplane carried apparatus including said means for rejecting all pulses received by the airplane carried apparatus within a predetermined time period after the first pulse was received.

56. In an airplane cab signalling system for indicating in the cab of an airplane traffic conditions in advance of such airplane in the same altitude comprising, means located partly on the airplane and partly on the ground for detecting at a ground station of a particular block the presence of such airplane at a particular altitude of a particular block in accordance with the time it takes a pulse of radio energy to travel from such ground station to such airplane and back to such ground station and in accordance with the position assumed by an altimeter on the airplane, means including said means for characterizing said pulse in accordance with airway traffic conditions in adjacent blocks at said altitude and for rejecting by the airplane carried apparatus included in the aforementioned means all pulses received after the reception of the first pulse within a predetermined time period.

57. In an airplane cab signalling system for displaying in the cab of an airplane signals indicating adjacent traffic conditions comprising, an air route consisting of a series of blocks, a ground station for each block located substantially in the middle of such block, transmitting means for emitting from said ground stations initial pulses in synchronism each followed by a signal pulse characteristic of traffic conditions adjacent its block, said initial pulses for some blocks being of one character and for other blocks being of a different character, receiving and transmitting means on each airplane for receiving initial and signal pulses and for retransmitting only the first signal pulse received and making it characteristic of the preceding initial pulse, means at each ground station responsive to an airplane transmitted pulse if deceived within a predetermined time period after the signal pulse was transmitted from that ground station but only if it is characteristic of the preceding transmitted initial pulse, whereby block boundaries insofar as occupancy of a block by an airplane is concerned are determined by the character of said retransmitted pulses and said time periods and whereby block boundaries insofar as the reception of signal pulses by the airplane carried apparatus is concerned are determined by the signal rejection function of the airplane carried apparatus.

58. In an airplane cab signalling system for displaying in the cab of an airplane signals indicating adjacent traffic conditions comprising, an air route consisting of a series of blocks, a ground station for each block each located substantially in the middle of such block, transmitting means for emitting from said ground stations initial pulses in synchronism each followed by a signal pulse characteristic of traffic conditions adjacent a particular altitude in its block, said initial pulses for some blocks being of one character and for other blocks being of a different character, receiving and transmitting means on each airplane for receiving initial pulses and signal pulses characteristic of the altitude in which such airplane is flying and for retransmitting only the first signal pulse received and making it characteristic of the preceding initial pulse, means at each ground station responsive to an airplane transmitted pulse if received within a predetermined time period after the signal pulse was transmitted from that ground station but only if it is characteristic of preceding transmitted initial pulse, whereby block boundaries insofar as occupancy of a block by an airplane is concerned are determined by said time periods and whereby block boundaries insofar as the reception of signal pulses by the airplane carried apparatus is concerned are determined by the signal rejection function of the airplane carried apparatus.

59. In an airway traffic controlling system for a section of air route divided vertically into a plurality of altitudes and horizontally into a plurality of blocks, a ground located block station for each block located substantially at the middle of its block, a master station for said section for transmitting master radio pulses, means at each block station for repeating said master radio pulses to airplanes at various altitudes in its block, each block station except the most distant block station including delay means timed to delay the repeated pulses for a time of an extent proportional to the difference between its distance from the master station and the distance the most distant block station is from the master station, and airplane carried radio pulse receiving means effective to render itself ineffective to receive pulses after the reception of a pulse for a time greater than the time during which radio pulses from neighboring blocks arrive at the airplane, whereby only pulses from its own block are received by the airplane carried radio pulse receiving means.

60. In an airway traffic controlling system including a section of air route divided horizontally into a plurality of blocks, a ground located block station for each block located substantially at the middle of its block, a master station for said section for transmitting master pulses, means at each block station for characterizing said pulses in accordance with the particular block and repeating said pulses for receipt by airplanes having receivers and transmitters and at various altitudes in its block, each block station except the most distant block station including delay means timed to delay the repeated pulses for a time of an extent proportional to the difference between its distance from the master station and the distance the most distant block station is from the master station, block station located radio receiving means capable of receiving radio pulses only of the character corresponding to the one transmitted by such block station and then only if such received pulse arrives within a limited time after such block station transmitted a radio pulse, said limited time being the time required for a radio pulse to travel to and from an airplane located at the most distant point in such block.

61. Apparatus for detecting the presence of airplanes each in its block of a plurality of blocks of an air route by the radio pulse transmission time-distance interval principle comprising, an air route divided into a plurality of blocks, a block station for each block located substantially at the middle of its block, an imaginary circle for each block having its orbit substantially intersect the junctions of that block and its adjacent blocks, a master station, means for transmitting a master radio pulse from said master station to all of said block stations, means at each block station for repeating the radio pulse transmitted from said master station for reception and retransmission by and from an airplane flying in such block, delay means at certain block stations timed to delay said repeated radio pulses thereat to an extent such that all the repeated radio pulses reach the orbits of their respective blocks substantially simultaneously, and means at each block station for detecting a radio pulse retransmitted from an airplane in its block.

62. Apparatus for detecting the presence of airplanes each in its block of a plurality of blocks of an air route by the radio pulse transmission time-distance interval principle comprising, an air route divided into a plurality of blocks some of which are of different lengths than others, a block station for each block located substantially at the middle of its block, an imaginary circle for each block having its orbit substantially intersect the junctions of that block and its adjacent blocks, a master station, means for transmitting a master radio pulse from said master station to all of said block stations, means at each block station for repeating the radio pulse transmitted from said master station for reception and retransmission by and from an airplane flying in such block, delay means at certain block stations timed to delay said repeated radio pulses thereat to an extent such that all the repeated radio pulses reach the orbits of their respective blocks substantially simultaneously, and means at each block station effective for a limited time only after such block station repeated the master pulse for detecting a radio pulse retransmitted from an airplane in its block, said limited time for each block being substantially equal to twice the transmitting time from its block station to the orbit of that block.

63. Apparatus for detecting the presence of airplanes each in its block of a plurality of blocks of an air route by the radio pulse transmission time-distance interval principle comprising, an air route divided into a plurality of blocks, a block station for each block located substantially at the middle of its block, an imaginary circle for each block having its orbit substantially intersect the junctions of that block and its adjacent blocks, a master station, means for transmitting a master radio pulse from said master station to all of said block stations, means at each block station for repeating and characterizing the radio pulse transmitted from said master station for reception and retransmission by and from an airplane flying in such block, delay means at certain block stations timed to delay said repeated radio pulses thereat to an extent such that all the repeated radio pulses reach the orbits of their respective blocks substantially simultaneously, the character of the repeated radio pulses being such that adjacent stations send repeat radio pulses having different characteristics, and means at each block station for detecting radio pulses of a character corresponding to the character of the radio pulses transmitted by that block station.

64. In an airplane cab signalling system the combination with a plurality of airplanes flying at different altitudes over a route defined by a plurality of ground stations, each of which is located substantially at the middle of its block, of ground station apparatus for each ground station for each altitude for transmitting a traffic condition manifesting pulse for its particular altitude, airplane carried apparatus on each airplane including an altimeter and a receiver for receiving said transmitted pulses intended for its altitude as determined by said altimeter and for detecting said pulses and traffic conditions at that altitude manifested thereby, and a transmitter for transmitting reply pulses for its altitude to such received radio pulses to manifest thereby its presence within a particular block at that altitude, and for rejecting all other pulses arriving at the airplane thereafter within a predetermined time and not transmitting reply pulses in response thereto, and further ground station apparatus for each ground station for receiving such reply pulses from an airplane flying in that block at that altitude providing each such reply pulse is received at the ground station within a predetermined time period after the transmission of the corresponding transmitted pulse by the ground station apparatus for that altitude, whereby block boundaries insofar as block occupancy detection is concerned are determined by the said time period and whereby transmitted pulses from adjacent blocks intended for aircraft in those particular blocks are not received by an airplane carried apparatus not in those particular blocks by reason of the pulse rejection feature performed by the airplane carried apparatus.

65. Apparatus for detecting the presence of an airplane within a limited volume of space adjacent a ground located station comprising, means including ground located radio transmitting apparatus located at a ground station for transmitting omni-directionally spaced radio pulses, means on an airplane for receiving such pulses and retransmitting such pulses by space radiation, and means including a radio receiver and gating means therefor located adjacent said transmitting apparatus for registering such retransmitted pulses only if they are received each within a predetermined period of time extending from and after the transmission of each pulse by such transmitting apparatus said gating means being connected to said radio receiver to control the responsiveness of the latter and being operatively actuated by each of said pulses transmitted by such transmitting apparatus for said predetermined period of time, whereby such retransmitted pulses are only received by said radio receiver and registered if such airplane is located within the volume of space defined by said predetermined period of time in accordance with the radio pulse transmission time-distance interval principle.

66. Apparatus for detecting the presence of an airplane within a limited volume of space adjacent a ground located station and for transmitting information to such airplane comprising, means including ground located radio transmitting apparatus located at a ground station for transmitting omni-directionally spaced radio pulses which are characteristic of predetermined information, means on an airplane for receiving such pulses, interpreting their meaning by their characteristic and retransmitting such pulses by space radiation, and means including a radio receiver and gating means therefor located adjacent said transmitting apparatus for registering such retransmitted pulses only if they are received each within a predetermined period of time extending from and after the transmission of each pulse by such transmitting apparatus said gating means being connected to said radio receiver to control the responsiveness of the latter and being operatively actuated by each of said pulses transmitted by such transmitting apparatus for said predetermined period of time, said period being less than the time space between such pulses as originally transmitted, whereby such retransmitted pulses are only received by said radio receiver and registered if such airplane is located within the volume of space defined by said predetermined period of time in accordance with the radio pulse transmission time-distance interval principle.

67. Apparatus for detecting the presence of an airplane within a limited volume of space adjacent a particular ground located station of a series of such ground located stations comprising; means including ground located radio transmitting apparatus at each ground station of a plurality of such stations for transmitting omni-directionally spaced radio pulses from all ground stations substantially simultaneously, means on an airplane for receiving such pulses and retransmitting such pulses by space radiation, and means at each ground station including a radio receiver and gating means therefor for registering such retransmitted pulses only if they are received each within a predetermined period of time extending from and after the transmission of the corresponding pulse from the respective ground located transmitting apparatus said gating means being connected to said radio receiver to control the responsiveness of the latter and being operatively actuated by the respective ground-located transmitting apparatus for said predetermined period of time, whereby such retransmitted pulses are only received by the radio receiver of a particular ground station if such airplane is located within the volume of space adjacent such particular ground station defined by said predetermined period of time in accordance with the radio pulse transmission time-distance interval principle.

68. In an airway traffic controlling system for a section of air route divided vertically into a plurality of altitudes, a ground located station for said section, apparatus at such ground located station for transmitting a synch and a plurality of altitude interrogation pulses of radiant energy to the various altitudes of said route and including a plurality of respectively different width producing pulse-forming circuits for varying the width of the altitude interrogation pulses, each altitude interrogation pulse being distinctively spaced with respect to such synch pulse so as to characterize a particular altitude, apparatus on the airplanes for retransmitting only those pulses characterizing the altitudes at which airplanes are flying, ground located apparatus for distinctively detecting the retransmitted pulses, and traffic manifesting means for each altitude at said ground located station controlled by the retransmitted pulses for such altitude and connected to said pulse-forming circuits to vary the width of the distinctively-spaced pulses transmitted to characterize such altitude in accordance with and for continuously manifesting the conditions of occupancy for such altitude.

69. In an airplane cab signalling system, the combination with a plurality of airplanes flying over a route defined by a plurality of ground stations, each of which is located substantially at the middle of its block, of ground station apparatus for each ground station for transmitting in synchronism pulses characteristic of air traffic conditions adjacent the blocks, airplane carried apparatus on each airplane to receive said transmitted pulses and to transmit reply pulses to certain ones of such received radio pulses to manifest thereby presence of the airplane within a particular block and including pulse-character discriminating means to detect traffic conditions in adjacent blocks as manifested by the character of such received pulses and control means controlling the transmitting portion of said airplane-carried apparatus and responsive to said certain ones of such received radio pulses to reject all other ground station transmitted pulses arriving at the airplane thereafter within a predetermined time so as not to transmit reply pulses in response thereto, and further ground station apparatus for each ground station including receiver means and gating means for said receiver means actuated by each pulse transmitted by the associated adjacent transmitter for receiving such reply pulses from airplanes manifesting airplane occupancy within the block only providing each such reply pulse is received at the ground station within a predetermined time period extending after the transmission of the corresponding transmitted pulses by the ground station apparatuses and fixed by the gate output of said gating means, whereby block boundaries insofar as block occupancy detection is concerned are determined by the said time period.

70. In an airplane cab signalling system, the combination with a plurality of airplanes flying over a route defined by a plurality of ground stations, each of which is located substantially at the middle of its block, of ground station apparatus for each ground station for transmitting in synchronism pulses characteristic of air traffic conditions at a particular altitude adjacent the blocks, airplane carried apparatus on each airplane to receive said transmitted pulses and to transmit reply pulses to certain ones of such received radio pulses to manifest thereby presence of the airplane within a particular block at said particular altitude and including pulse-character discriminating means to detect traffic conditions in adjacent blocks at said particular altitude as manifested by the character of such received pulses and control means controlling the transmitting portion of said airplane-carried apparatus and responsive to said certain ones of such received radio pulses to reject all other ground station transmitted pulses arriving at the airplane thereafter within a predetermined time so as not to transmit reply pulses in response thereto, and further ground station apparatus for each ground station including receiver means and gating means for said receiver means actuated by each pulse transmitted by the associated adjacent transmitter for receiving such reply pulses from airplanes manifesting airplane occupancy within the block at said particular altitude only providing each such reply pulse is received at the ground station within a predetermined time period extending after the transmission of the corresponding transmitted pulses by the ground station apparatuses and fixed by the gate output of said gating means, whereby block boundaries insofar as block occupancy detection is concerned are determined by the said time period.

71. The combination of a radio transmitter at a first location adapted to transmit a plurality of radio pulses, an automatic output control and timer therefor which controls said transmitter to produce a series of distinctive synch pulses, each followed by a plurality of timed information pulses differing from said synch pulses, said radio transmitter being variable to vary the information pulses transmitted, a receiver movable to a plurality of locations and adapted to receive said synch pulses and said information pulses, a selected control for the output of said receiver for selecting the output therefor for different periods of time following each synch pulse and corresponding to the transmission time of a portion only of said information pulses between said synch pulses and sensitive to the position of said receiver relative to said transmitter to select a given period of time from said periods which correspond to different relative positions, a transmitter connected to the output of said receiver to produce an output in the form of a reply pulse in response to information pulses occurring within the selected period of time, and a radio receiver at said first location to receive said reply pulses and including a control for said radio transmitter at said first location, said control being connected to the output of said last-mentioned receiver at said first location to vary said information pulses in accordance with the variations of said output.

72. The combination in each of a plurality of adjacent ground stations defining a plurality of blocks of an air lane of a pulse transmitter, a receiver and an automatic timed control connected between said pulse transmitter and receiver and timed to render the receiver output ineffective for a period of time, which period starts at a time after each transmitted pulse equal to the time it takes a pulse to travel from the ground station to the block boundary and back plus such time as elapses between arrival of a pulse at an aircraft in the block and response thereto, whereby the block boundary is defined about each ground station, an airborne receiver for receiving said transmitted pulses and an airborne automatic transmitter responsive to the output of said airborne receiver for transmitting pulses in reply to said transmitted pulses whereby an output from said first-mentioned receiver at any ground station in response to a reply pulse indicates the presence in that block of an aircraft bearing said airborne receiver and transmitter, a master timer connected to said first-mentioned pulse transmitters and controlling the transmission of pulses by said ground stations such that corresponding pulses transmitted by adjacent ground stations reach the block boundary therebetween simultaneously, said first-mentioned pulse transmitters including pulse-forming circuits modulating the output of their respective transmitters to cause said corresponding pulses transmitted by the ground stations to be in the form of distinctively characterized synch pulses and said pulse-forming circuits at adjacent ground stations modulating their respective transmitters to cause the transmission of such synch pulses of different character in order to define definitely the block boundary between adjacent ground stations, an airborne control responsive to the output of said airborne receiver and controlling said airborne transmitter to characterize its reply pulses in accordance with the character of the previous synch pulse received by said airborne receiver, a second airborne control responsive to the output of said airborne receiver and rendering the airborne transmitter output ineffective in response to the second of two closely-spaced received synch pulses, and a discriminator connected to the output of each of said first-mentioned receivers at said ground stations for rendering each last-mentioned receiver inoperative in response to all reply pulses received thereby which are not characteristic of the previous synch pulse transmitted by its associated transmitter at that ground station.

73. The combination in each of a plurality of adjacent ground stations defining a plurality of blocks of an air lane of a pulse transmitter, a receiver and an automatic timed control connected between said pulse transmitter and receiver and timed to render the receiver output ineffective for a period of time, which period starts at a time after each transmitted pulse equal to the time it takes a pulse to travel from the ground station to the block boundary and back plus such time as elapses between arrival of a pulse at an aircraft in the block and response thereto, whereby the block boundary is defined about each ground station, an airborne receiver for receiving said transmitted pulses and an airborne automatic transmitter responsive to the output of said airborne receiver for transmitting pulses in reply to said transmitted pulses whereby an output from said first-mentioned receiver at any ground station in response to a reply pulse indicates the presence in that block of an aircraft bearing said airborne receiver and transmitter, a master timer connected to said first-mentioned pulse transmitters and controlling the transmission of pulses by said ground stations such that corresponding pulses transmitted by adjacent ground stations reach the block boundary therebetween simultaneously. said first-mentioned pulse transmitters including pulse-forming circuits modulating the output of their respective transmitters to cause said corresponding pulses transmitted by the ground stations to be in the form of distinctively characterized synch pulses and said pulse-forming circuits at adjacent ground stations modulating their respective transmitters to cause the transmission of such synch pulses of different character in order to define definitely the block boundary between adjacent ground stations, an airborne control responsive to the output of said airborne receiver and controlling said airborne transmitter to characterize its reply pulses in accordance with the character of the previous synch pulse received by said airborne receiver, and a discriminator connected to the output of each of said first-mentioned receivers at said ground stations for rendering each last-mentioned receiver inoperative in response to all reply pulses received thereby which are not characteristic of the previous synch pulse transmitted by its associated transmitter at that ground station.

74. In apparatus of the class described the combination of a pulse receiver adapted to receive pulses of various widths and whose output varies in accordance with the width of the pulse received, a timer for controlling the output of said receiver, an altitude-sensitive switch for controlling the operation of said timer, discriminators for separating and identifying the output pulses of said controlled receiver output according to their respective variations, and a transmitter controlled by said discriminators for producing reply pulses in response to certain pulses received by said receiver and for characterizing said reply pulses in accordance with the character of one of the previously-received pulses.

75. In combination airborne apparatus including a pulse receiver, first pulse delay means timed to delay pulses applied thereto for a first predetermined period of time and a pulse transmitter connected to said receiver through said delay means for retransmitting pulses received by said receiver and at said first predetermined period of time thereafter, ground-located apparatus including transmitting apparatus for transmitting omni-directionally spaced pulses for reception by the airborne receiver, receiving apparatus and gating means therefor located adjacent said transmitting apparatus for registering such retransmitted pulses from the airborne apparatus, and second pulse delay means timed to delay pulses applied thereto for a time equal to said first predetermined period of time, said gating means being timed to produce outputs each extending over a second predetermined period of time, being connected to said receiving apparatus through said second pulse delay means to control the responsiveness of the radio receiving apparatus and being operatively actuated by each of said pulses transmitted by said transmitting apparatus for said second predetermined period of time, whereby such retransmitted pulses are only received by said receiving apparatus and registered if the aircraft bearing said airborne apparatus is located within the volume of space adjacent the ground-located apparatus defined by said second predetermined period of time in accordance with the radio pulse transmission time-distance interval principle, and by-pass means including a switch therefor connected to by-pass said airborne first pulse delay means, whereby an aircraft located just without said volume of space can transmit pulses for reception and registration by the ground-located apparatus by the selective actuation of said switch to remove the predetermined time delay before retransmission of its pulses and thus electronically project its presence within said volume of space.

HUGH C. KENDALL.
LIONEL H. ORPIN.

REFERENCES CITED

The following references are of record in the file of this patent:

UNITED STATES PATENTS

| Number | Name | Date |
|---|---|---|
| 1,894,019 | Buckley | Jan. 10, 1933 |
| 1,924,174 | Wolf | Aug. 29, 1933 |
| 2,252,083 | Luck | Aug. 12, 1941 |
| 2,262,838 | Deloraine | Nov. 18, 1941 |
| 2,272,070 | Reeves | Feb. 3, 1942 |
| 2,324,314 | Michel | July 13, 1943 |
| 2,403,210 | Butement | July 2, 1946 |
| 2,421,017 | Deloraine | May 27, 1947 |
| 2,444,452 | Labin | July 6, 1948 |
| 2,445,584 | Ramo | July 20, 1948 |
| 2,453,970 | Charrier | Nov. 16, 1948 |
| 2,457,522 | Bias | Dec. 28, 1948 |
| 2,464,353 | Smith | Mar. 15, 1949 |
| 2,467,465 | Cawein | Apr. 19, 1949 |
| 2,468,045 | Deloraine | Apr. 26, 1949 |
| 2,471,416 | Deloraine | May 31, 1949 |
| 2,480,123 | Deloraine | Aug. 30, 1949 |
| 2,483,097 | McIlwain | Sept. 27, 1949 |